(12) United States Patent
Milirud et al.

(10) Patent No.: US 7,679,612 B2
(45) Date of Patent: *Mar. 16, 2010

(54) CONFIGURATION GOALS VIA VIDEO PRESENTING NETWORK

(75) Inventors: Michael Milirud, Bellevue, WA (US); Marcus J. Andrews, Bellevue, WA (US); Bryan L. Langley, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 1368 days.

This patent is subject to a terminal disclaimer.

(21) Appl. No.: 10/925,837

(22) Filed: Aug. 24, 2004

(65) Prior Publication Data

US 2005/0268321 A1 Dec. 1, 2005

Related U.S. Application Data

(60) Provisional application No. 60/567,053, filed on Apr. 30, 2004.

(51) Int. Cl.
*G09G 5/00* (2006.01)

(52) U.S. Cl. .......................... 345/204; 345/1.3; 345/3.1; 345/3.3; 345/5

(58) Field of Classification Search ........... 345/1.1–1.3, 345/3.1–3.3, 5, 100, 204, 474, 501, 520, 345/545, 581, 589, 735, 690; 709/204, 250, 709/231, 233, 220, 222, 241, 244, 238; 382/241; 715/700, 848, 839; 726/2, 24, 29; 725/118, 725/119, 96, 126, 109; 370/254; 710/1, 710/63, 19

See application file for complete search history.

(56) References Cited

U.S. PATENT DOCUMENTS

| 5,150,464 | A | * | 9/1992 | Sidhu et al. ................. 709/222 |
| 5,717,878 | A | | 2/1998 | Sannino |
| 5,719,594 | A | | 2/1998 | Potu |
| 5,748,980 | A | | 5/1998 | Lipe et al. |
| 5,793,979 | A | | 8/1998 | Lichtman et al. |

(Continued)

FOREIGN PATENT DOCUMENTS

CN 1313708 A 9/2001

(Continued)

OTHER PUBLICATIONS

"Compatibility Testing Requirements for Display Drivers," 2 pages, Microsoft Corporation, http://www.microsoft.com/whdc/archive/vidminiport.mspx, website visitied on Aug. 18, 2004.

(Continued)

*Primary Examiner*—Prabodh M Dharia
(74) *Attorney, Agent, or Firm*—Klarquist Sparkman, LLP

(57) ABSTRACT

Resources of a video presenting network having plural outputs can be configured. A provisional configuration can be supported. Configuration of inputs can be performed separately from configuration of outputs. Interdependencies between network resources can be considered to restrict provided options to those co-functional with a provisional configuration. Responsibility for considering interdependencies can be delegated to a video driver, such as a video miniport. A client can use a variety of approaches to find a desired configuration. A variety of configuration goals (e.g., optimal configurations) can be achieved in light of the interdependencies.

21 Claims, 29 Drawing Sheets

U.S. PATENT DOCUMENTS

| | | | |
|---|---|---|---|
| 5,819,107 | A | 10/1998 | Lichtman et al. |
| 5,867,653 | A * | 2/1999 | Aras et al. ............... 709/204 |
| 6,004,276 | A * | 12/1999 | Wright et al. ............... 600/508 |
| 6,011,546 | A * | 1/2000 | Bertram ....................... 715/700 |
| 6,166,738 | A * | 12/2000 | Robertson et al. ........... 715/839 |
| 6,243,093 | B1 * | 6/2001 | Czerwinski et al. ......... 715/848 |
| 6,502,131 | B1 * | 12/2002 | Vaid et al. .................... 709/224 |
| 6,556,253 | B1 | 4/2003 | Megied et al. |
| 6,688,891 | B1 * | 2/2004 | Sanford ....................... 434/365 |
| 6,691,312 | B1 * | 2/2004 | Sen et al. ...................... 725/96 |
| 6,727,884 | B1 | 4/2004 | Leatham et al. |
| 6,760,748 | B1 * | 7/2004 | Hakim ......................... 709/204 |
| 6,850,252 | B1 * | 2/2005 | Hoffberg ..................... 715/716 |
| 6,901,453 | B1 * | 5/2005 | Pritchett et al. .............. 709/250 |
| 6,907,482 | B2 * | 6/2005 | Maciesowicz ................ 710/63 |
| 7,035,290 | B1 * | 4/2006 | Lyle ............................. 370/498 |
| 7,058,720 | B1 | 6/2006 | Majidimehr |
| 7,088,398 | B1 * | 8/2006 | Wolf et al. ............... 348/423.1 |
| 7,136,042 | B2 * | 11/2006 | Magendanz et al. ......... 345/100 |
| 7,138,989 | B2 * | 11/2006 | Mendelson et al. .......... 345/204 |
| 7,146,630 | B2 * | 12/2006 | Dravida et al. ............... 725/111 |
| 7,171,491 | B1 * | 1/2007 | O'Toole et al. .............. 709/244 |
| 7,369,099 | B2 | 5/2008 | Arai et al. |
| 7,386,641 | B2 * | 6/2008 | Xu et al. ......................... 710/19 |
| 7,447,815 | B2 * | 11/2008 | Weaver et al. .................. 710/72 |
| 7,554,510 | B1 | 6/2009 | Grigor et al. |
| 2003/0028884 | A1 * | 2/2003 | Swart et al. .................... 725/51 |
| 2003/0126450 | A1 * | 7/2003 | Master et al. ................ 713/189 |
| 2003/0138029 | A1 * | 7/2003 | Gerard ......................... 375/130 |
| 2003/0191856 | A1 * | 10/2003 | Lewis et al. .................. 709/241 |
| 2003/0200477 | A1 | 10/2003 | Ayres |
| 2003/0214458 | A1 | 11/2003 | Giemborek et al. |
| 2004/0046707 | A1 | 3/2004 | Mori et al. |
| 2004/0064542 | A1 * | 4/2004 | Williams ..................... 709/224 |
| 2004/0085348 | A1 * | 5/2004 | Wang ........................... 345/735 |
| 2004/0113924 | A1 * | 6/2004 | Jeong ........................... 345/690 |
| 2004/0133696 | A1 | 7/2004 | Comstock et al. |
| 2004/0150650 | A1 * | 8/2004 | Mendelson et al. .......... 345/589 |
| 2004/0160449 | A1 | 8/2004 | Gossalia et al. |
| 2004/0221315 | A1 * | 11/2004 | Kobayashi ................... 725/126 |
| 2004/0261116 | A1 * | 12/2004 | Mckeown et al. ............ 725/109 |
| 2005/0097596 | A1 * | 5/2005 | Pedlow, Jr. ..................... 725/31 |
| 2005/0117601 | A1 * | 6/2005 | Anderson et al. ............ 370/465 |
| 2005/0160471 | A1 * | 7/2005 | Cohen .......................... 725/116 |
| 2005/0192822 | A1 | 9/2005 | Hartenstein et al. |
| 2005/0195752 | A1 * | 9/2005 | Amin et al. .................. 370/254 |
| 2005/0197877 | A1 | 9/2005 | Kalinoski |
| 2005/0246329 | A1 * | 11/2005 | Milirud et al. ................... 707/3 |
| 2005/0246430 | A1 * | 11/2005 | Milirud et al. ............... 709/220 |
| 2005/0246753 | A1 * | 11/2005 | Milirud et al. ............... 725/118 |
| 2005/0249426 | A1 * | 11/2005 | Badawy ....................... 382/241 |
| 2006/0039468 | A1 * | 2/2006 | Emerson et al. ......... 375/240.01 |
| 2006/0248600 | A1 * | 11/2006 | O'Neill .......................... 726/29 |
| 2007/0101430 | A1 * | 5/2007 | Raikar ............................ 726/24 |
| 2007/0276967 | A1 * | 11/2007 | Maciesowicz ................ 710/16 |
| 2008/0008172 | A1 * | 1/2008 | Kobayashi ................... 370/389 |
| 2008/0034406 | A1 * | 2/2008 | Ginter et al. ..................... 726/2 |
| 2008/0068449 | A1 * | 3/2008 | Wu et al. ................... 348/14.09 |
| 2009/0198802 | A1 * | 8/2009 | Tanner et al. ................ 709/221 |

FOREIGN PATENT DOCUMENTS

| | | |
|---|---|---|
| EP | 1096794 | 5/2001 |
| WO | WO 00/59594 | 10/2000 |

OTHER PUBLICATIONS

"DRV241: Windows Video Display Drivers," 2 pages, Azius LLC, http://www.azius.com/site/index.cgi?page=drv241, website visited on Aug. 18, 2004.

"How to Call Video Miniport Driver Functions from a Display Driver," 1 pages, Microsoft Corporation, http://support.microsoft.com/default.aspx?scid=kb;%5BLN%5D;832517, website visited on Aug. 18, 2004.

"Howto: Enable Verbose Debug Tracing in Various Drivers and Subsystems," 7 pages, Microsoft Corppration, http://support.microsoft.com/default.aspx?scid=kb;EN-US;Q314743, website visited on Aug. 18, 2004.

"Introduction to Windows 2000 Drivers," pp. 1-9, Microsoft Corporation, Oct. 9, 2000.

"Video Miniport Driver Functions," 1 page, Microsoft Corporation, http://msdn.microsoft.com/library/default.asp?url=/library/en-us/graphics/hh/graphics/VideoMiniport_FunctionIntro_43935f10-ffe2-444a-a1bf-dd6aa693db8b.xml.asp, website on Aug. 18, 2004.

"Video Miniport Drivers," 1 page, Open Systems Resources, Inc., http://www.osr.com/ddk/graphics/vmport_7a1z.htm, website visited on Aug. 18, 2004.

"Video Miniport Header Files, Sample Code, and References," 1 page, Open Systems Resources, Inc., http://www.osr.com/ddk/graphics/vmport_61yf.htm, website visited on Aug. 18, 2004.

Lacaze, et al., "Search Graph Formation for Minimizing the Complexity of Planning," *Performance Metrics for Intelligent Systems*, Aug. 14-16, 2000, Gaithersburg, MD, 6 pages, Aug. 2000.

Packard, "NCD's WinCenterPro," http://keithp.com/~keithp.talks/wincen.html, 8 pages, website visited on Aug. 18, 2004.

Office Action dated Nov. 12, 2008 in U.S. Appl. No. 10/925,662 (20 pp.).

Office Action dated Feb. 3, 2009 in U.S. Appl. No. 10/925,445 (14 pp.).

Text of the 1st Office Action, dated Mar. 28, 2008, issued by the Patent Office of the State Intellectual Property Office of the People's Republic of China, in corresponding Chinese patent application No. 200510089687.1, 16 pp.

Text of the 2nd Office Action, dated Dec. 19, 2008, issued by the Patent Office of the State Intellectual Property Office of the People's Republic of China, in corresponding Chinese patent application No. 200510089687.1, 13 pp.

Third Office Action, dated Mar. 27, 2009, issued by The Patent Office of the State Intellectual Property Office of the People's Republic of China, in corresponding Chinese patent application No. 200510089687.1, 11 pp.

\* cited by examiner

CONFIGURATION GOALS VIA VIDEO PRESENTING NETWORK

RELATED APPLICATION DATA

This application claims the benefit of Milirud et al., U.S. Provisional Application No. 60/567,053, entitled "VIDEO PRESENTING NETWORK MANAGEMENT," filed Apr. 30, 2004, which is hereby incorporated herein by reference.

TECHNICAL FIELD

The technical field relates to configuration of video display adapters (e.g., computer video cards).

BACKGROUND

Computer systems using multiple monitors are becoming widespread. For example, it is now common for a computer to drive both an LCD panel and a projector device. Further, computer users now routinely watch video presentations (e.g., DVDs) using their computer. In such a case, the computer may be driving both a conventional monitor and a television.

In response to demand, video adapter hardware manufacturers now include multiple outputs on video adapters. In this way, a user can more easily use a computer to drive desired devices without having to switch cables for a single output and re-configure the output.

Although such multi-monitor video adapters have a variety of functionality, available configurations are typically limited. Accordingly, there exists a need to improve functionality related to configuring multi-monitor computer systems.

SUMMARY

Configuring a video presenting network having plural outputs can be challenging, due to the sheer number of possible configurations and configuration interdependencies among resources.

A variety of technologies described herein can be used to configure resources of a video presenting network having plural outputs. For example, provisional configuration can be supported. Configuration of inputs can be performed separately from configuration of outputs. Interdependencies between network resources can be considered to restrict provided options to those co-functional with a provisional configuration.

A topology best meeting a configuration goal can be found in light of the interdependencies. For example, a best way to route targets to sources though available codecs to maximize support source mode sets on sources can be found, given that targets must support preferred modes on the display devices connected to them. Other goals can be supported. Prioritization ordering can also be supported. Enumeration and pinning functionality can be used during pursuit of a topology better meeting the goal.

The foregoing and other features and advantages will become more apparent from the following detailed description of disclosed embodiments, which proceeds with reference to the accompanying drawings.

DETAILED DESCRIPTION

Example 1

Exemplary Video Presenting Network

Figure 1:
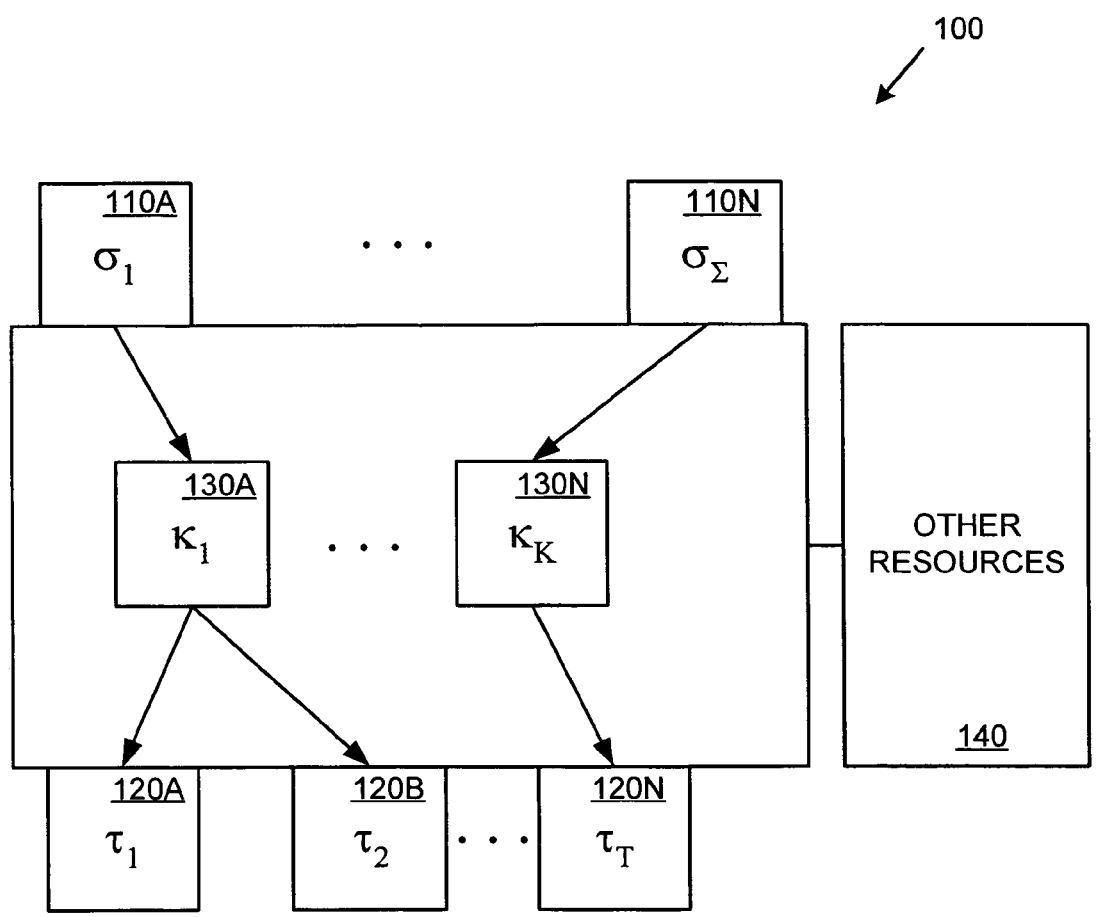
FIG. 1 is a block diagram showing an exemplary configurable video presenting network.

FIG. 1 shows a configurable video presenting network 100. The technologies described in any of the examples herein can be used to configure the video presenting network 100.

The video presenting network 100 for use with the technologies described herein can have one or more inputs 110A-110N (e.g., a total of Σ inputs, σ); two or more outputs 120A-120N (e.g., a total of T inputs, τ); and one or more digital-video-input-representation-to-video-output-signal converters 130A-130N (e.g., a total of K converters, κ).

The inputs 110A-110N are sometimes called "sources" or "surfaces." The outputs 120A-120N are sometimes called "targets." The digital-video-input-representation-to-video-output-signal converters are sometimes called "converters."

In addition to the inputs, converters, and outputs, the video presenting network can include other resources 140 (e.g., video memory, bandwidth, memory capacity, and the like). The other resources 140 can be used by the inputs, converters, and outputs to achieve video presenting functionality.

The video presenting network 100 can be implemented in hardware such as a video display adapter (e.g., video card). In some cases, some resources may reside outside the adapter.

An exemplary computer system may include one or more video views in digital form (e.g., which are written to by applications of the computer system), which are used by the inputs 110A-110N. The resulting signal coming from the plural outputs 120A-120N can be used to drive plural video display devices.

Example 2

Exemplary Alternative Video Presenting Network

Figure 2:
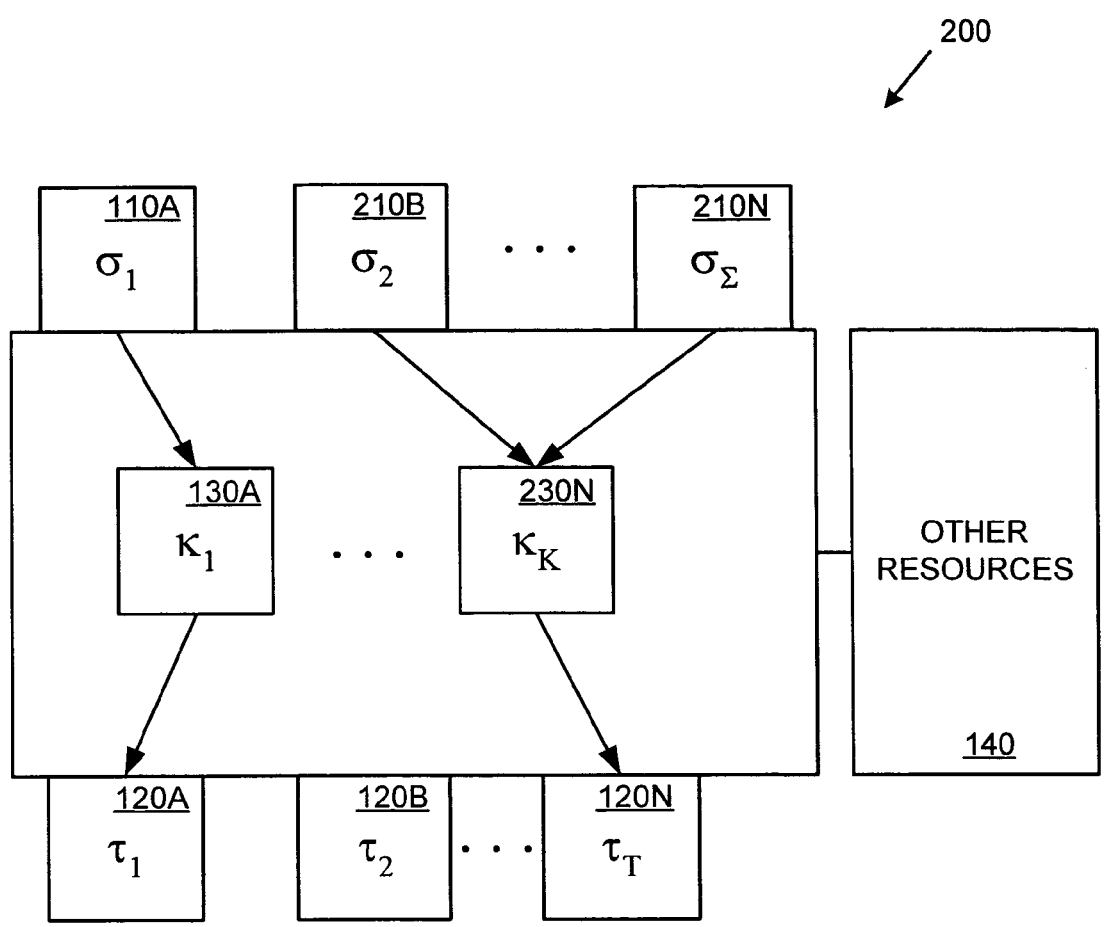
FIG. 2 is a block diagram showing another exemplary configurable video presenting network.

FIG. 2 shows another configurable video presenting network 200. The technologies described in any of the examples herein can be used to configure the video presenting network 200.

In the example, multiple inputs can be used for a single digital-video-input-representation-to-video-output-signal converter (e.g., the inputs 210B and 210N are used as inputs to the converter 230N). Such a configuration can be useful in overlaying one video signal on top of another by using a video output codec with two inputs, wherein the first input is the primary content and the second input is the overlaid content. In such a situation, the position and size of the overlay can be specified as part of the video present source mode for the video presenting network source representing the overlaid content.

Video presenting networks can take many other forms, having an arbitrary number of inputs, converters, and plural outputs.

Example 3

Exemplary Video Presenting Network Resources

In any of the examples herein, a resource can include video presenting network inputs (e.g., sources or surfaces), video presenting network outputs (e.g., targets), converters, video memory, bandwidth, memory capacity, and the like.

The topology of a video presenting network is also sometimes called a resource. For example, configuring a resource can include simply choosing a topology without regard to choosing configuration options for the individual resources involved in the topology.

Example 4

Exemplary Video Paths in a Video Presenting Network

A video presenting network 100 can have a plurality of video paths. For example, as shown in FIG. 1, a path may be from the input 110A, through the converter 130A, to the output 120A. Another path may be from the input 110A through the converter 130A, to the output 120B, and so forth.

The topology of the video presenting network 100 can be configured so that there are different paths according to the configuration. For example, instead of sending the output of the converter 130N to the video output 120N, it could be routed to a different video output (e.g., 120B) by changing a configuration setting.

Example 5

Exemplary Video Presenting Network Inputs

In any of the examples described herein, the video inputs (or "sources") can take any of a variety of forms, such as those providing digital surfaces. In practice, the inputs can be configured to use a variety of source modes. Such modes can include parameters such as width, height, unit format, rasterized graphics filtering technique, primary surface chain length, the like, or some combination thereof.

Example 6

Exemplary Video Presenting Network Outputs

In any of the examples described herein, the video outputs (or "targets") can take any of a variety of forms, such as those providing output signals. A descriptor can be associated with the outputs. The descriptor can indicate a format (e.g., DVI, HDMI, HD-15, BNC, S-video, RF, RCA and the like) and HPD awareness. The output can also be associated with a video encoding type. Furthermore, an output can be configured to be in sync with another output.

In practice, the outputs can be configured to use a variety of target modes. Such modes can include parameters such as active region (e.g., width and height), total region (e.g., width and height), active region displacement, pixel encoding format, vertical retrace frequency, horizontal retrace frequency, pixel clock rate, content ordering, color primaries, white point reference, color space transformation matrix, the like, or some combination thereof.

Example 7

Exemplary Converters

In any of the examples herein, a digital-video-input-representation-to-video-output-signal converter can take the form of a video codec, a digital-to-analog converter, or the like. Some converters are sharable. For example, in a clone (e.g., mirror) mode, a codec may send its signal to two outputs.

Example 8

Exemplary Interdependency of Resources

Although any number of configurations of the video presenting network 100 are theoretically possible, only a limited number of theoretical configurations are functional configurations. In practice, the resources of the video presenting network 100 are subject to configuration interdependency.

For example, configuring the video input 110A to be of a particular type may consume a large amount of video memory. In such a case, there may not be sufficient remaining memory for another video input (e.g., 110N) to be of the same type. For example, it may only be configurable to a type consuming less memory.

There are a wide variety of other interdependencies. For example, the converters may only accept particular video input types or produce particular video output types. So, a particular input may not be functional in combination with a particular converter, and so forth.

Thus, in practice, an obstacle to implementing a desired configuration is that it may not be functional. Further, it is not easy to determine which combinations are functional out of the myriad of theoretically possible combinations for a video presenting network having a plurality of video inputs, a plurality of converters, and a plurality of video outputs (which can be interconnected in a variety of ways).

Figure 3:
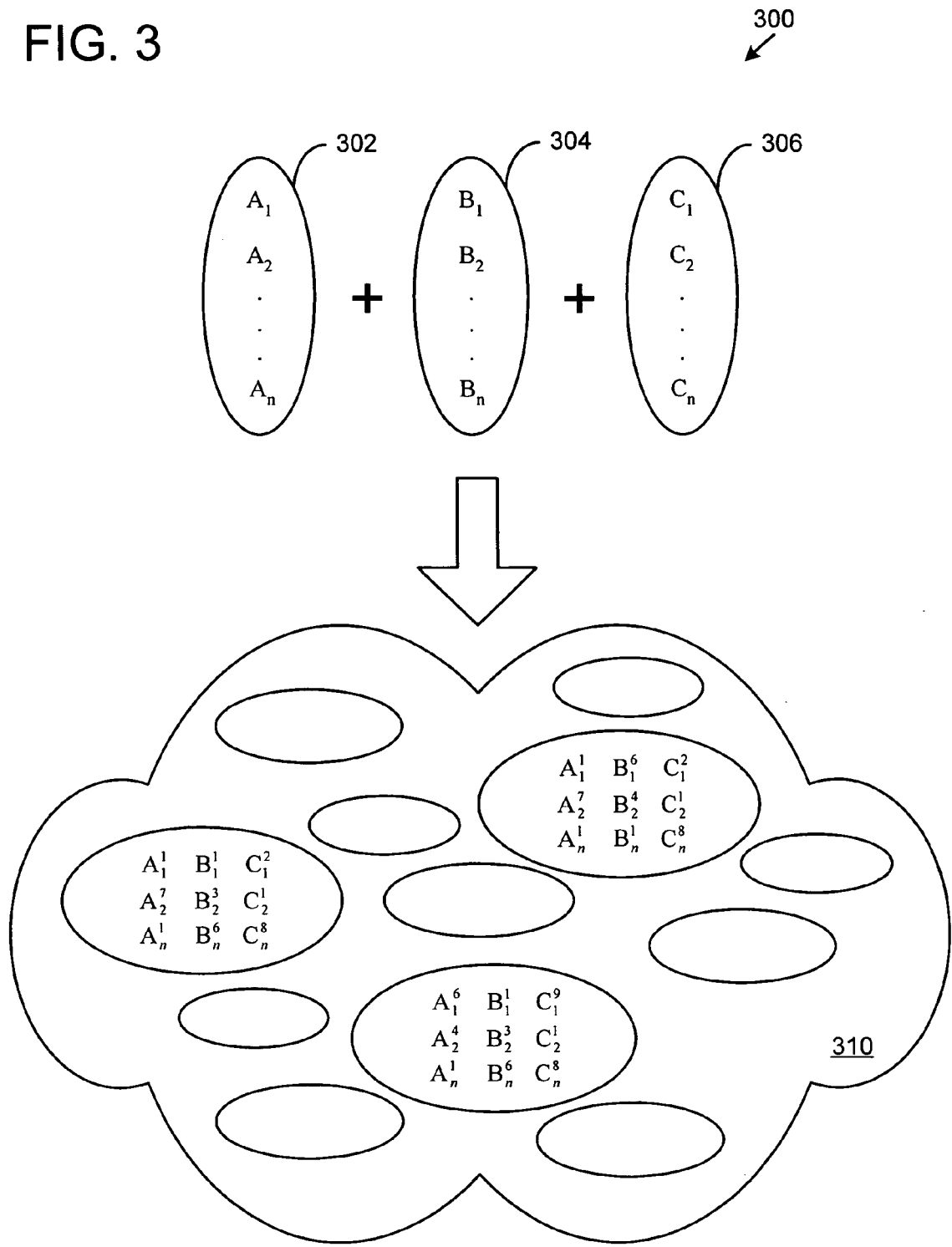
FIG. 3 is a block diagram showing combinations of configurations for a video presenting network.

FIG. 3 is a block diagram showing combinations of configurable resources for a video presenting network. In the example, the theoretically possible configurations 300 can be assembled by connecting one or more of a configured first resource 302 (e.g., a video presenting network input), with one or more of a configured second resource 304 (e.g., a video presenting network converter), that are connected with one or more of a configured third resource 306 (e.g., a video presenting network output). The resulting set of theoretically possible configurations 310 is shown as a vast collection of possibilities, some of which are functional, and some of which are non-functional, depending on the configuration of the resources therein.

Finding a solution for an optimal configuration in such a vast solution space is a tri-partite graph matching problem, which is an NP-Complete problem. Therefore, using a brute force approach can be problematic when the number of possible configurations for the resources exceeds a reasonable number.

Example 9

Exemplary Configuration

In any of the examples described herein, configuration of resources can take a wide variety of forms, including selecting a topology for a set of resources of the video presenting network or selecting configuration options (e.g., modes) for one or more resources in the network (e.g., whether or not the network is interconnected).

Example 10

Exemplary Configuration Method

Figure 4:
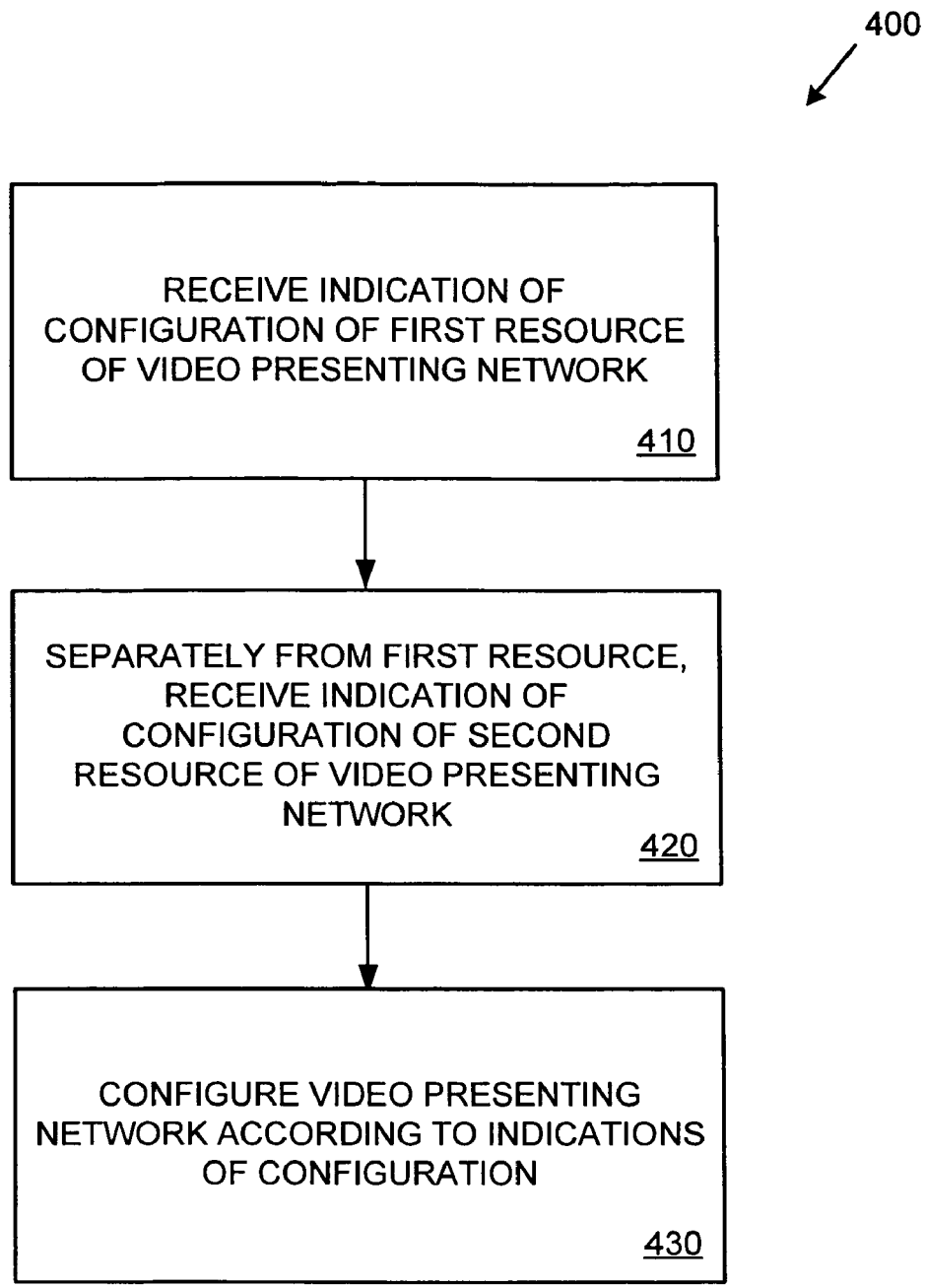
FIG. 4 is a flowchart showing a method of configuring a configurable video presenting network, such as that shown in FIG. 1.

FIG. 4 shows an exemplary configuration method 400 which can be used for any of the video presenting networks described herein to achieve configuration. The method and any of the other methods described herein can be implemented via computer-executable instructions on one or more computer-readable media.

At 410, an indication of a configuration of a first resource of the video presenting network is received. For example, a configuration for a particular video input of the video presenting network can be received.

At 420, separately from the indication of the configuration of the first resource, an indication of a configuration for a second resource of the video presenting network is received. For example, a configuration for a particular video output of the plurality of outputs of the video presenting network can be received.

Then, at 430, the video presenting network is configured according to the indications of configurations.

In practice, additional indications of configuration can be separately received for any resources of the video presenting network (e.g., for two different inputs, two different outputs, two different converters, a converter and an output, and so forth).

Separately received indications can include those received by using two different calls, such as those to a programmatic interface (e.g., device driver interface calls). For example, two different calls to a device driver can be used. Or, two different parameters can be used in the same call. Or, one or more data structures indicating separate values for the resources can be used. Such calls can come from a client such as an operating system.

In such a way, the resources of the video presenting network can be independently configured. Such configuration can also indicate a topology for the video presenting network (e.g., how the resources are interconnected).

Example 11

Exemplary Provisional Configuration

Figure 5:
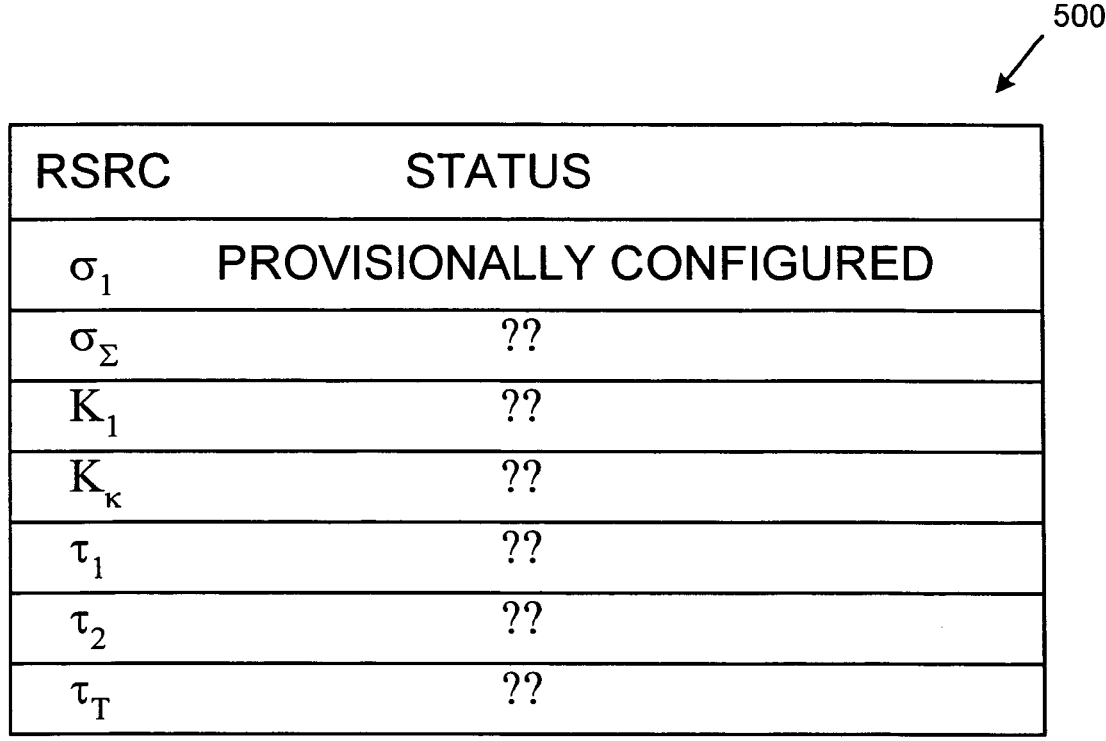
FIG. 5 is a table showing exemplary provisional configuration of a video presenting network, such as that shown in FIG. 1.

Using a provisional configuration approach can facilitate a variety of functionality, including finding a desirable configuration among the myriad of possible functional configurations. FIG. 5 shows a table 500 indicating provisional configuration of a resource of a video presenting network such as that shown in FIG. 1.

In the example, the resource $\sigma_1$ has been provisionally configured (e.g., configuration parameters for the resource of the video presenting network are stored but the configuration need not be fully functional). Such a provisional configuration can be based on receipt of a partial configuration (e.g., a configuration of a resource out of the video presenting network resources or an indication of a topology for the video presenting network). Configuration for all resources need not be received for a provisional configuration. Because a configuration without the full set of configuration parameters is typically not yet functional, a provisional configuration is sometimes called "semi-functional." Providing a partial configuration for a resource is sometimes called "pinning" the resource. If desired, the partial configuration can be removed (or overridden). Removing the partial configuration is sometimes called "unpinning."

Example 12

Exemplary Transactional Configuration

Figure 6:
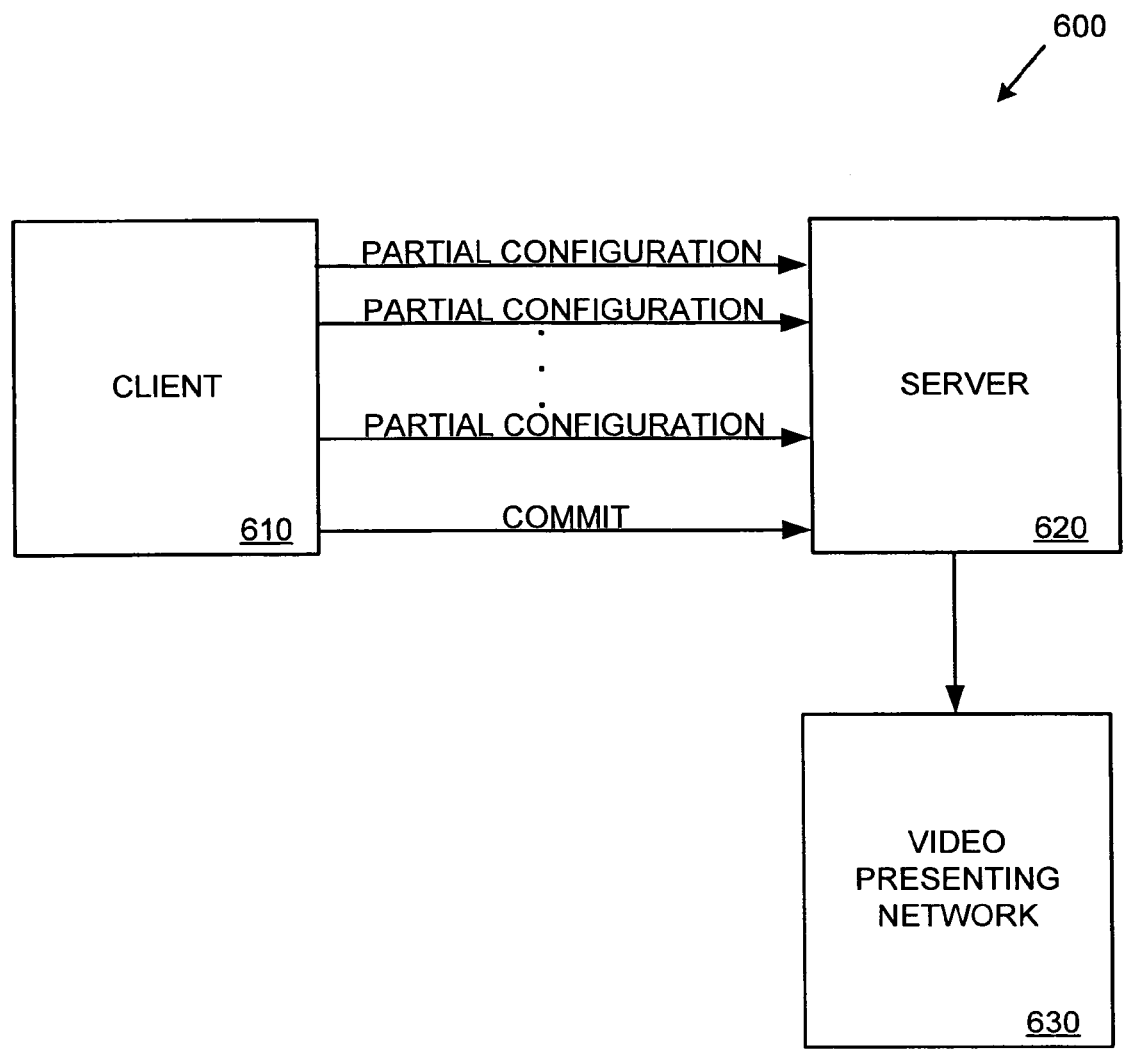
FIG. 6 is a block diagram showing an exemplary transactional approach to achieving configuration of a video presenting network, such as that shown in FIG. 1.

A transactional approach to achieving configuration of a video presenting network can be based on the described provisional configuration. FIG. 6 shows an exemplary arrangement 600 for achieving configuration of a video presenting network 630 (e.g., the video presenting network shown in FIG. 1) via a transactional approach.

In the example arrangement 600, a client 610 can send partial configuration information for a video presenting network to a server 620. Upon receiving a commit, the server 620 can then configure the video presenting network 630 according to the indications of partial configuration.

Figure 7:
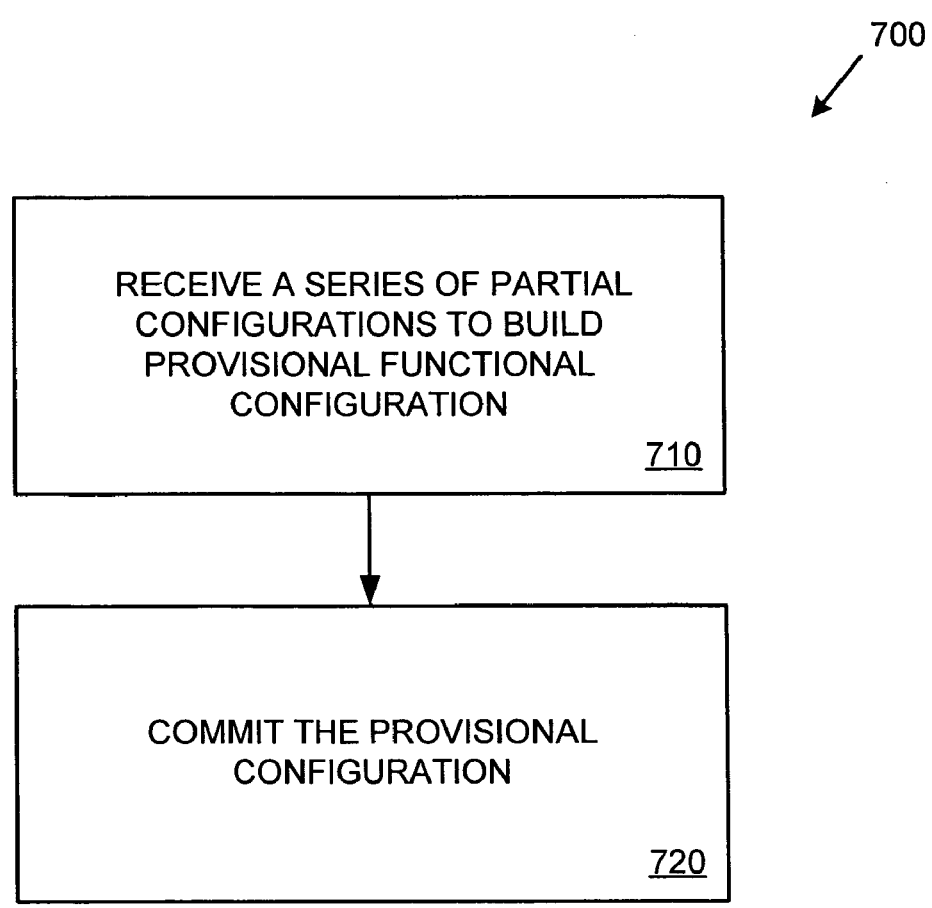
FIG. 7 is a flowchart showing an exemplary method for performing configuration via a transactional approach.

FIG. 7 shows an exemplary method 700 for performing configuration via a transactional approach. At 710, a series of partial configurations for the video presenting network are received (e.g., from a client by a server). The partial configurations can be used to build a provisional functional configuration.

At 720, the provisional functional configuration is committed. The committing can implement the provisional functional configuration in the video presenting network (e.g., the network 630).

A provisional functional configuration can be stored without being implemented. For example, the configuration can be stored without configuring the resources of the video presenting network (e.g., until a commit configuration indication is processed).

Example 13

Exemplary Determination of Co-Functional Configuration Options

Due to interdependencies between the resources of a video presenting network, some theoretically possible configuration options may not be functional in light of a provisionally functional configuration that has already been assembled. For example, given that the resource $\sigma_1$ has been provisionally configured (e.g., as shown in FIG. 5), the configuration options available for another resource of the video presenting network (e.g., $\sigma_\Sigma$) may be restricted.

Figure 8A:
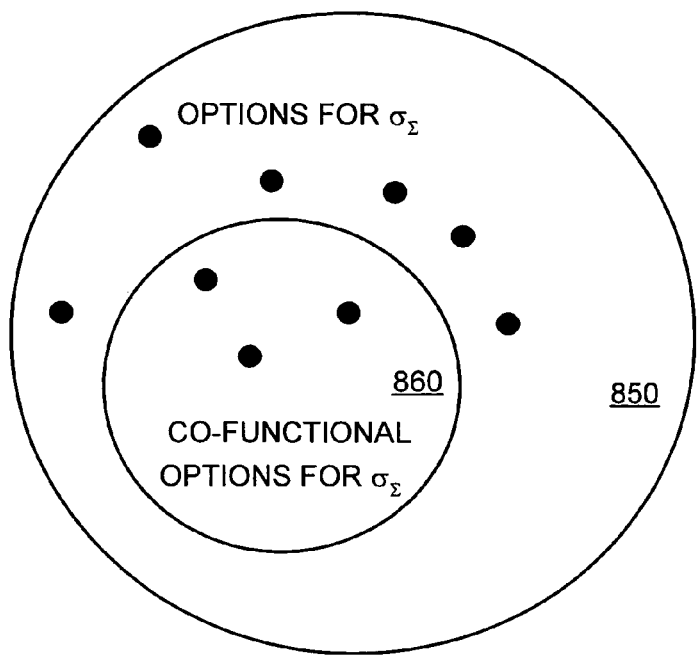
FIG. 8A is a block diagram showing exemplary source for feedback during a provisional configuration of a video presenting network, such as that shown in FIG. 1.

FIG. 8A shows an exemplary set of configuration options 850 for a resource $\sigma_\Sigma$, out of which only a subset 860 of configuration options are available (e.g., would result in a functional configuration) in light of how another resource $\sigma_1$ has been provisionally configured. In such an arrangement, the available configuration options are sometimes described as "co-functional" with the other configuration options (e.g., of the provisional functional configuration) or "not invalidating" a provisional configuration.

The set of co-functional configuration options 860 for a resource can be provided as feedback during provisional configuration in a process sometimes called "enumeration." Such feedback can then be used to make decisions regarding further configuration (e.g., to further build the provisional functional configuration or to backtrack to an earlier provisional functional configuration).

In some cases, it may be desirable to remove a partial configuration from the provisional functional configuration. For example, it may be discovered that the provisional functional configuration does not permit configuration of an as yet un-configured resource in a desired way. Accordingly, any of the configuration methods described herein can include receiving an indication to remove a partial configuration from the provisional functional configuration and remove the partial configuration responsive to receiving the indication (or, simply a new partial configuration, which overrides the old). In this way, a method can backtrack (e.g., unpin a resource) to an earlier provisional functional configuration (e.g., before committing the provisional functional configuration).

Example 14

Exemplary Determination of Co-Functional Configuration Options for Plural Resources In practice, it may be desirable to determine co-functional configuration options for plural resources at once. For example, after a given topology is selected as part of a partial configuration, it may be desirable to enumerate the configuration options for video presenting network sources that are co-functional with the selected topology.

Figure 8B:
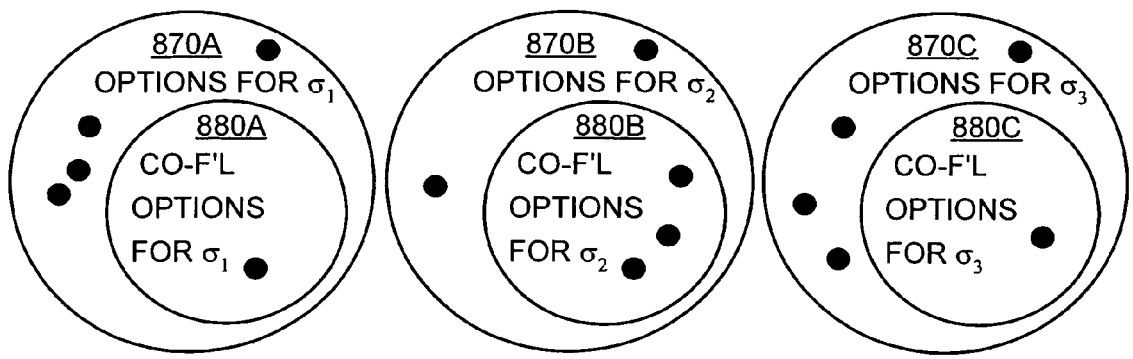
FIG. 8B is a block diagram showing exemplary source for feedback similar to FIG. 8A, but for plural resources.

FIG. 8B shows an arrangement in which co-functional configuration options 880A, 880B, and 880C for respective resources (e.g., $\sigma_1$, $\sigma_2$, and $\sigma_3$) are indicated, wherein configuration options for more than one resource at a time are indicated. The co-functional configuration options shown are co-functional with respect to the chosen topology. The options may not be co-functional with respect to each other. For example, choosing one of the co-functional options for a first resource may invalidate (e.g., not be co-functional with) another one of the co-functional options of another resource.

In the example, at least some of the original options (e.g., 870A, 870B, and 870C) are no longer available (e.g., are not co-functional) in light of the chosen topology. A similar arrangement is possible when options are enumerated for other resources (e.g., targets).

Such options can be enumerated by software (e.g., a video driver). In any of the examples described herein, it may be desirable to guarantee that if any of the enumerated options are chosen for one resource, such a choice will be co-functional with at least one (e.g., will not invalidate all) of the options for any of the other resources.

Example 15

Exemplary Invalidation of Co-Functional Options During Pinning

In practice, after having enumerated the configuration options (e.g., for a plurality of resources) co-functional with a topology for a plurality of resources, such configuration options can be included in a partial, provisional configuration. However, pinning (e.g., provisionally choosing) one of the configuration options for a first resource may invalidate (e.g., not be co-functional with) another option for another resource.

Figure 9A:
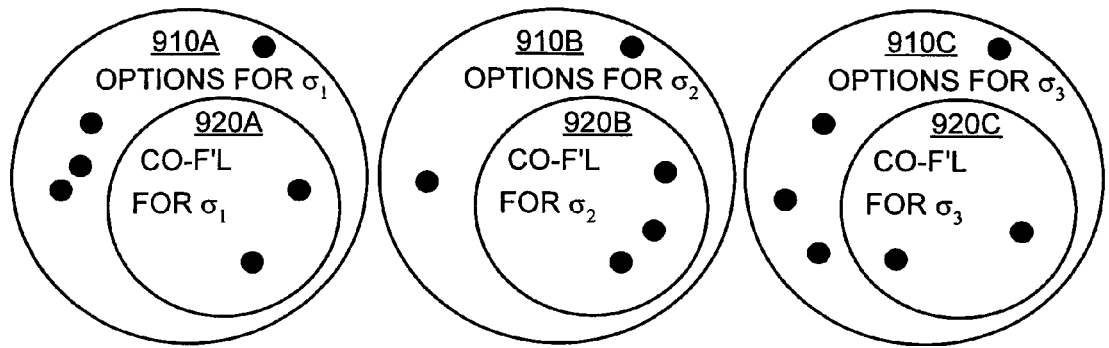
FIGS. 9A, 9B, and 9C are block diagrams showing exemplary co-functional options for a plurality of resources during pinning.
Figure 9B:
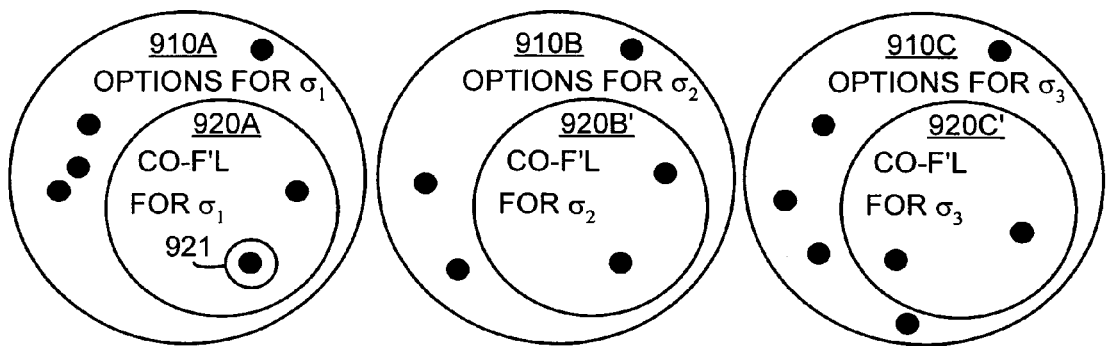
Figure 9C:
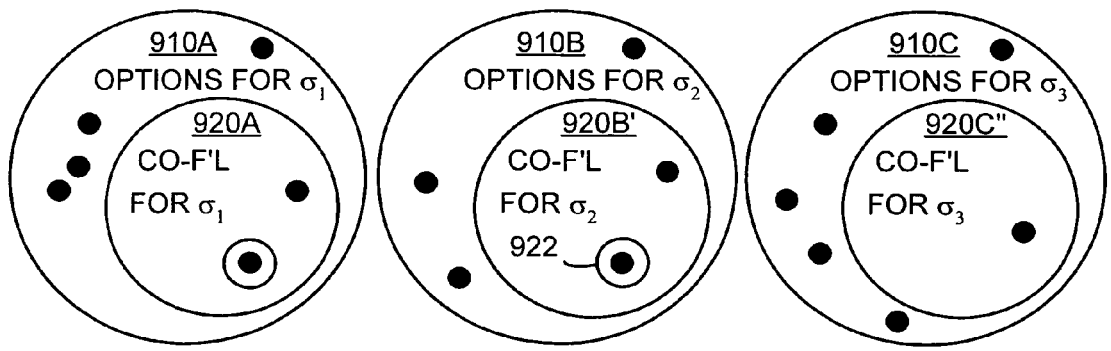

FIGS. 9A-C show an example in which choosing a configuration option for one resource invalidates a configuration option for another resource. A topology can be chosen. FIG. 9A shows the co-functional options 920A, 920B, and 920C (e.g., subsets of theoretically possible options 910A, 920B, and 920C, respectively) enumerated after having chosen a topology. Then, FIG. 9B shows that a particular option 921 has been chosen (e.g., pinned) for a first resource. As a result, some of the configuration options for the other resources may no longer be available (e.g., they are invalidated). In the example, an option no longer appears in 920B'. In some cases, other options are invalidated. Or, perhaps none are invalidated.

FIG. 9C shows that a particular option 922 has been chosen (e.g., pinned) for another resource. As a result, some of the configuration options for the remaining resources may no longer be available. In the example, an option no longer appears in 920C". In some cases, some of the options for the first resource may also be invalided (e.g., resulting in a set 920A', not shown). However, in practice, after a resource has been pinned (e.g., a configuration option has been chosen for the resource), the pinned configuration option will not be invalidated by choosing another one of the enumerated configuration options.

Due to the phenomenon illustrated in FIGS. 9A-9C, when enumerating for plural resources, it may be necessary to check for invalidated options after pinning a resource. Such can be performed by re-enumeration.

Example 16

Exemplary Invalidation of Co-Functional Options During Another Pinning Scenario

Figure 10A:
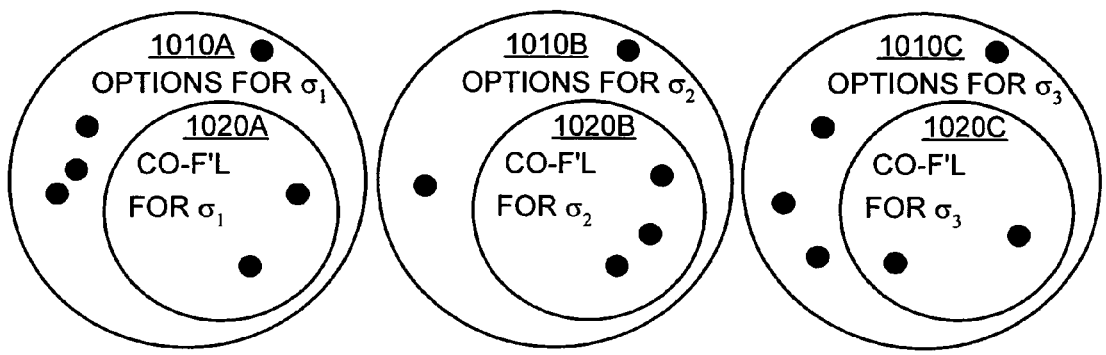
FIGS. 10A, 10B, and 10C are block diagrams showing other exemplary co-functional options for a plurality of resources during pinning.
Figure 10B:
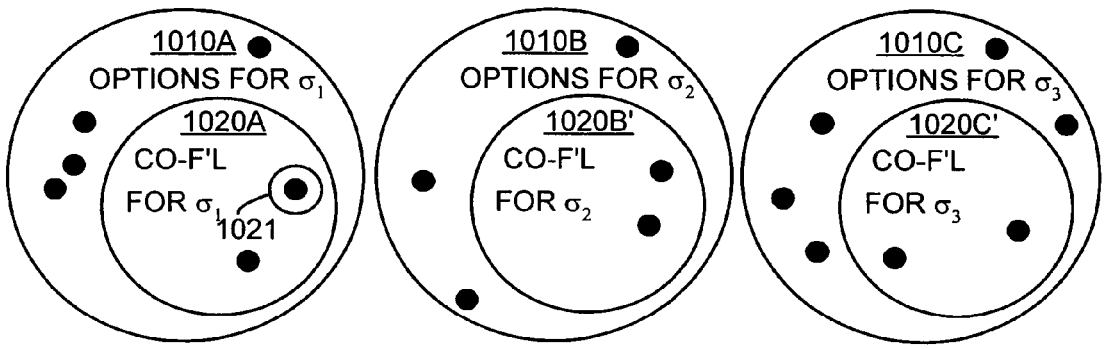
Figure 10C:
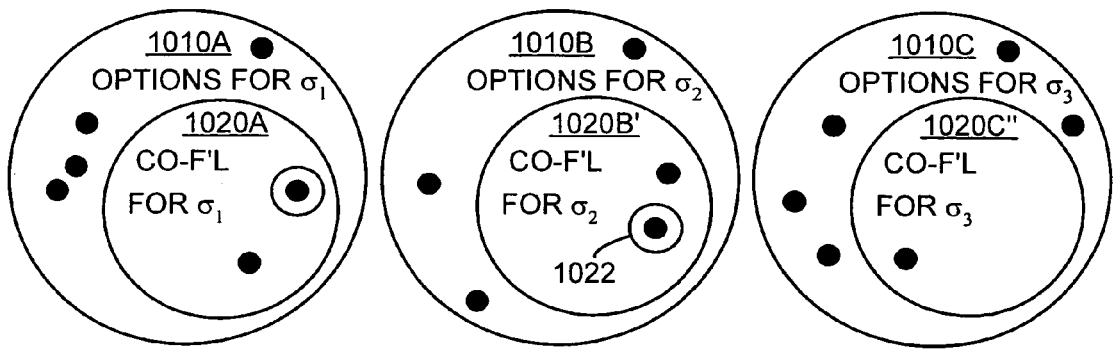

FIGS. 10A-C show another example in which choosing a configuration option for one resource invalidates a configuration option for another resource. A topology can be chosen. FIG. 10A shows the co-functional options 1020A, 1020B, and 1020C (e.g., subsets of theoretically possible options 1010A, 1020B, and 1020C, respectively) enumerated after having chosen a topology. Then, FIG. 10B shows that a particular option 1021 has been chosen (e.g., pinned) for a first resource. As a result, some of the configuration options for the other resources may no longer be available (e.g., they are invalidated). In the example, an option no longer appears in 1020B'. In some cases, other options are invalidated. Or, perhaps none are invalidated.

FIG. 10C shows that a particular option 1022 has been chosen (e.g., pinned) for another resource. As a result, some of the configuration options for the remaining resources may no longer be available. In the example, an option no longer appears in 1020C". In some cases, some of the options for the first resource may also be invalided (e.g., resulting in a set 1020A', not shown). However, in practice, after a resource has been pinned (e.g., a configuration option has been chosen for the resource), the pinned configuration option will not be invalidated by choosing another one of the enumerated configuration options. Many other scenarios are possible.

Example 17

Exemplary Transactional Approach with Feedback

Figure 11:
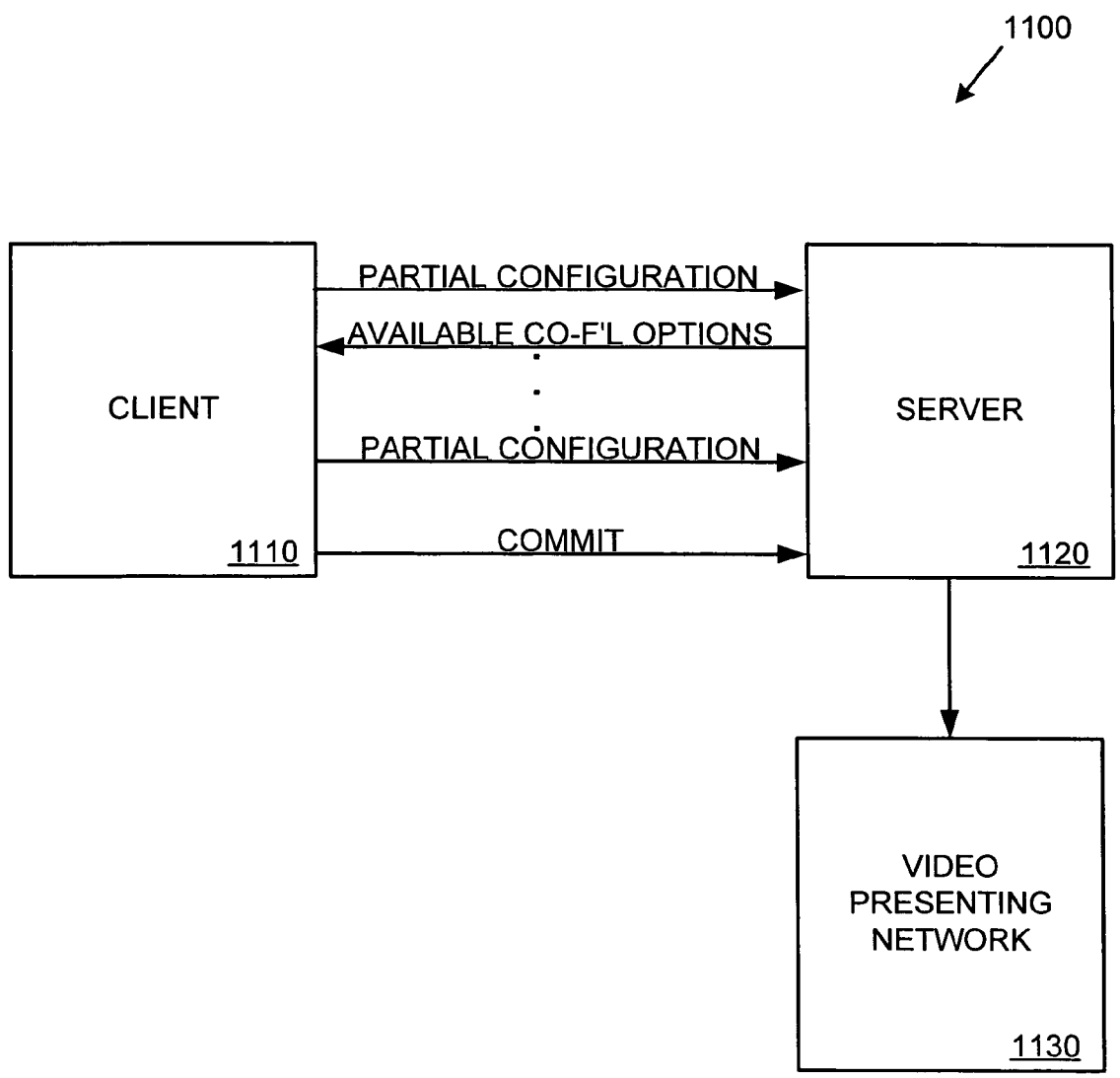
FIG. 11 is a block diagram showing an exemplary transactional approach with feedback to achieve configuration of a video presenting network, such as that shown in FIG. 1.

FIG. 11 shows an exemplary arrangement 1100 for achieving configuration of a video presenting network 1130 (e.g., the video presenting network shown in FIG. 1) via a transactional approach with feedback.

In the example arrangement 1100, a client 1110 can send partial configuration information for a video presenting network to a server 1120. The partial configuration information can be for any of the resources of the video presenting network. The partial configuration can indicate a topology of the video presenting network.

After receiving the configuration information (e.g., a partial configuration, such as for a first resource), co-functional configuration options (e.g., for a second resource) can be provided. The co-functional configuration options can be for a different resource than the partial configuration, for a resource in a different path, and the like. The co-functional options can be restricted (e.g., at least one non-co-functional option is removed) based on the configuration information. As described herein, the options can be provided via enumeration, and enumeration can be done for plural resources at a time.

The co-functional configuration options for the other resource(s) can be based on interdependencies between the resources of the video presenting network. The client can select from among the co-functional configuration options and continue to build a provisional functional configuration.

Upon receiving a commit, the server 1120 can then configure the video presenting network 1130 according to the indications of partial configuration.

Figure 12:
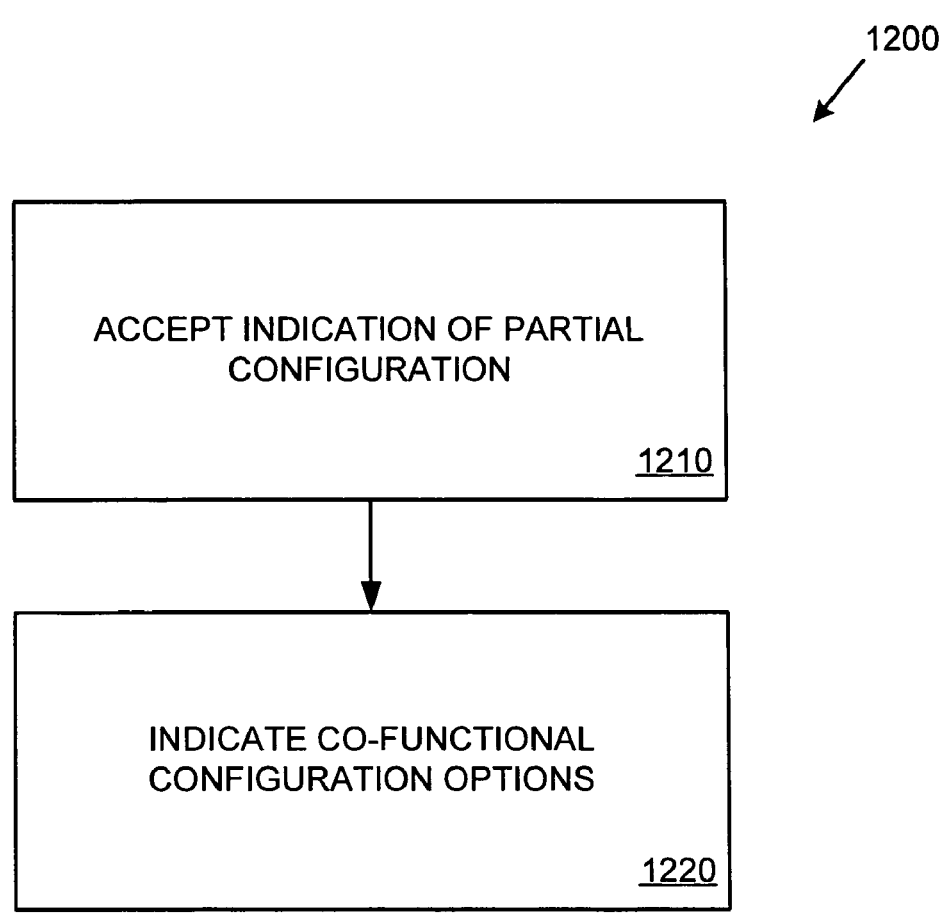
FIG. 12 is a flowchart showing an exemplary method for performing configuration via a transactional approach with feedback from a server perspective.

FIG. 12 shows an exemplary method 1200 for performing configuration with feedback from a server perspective. The method can operate via the arrangement shown in FIG. 11. At 1210, an indication of a partial video network presenting configuration is received. For example, the partial configuration can indicate a configuration for a first resource of the video presenting network.

At 1220, co-functional configuration options are indicated (e.g., as described for FIG. 11A or 11B, above). Alternatively, all configuration options may be indicated with the exception of one or more non-co-functional configuration options, which would be removed from the options indicated before the options are indicated. The method can also include a commit (not shown) by which the configuration is committed to the video presenting network.

Figure 13:
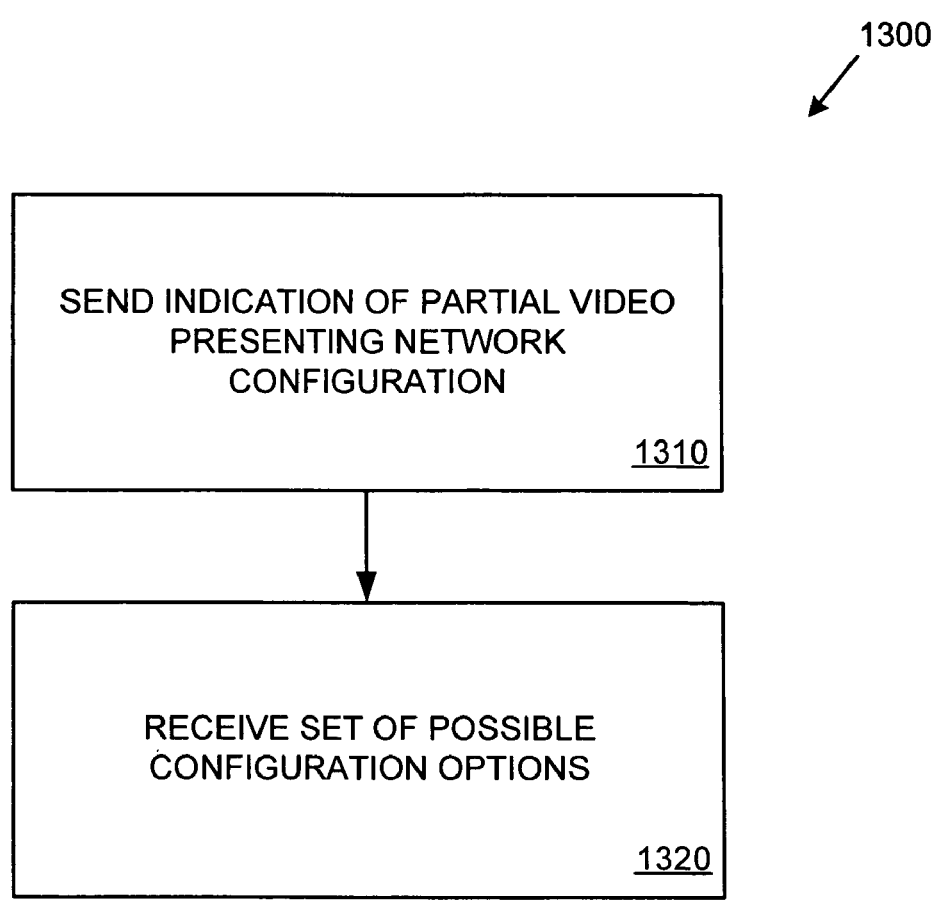
FIG. 13 is a flowchart showing an exemplary method for performing configuration via a transactional approach with feedback from a client perspective.

FIG. 13 shows an exemplary method 1300 for performing configuration with feedback from a client perspective. The method can operate via the arrangement shown in FIG. 11. At 1310, an indication of a partial video presenting network configuration is sent. For example, the partial configuration can indicate a configuration for a first resource of the video presenting network.

At 1320, a set of co-functional configuration options (e.g., as described for FIG. 11A or 11B, above) are indicated. Again, the method can also include a commit (not shown) by which the configuration is committed to the video presenting network.

Example 18

Exemplary Server Implementation in Video Driver

Determining co-functional configuration options can be delegated to a video driver. In any of the examples described herein, actions performed by the server can be performed by a video driver (e.g., a video miniport).

Figure 14:
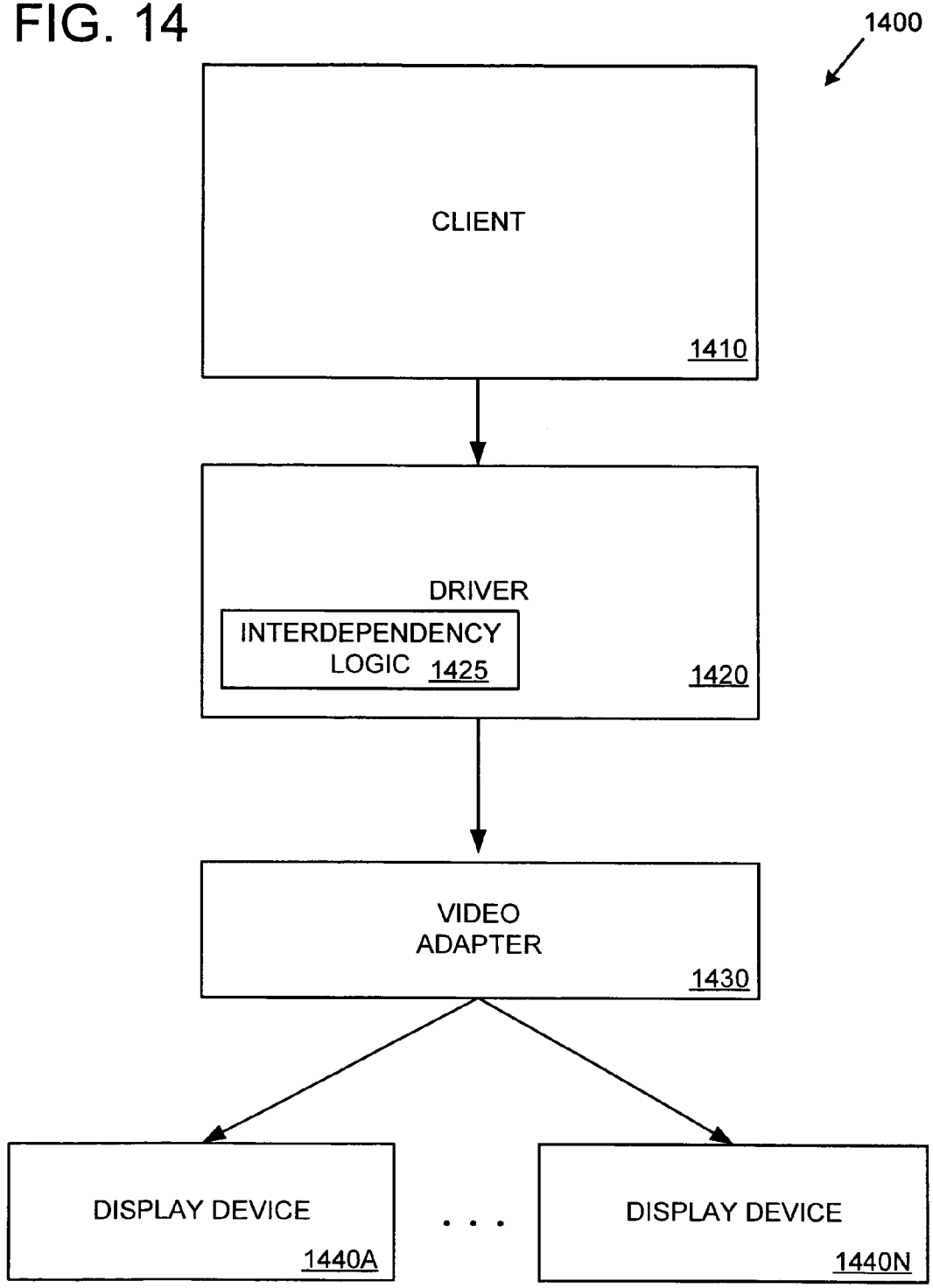
FIG. 14 is a block diagram showing an exemplary architecture in which provisional configuration can be implemented.

FIG. 14 shows an exemplary architecture 1400 in which provisional configuration with feedback can be implemented. The example includes a client 1410 (e.g., an operating system, such as the graphics subsystem, an application, or the like), a driver 1420 (e.g., a device-specific video driver operating in kernel mode) with interdependency logic 1425, and a video adapter 1430, which provides video output to plural display devices 1440A-1440N.

The video driver 1420 can serve as a server in any of the examples described herein. The interdependency logic 1425 can include functions for accepting partial configurations, enumerating co-functional configuration options, and committing a configuration.

In this way, a hardware vendor of a display adapter can develop an appropriate driver 1420 that incorporates the appropriate interdependency logic 1425 to aid in determining a desirable video presenting network configuration.

Example 19

Exemplary Advantages

Implementing interdependency logic in a video driver, as discussed above in Example 18, can simplify determining an appropriate configuration by reducing the scope for a given hardware implementation with a certain set of limitations. If the logic were instead in the operating system, the task can be more complex (e.g., need to be completely generic and support every possible interdependency).

Example 20

Exemplary Configuration of Video Presenting Network

Figure 15:
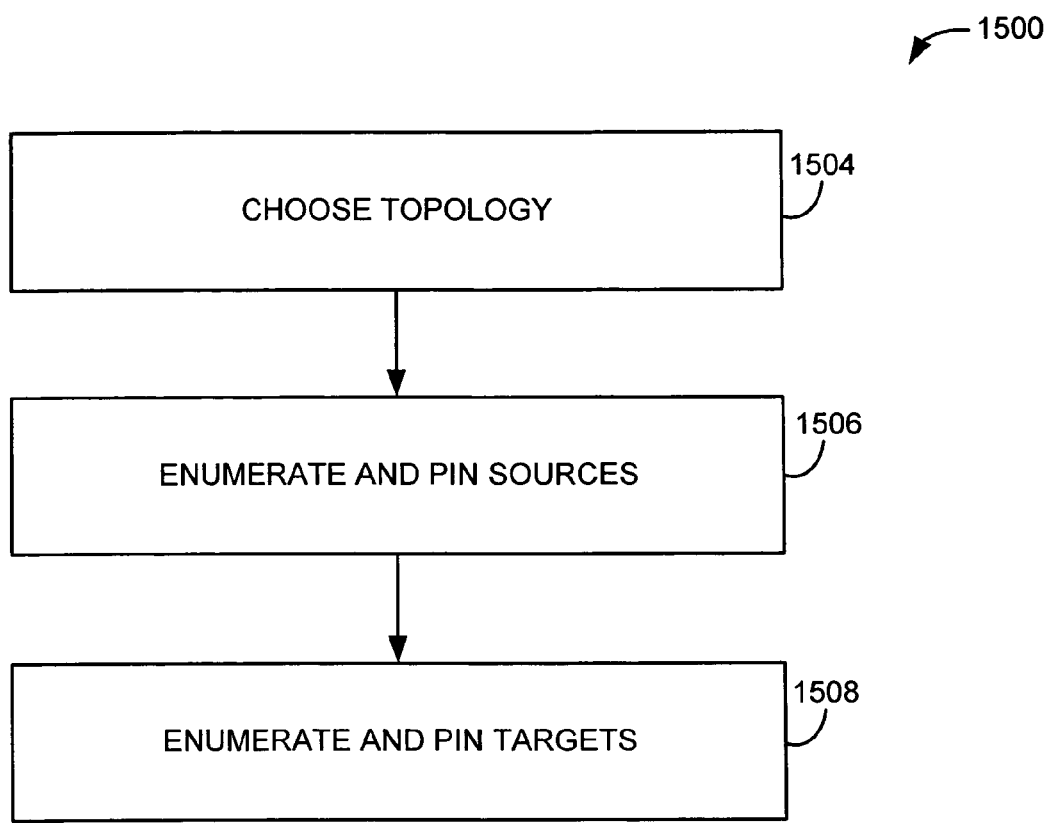
FIG. 15 is a flowchart showing an exemplary method of configuring a video presenting network.

FIG. 15 shows an exemplary method 1500 for configuration of a video presenting network via partial configuration. At 1504, a topology for the video presenting network is chosen. At 1506, configurations options for the sources are enumerated and pinned. At 1508, configuration options for the targets are enumerated and pinned. A commit (not shown) can be used to implement the configuration.

In any of the examples herein, although sources are sometimes shown as pinned before targets, such need not be the case. For example, targets can be pinned before sources.

Example 21

Figure 16:
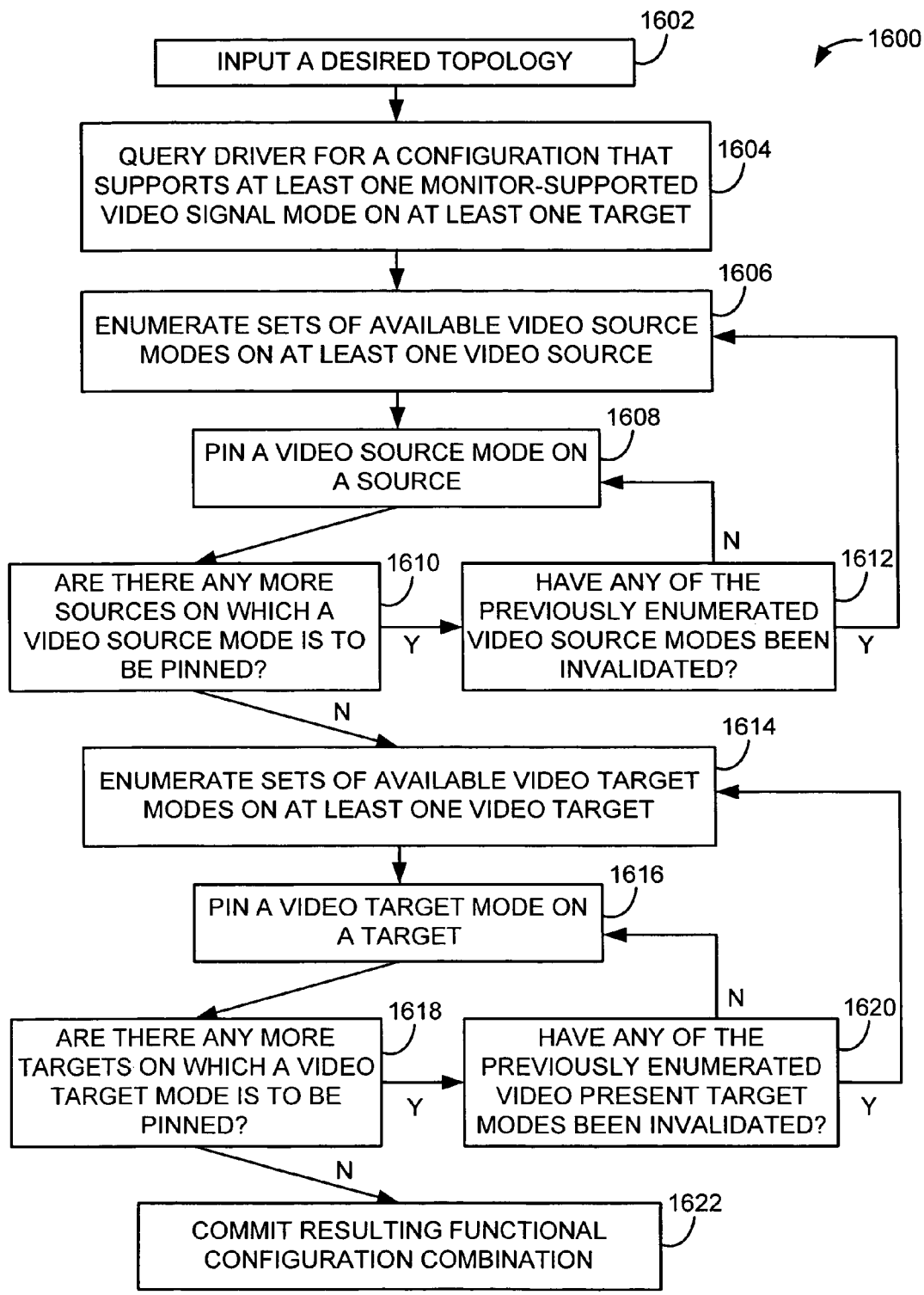
FIG. 16 is a flowchart showing an exemplary method of finding a desired configuration by systematic traversal of the solution space to converge on a desired configuration.

Exemplary Traversal of Solution Space to Converge on Functional Configuration FIG. 16 shows a flowchart of an exemplary method 1600 of traversing a graph of possible functional multiple video output configuration combinations. Such a method can be used by a client (e.g., the client 1410) interacting with a server (e.g., video driver 1420). The example shows a video miniport, but another video driver (e.g., video driver 1420) can be used.

The example also includes a fixed topology functional video presenting network configuration search, but other examples may include an option of changing the topology during the search. For example, a topology may be desired to be changed after the pinning of a video present source mode on a video presenting network source invalidates at least one other video present source mode for another video presenting network source.

At 1602, a desired video presenting network topology has been selected.

At 1604, given the desired video presenting network topology, a video miniport is queried for a video presenting network configuration (e.g., topology) that supports at least one monitor-supported video signal mode (e.g., all modes) on at least one video presenting network target (e.g., all targets).

At 1606, the sets of available video present source modes on at least one video present source (e.g., all sources) in the obtained video presenting network configuration (e.g., topology) are enumerated.

At 1608, a video present source mode is pinned on at least one video presenting network source (e.g., all sources).

At 1610, it is determined whether there are any more video presenting network sources on which a video present source mode is to be pinned. If there is another video presenting network source to be pinned, the process proceeds to 1612. Otherwise, the process proceeds to 1614.

At 1612, it is determined whether any of the previously enumerated video present source modes has been invalidated. If so, the process returns to 1606. If not, the process returns to 1608. In the example, at least one of the previously enumerated video present source modes can be invalidated based on the selection of another video present source mode, but not all of the video present source modes can be invalidated by such a selection.

At 1614, the sets of available video present target modes on at least one video present target (e.g., all targets) in the obtained video presenting network configuration are enumerated.

At 1616, a video present target mode is pinned on at least one video presenting network target (e.g., all targets).

At 1618, it is determined whether there are any more video presenting network targets on which a video present target mode is to be pinned. If there is another video presenting network target to be pinned, the process proceeds to 1620. Otherwise, the process proceeds to 1622.

At 1620, it is determined whether any of the previously enumerated video present target modes has been invalidated. If so, the process returns to 1614. If not, the process returns to 1616.

At 1622, a resulting functional video presenting network configuration combination is committed.

Example 22

Figure 17A:
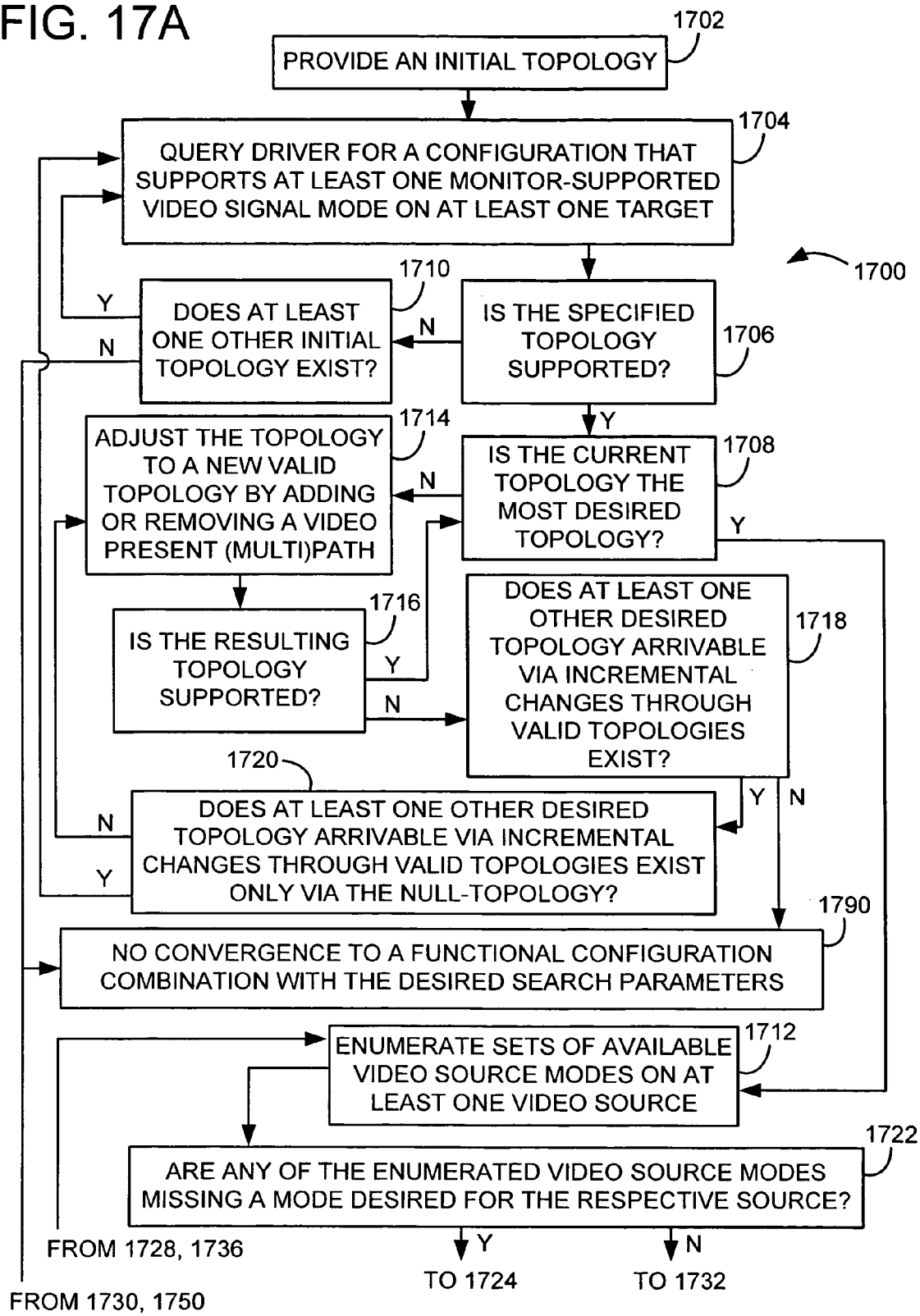
FIGS. 17A-B are a flowchart showing a first exemplary detailed method of finding a desired configuration by systematic traversal of the solution space to converge on a desired configuration.
Figure 17B:
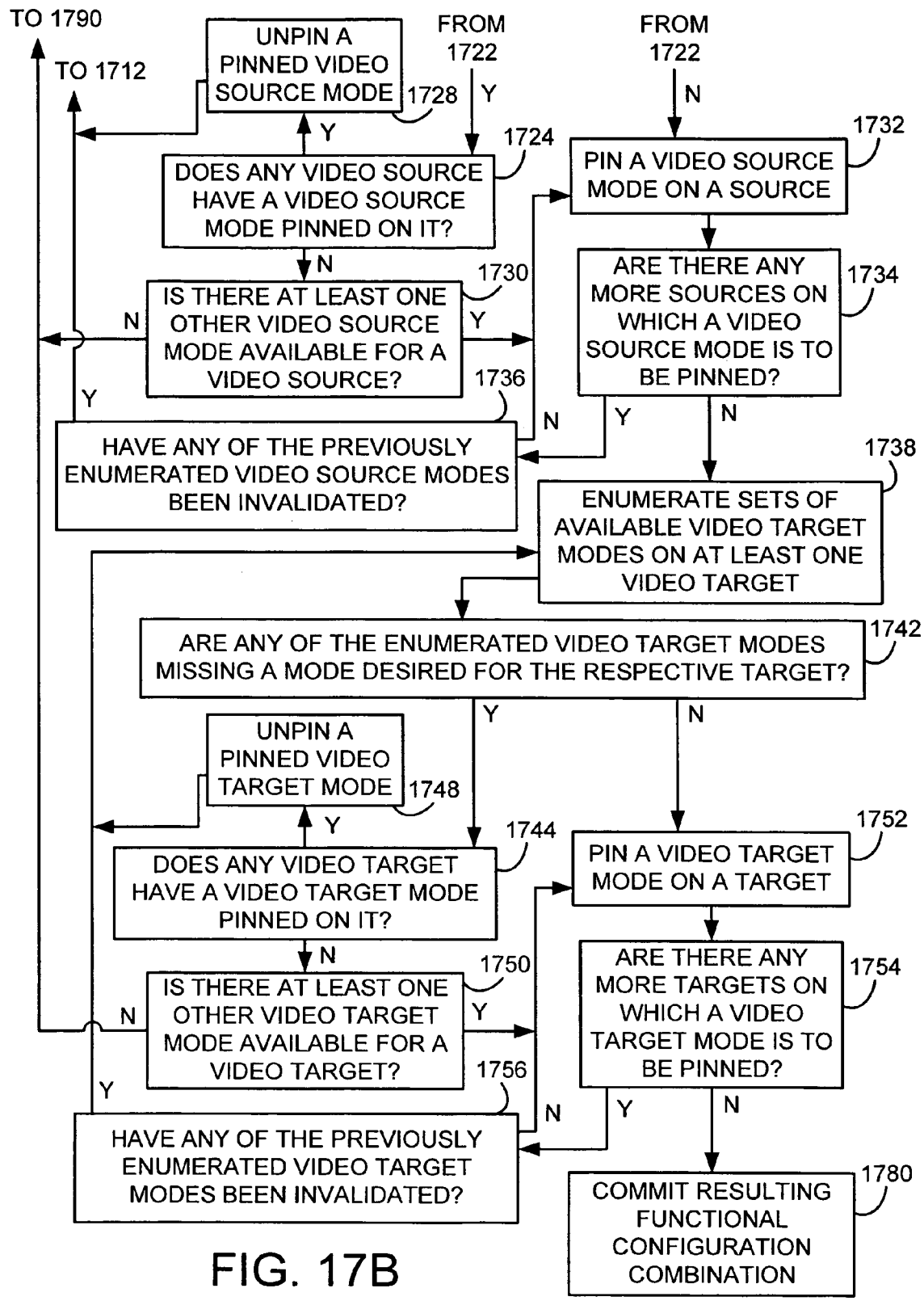

First Exemplary Detailed Traversal of Solution Space to Converge on Functional Configuration FIGS. 17A-B show a flowchart of a first exemplary detailed method 1700 of traversing a graph of possible functional multiple video output configuration combinations. Such a method can be used by a client (e.g., the client 1410) interacting with a server (e.g., video driver 1420). The example shows a video miniport, but another video driver (e.g., video driver 1420) can be used.

At 1702, an initial video presenting network topology has been provided.

At 1704, given the initial video presenting network topology, a video miniport is queried for a video presenting network configuration (e.g., toplogy) that supports at least one monitor-supported video signal mode (e.g., all modes) on at least one video presenting network target (e.g., all targets).

At 1706, a determination is made as to whether the video presenting network topology specified by the query of 1704 is supported. If the specified video presenting network topology is supported, then the process proceeds to 1708. Otherwise, the process proceeds to 1710.

At 1708, a determination is made as to whether the current video presenting network topology is the most desired video presenting network topology. If it is, then the process proceeds to 1712. Otherwise, the process proceeds to 1714.

At 1710, a determination is made as to whether at least one other initial video presenting network topology exists. If so, then the process returns to 1704. Otherwise, the process terminates at 1790 because there is no convergence to a functional configuration combination with the desired search parameters.

At 1712, the sets of available video present source modes on at least one video presenting network source (e.g., all sources) in the obtained video presenting network configuration are enumerated. The process then proceeds to 1722.

At 1714, the video presenting network topology is adjusted to a new valid video presenting network topology by the addition or removal of a video presenting path (e.g., multipath). The process then proceeds to 1716, where a determination is made as to whether the new valid video presenting network topology is supported. If so, then the process returns to 1708. Otherwise, the process proceeds to 1718.

At 1718, a determination is made as to whether there is at least one other desired video presenting network topology that can be obtained by incremental changes through valid video presenting network topologies. If so, the process proceeds to 1720. Otherwise, the process terminates at 1790.

At 1720, a determination is made as to whether another desired video presenting network topology is obtainable only by the null topology (e.g., the topology cannot be further adjusted). If so, the process returns to 1704. Otherwise, the process returns to 1714.

At 1722, a determination is made as to whether any of the enumerated video present source modes are missing a mode desired for the respective video presenting network source. If so, the process proceeds to 1724. Otherwise, the process proceeds to 1732.

At 1724, a determination is made as to whether any video presenting network sources have a video present source mode pinned. If so, the process proceeds to 1728, where a pinned video present source mode is unpinned, and then back to 1712. Otherwise, the process proceeds to 1730. The video present source mode unpinning at 1728 can be ordered according to video presenting network source importance (e.g., the source modes can be prioritized from most to least important).

At 1730, a determination is made as to whether there is at least one other video present source mode available for a video presenting network source. If so, the process returns to 1732, where a video present source mode is pinned on at least one video presenting network source (e.g., for all sources), and then to 1734. Otherwise, the process terminates at 1790. The video present source mode pinning at 1732 can be ordered according to video presenting network source importance (e.g., the source modes can be prioritized from most to least important).

At 1734, it is determined whether there are any more video presenting network sources on which a video present source mode is to be pinned. If there is another video presenting network source to be pinned, the process proceeds to 1736. Otherwise, the process proceeds to 1738.

At 1736, it is determined whether any of the previously enumerated video present source modes has been invalidated. If so, the process returns to 1712. If not, the process returns to 1732.

At 1738, the sets of available video present target modes on at least one video presenting network target (e.g., all targets) in the obtained video presenting network configuration are enumerated.

At 1742, a determination is made as to whether any of the enumerated video present targets modes are missing a mode desired for the respective video presenting network target. If so, the process proceeds to 1744. Otherwise, the process proceeds to 1752.

At 1744, a determination is made as to whether any video presenting network target has a video present target mode pinned on it. If so, the process proceeds to 1748, where a pinned video present target mode is unpinned, and then back to 1738. Otherwise, the process proceeds to 1750. The video present target mode unpinning at 1748 can be ordered according to video presenting network target importance (e.g., the target modes can be prioritized from most to least important).

At 1750, a determination is made as to whether there is at least one other video present target mode available for a video presenting network target. If so, the process returns to 1752, where a video present target mode is pinned on at least one video presenting network target (e.g., for all targets), and then to 1754. Otherwise, the process terminates at 1790. The video present target mode pinning at 1752 can be ordered according to video presenting network target importance (e.g., the target modes can be prioritized from most to least important).

At 1754, it is determined whether there are any more video presenting network targets on which a video present target mode is to be pinned. If there is another video presenting network target to be pinned, the process proceeds to 1756. Otherwise, the process proceeds to 1780.

At 1756, it is determined whether any of the previously enumerated video present target modes has been invalidated. If so, the process returns to 1738. If not, the process returns to 1752.

At 1780, a resulting functional video presenting network configuration combination is committed.

Example 23

Figure 18A:
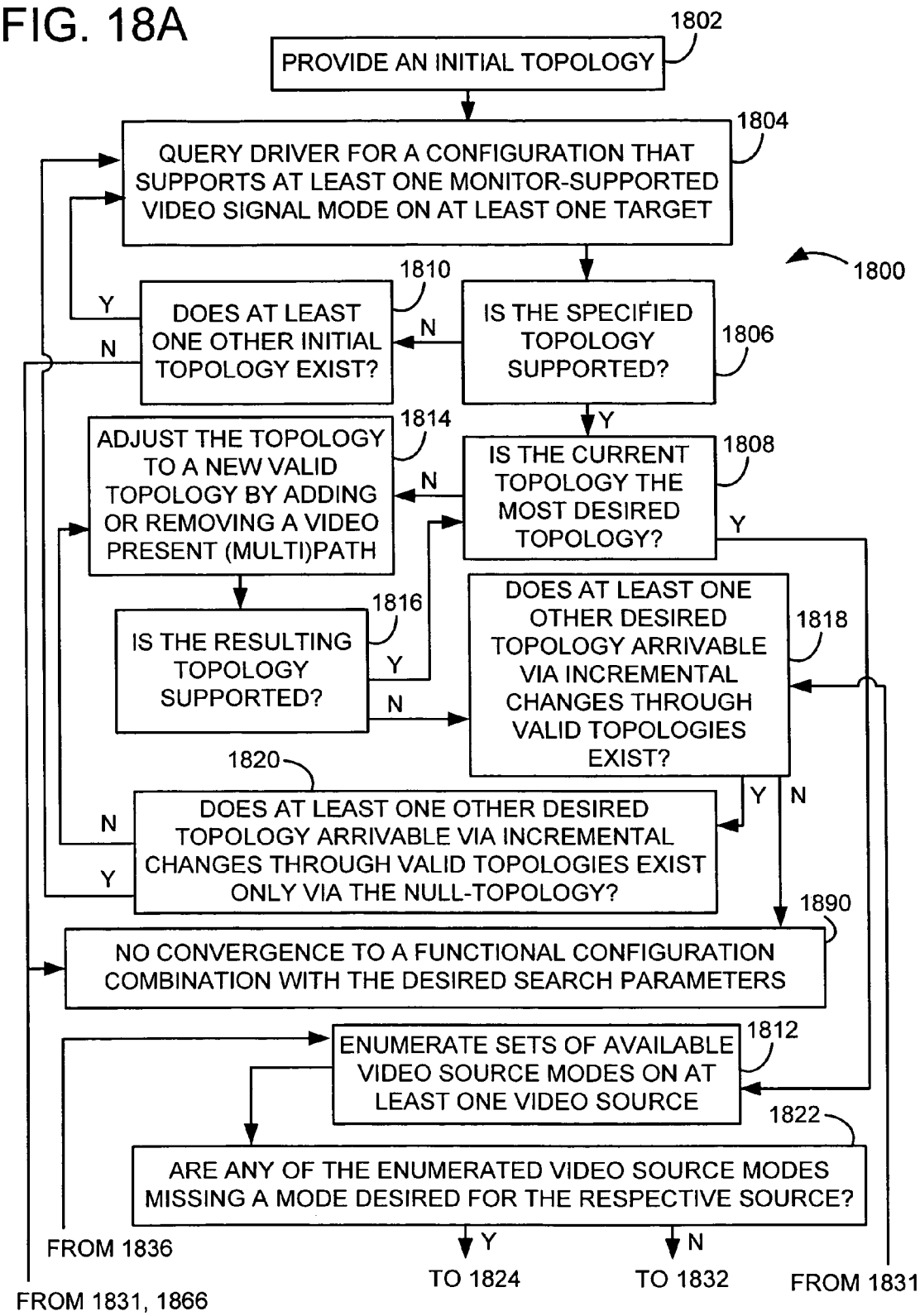
FIGS. 18A-C are a flowchart showing a second exemplary detailed method of finding a desired configuration by systematic traversal of the solution space to converge on a desired configuration.
Figure 18B:
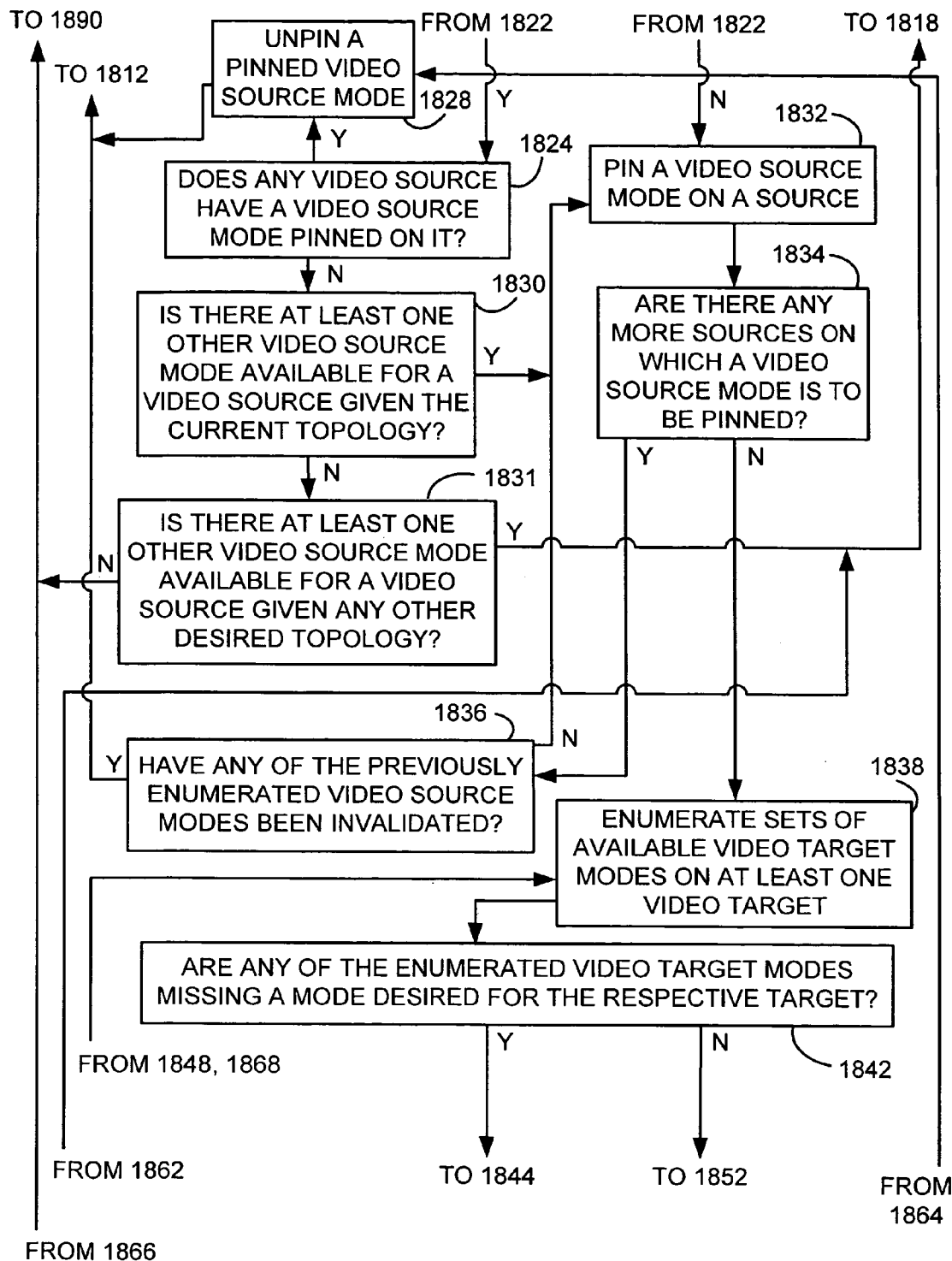
Figure 18C:
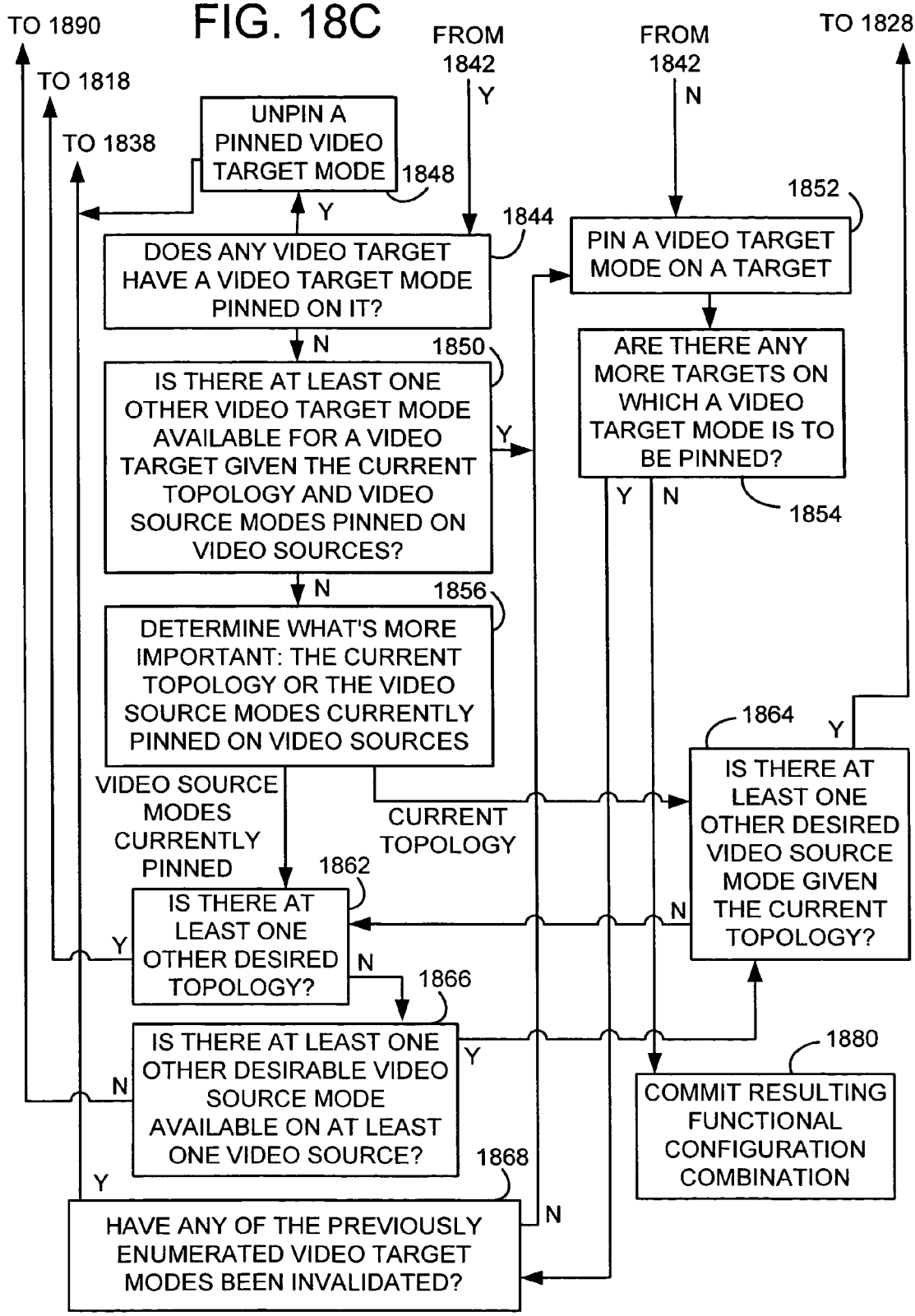

Second Exemplary Detailed Traversal of Solution Space to Converge on Functional Configuration FIGS. 18A-C shows a flowchart of a first exemplary detailed method 1800 of traversing a graph of possible functional multiple video output configuration combinations. Such a method can be used by a client (e.g., the client 1410) interacting with a server (e.g., video driver 1420). The example shows a video miniport, but another video driver (e.g., video driver 1420) can be used.

At 1802, an initial video presenting network topology has been provided.

At 1804, given the initial video presenting network topology, a video miniport is queried for a video presenting network configuration (e.g., topology) that supports at least one monitor-supported video signal mode (e.g., all modes) on at least one video presenting network target (e.g., all targets).

At 1806, a determination is made as to whether the video presenting network topology specified by the query of 1804 is supported. If the specified video presenting network topology is supported, then the process proceeds to 1808. Otherwise, the process proceeds to 1810.

At 1808, a determination is made as to whether the current video presenting network topology is the most desired video presenting network topology. If it is, then the process proceeds to 1812. Otherwise, the process proceeds to 1814.

At 1810, a determination is made as to whether at least one other initial video presenting network topology exists. If so, then the process returns to 1804. Otherwise, the process terminates at 1890 because there is no convergence to a functional configuration combination with the desired search parameters.

At 1812, the sets of available video present source modes on at least one video presenting network source (e.g., all sources) in the obtained video presenting network configuration are enumerated. The process then proceeds to 1822.

At 1814, the video presenting network topology is adjusted to a new valid video presenting network topology by the addition or removal of a video presenting path (e.g., multipath). The process then proceeds to 1816, where a determination is made as to whether the new valid video presenting network topology is supported. If so, then the process returns to 1808. Otherwise, the process proceeds to 1818.

At 1818, a determination is made as to whether there is at least one other desired video presenting network topology that can be obtained by incremental changes through valid video presenting network topologies. If so, the process proceeds to 1820. Otherwise, the process terminates at 1890.

At 1820, a determination is made as to whether another desired video presenting network topology is obtainable only by the null topology (e.g., the topology cannot be further adjusted). If so, the process returns to 1804. Otherwise, the process returns to 1814.

At 1822, a determination is made as to whether any of the enumerated video present source modes are missing a mode desired for the respective video presenting network source. If so, the process proceeds to 1824. Otherwise, the process proceeds to 1832.

At 1824, a determination is made as to whether any video presenting network sources have a video present source mode pinned. If so, the process proceeds to 1828, where a pinned video present source mode is unpinned, and then back to 1812. Otherwise, the process proceeds to 1830. The video present source mode unpinning at 1828 can be ordered according to video presenting network source importance (e.g., the source modes can be prioritized from most to least important).

At 1830, a determination is made as to whether there is at least one other video present source mode available for a video presenting network source. If so, the process returns to 1832, where a video present source mode is pinned on at least one video presenting network source (e.g., for all sources), and then to 1834. Otherwise, the process proceeds to 1831. The video present source mode pinning at 1832 can be ordered according to video presenting network source importance (e.g., the source modes can be prioritized from most to least important).

At 1831, a determination is made as to whether there is at least one other video present source mode available for a video presenting network source given any other desired video presenting network topology. If so, the process returns to 1818. Otherwise, the process terminates at 1890.

At 1834, it is determined whether there are any more video presenting network sources on which a video present source mode is to be pinned. If there is another video presenting network source to be pinned, the process proceeds to 1836. Otherwise, the process proceeds to 1838.

At 1836, it is determined whether any of the previously enumerated video present source modes has been invalidated. If so, the process returns to 1812. If not, the process returns to 1832.

At 1838, the sets of available video present target modes on at least one video presenting network target (e.g., all targets) in the obtained video presenting network configuration are enumerated.

At 1842, a determination is made as to whether any of the enumerated video present targets modes are missing a mode desired for the respective video presenting network target. If so, the process proceeds to 1844. Otherwise, the process proceeds to 1852.

At 1844, a determination is made as to whether any video presenting network target has a video present target mode pinned on it. If so, the process proceeds to 1848, where a pinned video present target mode is unpinned, and then back to 1838. Otherwise, the process proceeds to 1850. The video present target mode unpinning at 1848 can be ordered according to video presenting network target importance (e.g., the target modes can be prioritized from most to least important).

At 1850, a determination is made as to whether there is at least one other video present target mode available for a video presenting network target given the current video presenting network topology and video present source modes pinned on video presenting network sources. If so, the process returns to 1852, where a video present target mode is pinned on at least one video presenting network target (e.g., for all targets), and then to 1854. Otherwise, the process proceeds to 1856. The video present target mode pinning at 1852 can be ordered according to video presenting network target importance (e.g., the target modes can be prioritized from most to least important).

At 1854, it is determined whether there are any more video presenting network targets on which a video present target mode is to be pinned. If there is another video presenting network target to be pinned, the process proceeds to 1868. Otherwise, the process proceeds to 1880.

At 1856, a determination is made as to what is considered to be more important: the current video presenting network topology or the video present source modes currently pinned on video presenting network sources. If the video present source modes currently pinned on video presenting network sources are considered to be more important, the process proceeds to 1862. If the current video presenting network topology is considered to be more important, the process proceeds to 1864.

At 1862, it is determined whether there is at least one other desired video presenting network topology. If so, the process returns to 1818. If not, the process proceeds to 1866.

At 1864, a determination is made as to whether there is at least one other desired video present source mode given the current video presenting network topology. If so, the process returns to 1828. Otherwise, the process proceeds to 1862.

At 1866, a determination is made as to whether there is at least one other desirable video present source mode available on at least one video presenting network source. If so, the process proceeds to 1864. Otherwise, the process terminates at 1890.

At 1868, it is determined whether any of the previously enumerated video present target modes has been invalidated. If so, the process returns to 1838. If not, the process returns to 1852.

At 1880, a resulting functional video presenting network configuration combination is committed.

Example 24

Exemplary Method of Achieving Goal Configuration

Figure 19:
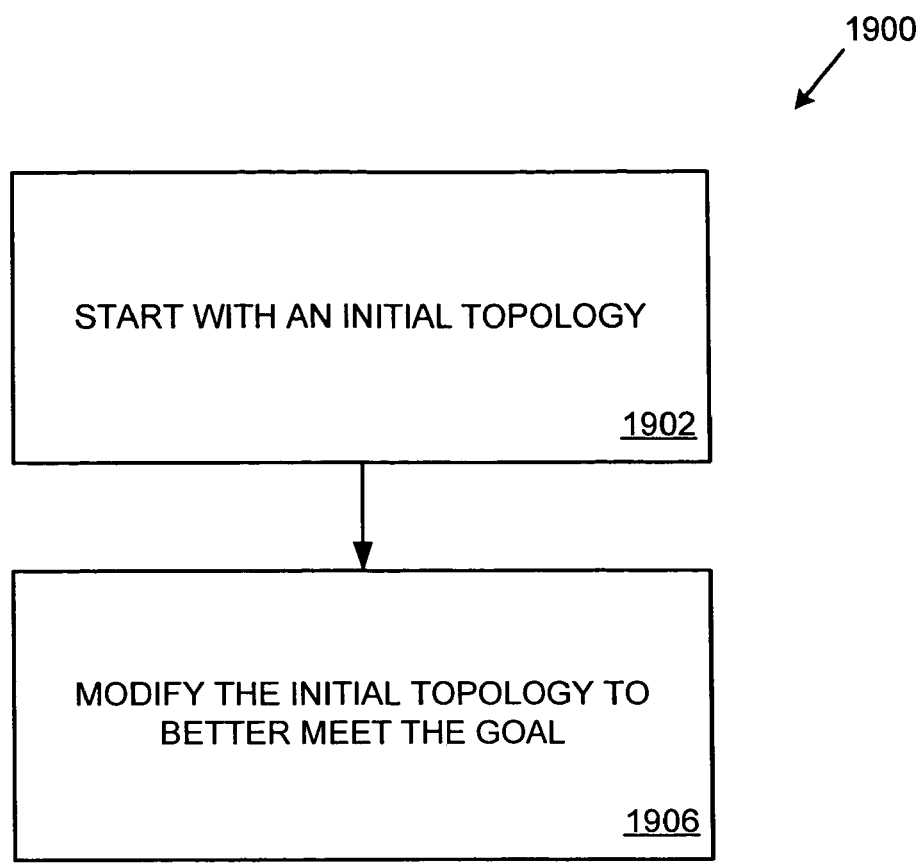
FIG. 19 is a flowchart showing an exemplary method of determining a topology for a video presenting network.

FIG. 19 shows a flowchart showing an exemplary method 1900 of determining a topology for a video presenting network in light of a goal (e.g., stated in terms of video modes supported by monitors).

At 1902, the process starts with an initial topology. At 1906, the initial topology is modified to better meet the goal (e.g., by generating a provisional functional configuration better meeting the goal). Such modifications can take into account interdependencies among resources of the video presenting network.

Possible goals can relate to video modes or other configuration options. For example, a goal can be the best way to route video presenting network targets to video presenting network sources in a video presenting network through the available video output codecs to maximize supported graphics video presenting network source mode sets on its video presenting network sources, given that video mode sets on the video presenting network targets must support preferred modes on all the monitors connected to them. Or, if such a goal cannot be attained, the goal can be the best way to route video presenting network targets to video presenting network sources in a video presenting network through the available video output codecs to maximize supported graphics video presenting network source mode sets on its video presenting network sources, given that video mode sets on the video presenting network targets must support preferred modes on the monitors connected to them in a specified prioritization ordering. Or, if such a goal cannot be attained, the goal can be the best way to route video presenting network targets to video presenting network sources in a video presenting network through the available video output codecs to maximize supported graphics video presenting network source mode sets on its video presenting network sources, given that video mode sets on the video presenting network targets must support at least one of the video modes supported by the monitors connected to them.

If desired, a first goal can be attempted. Then, if the first goal cannot be met, a second goal can be attempted, and so forth. A goal is sometimes described as an "optimal" configuration.

Example 25

Exemplary Additional Goals

In addition to the goals described above, other configuration goals may be desired and can be facilitated by the technologies described herein. For example, it might be of interest to achieve the following, separately or in some combination:
 1. Maximize the special resolution on the render targets
 2. Maximize the color resolution on the render targets
 3. Maximize both spatial and color resolutions on one of the render targets (e.g., for medical imaging applications, computer assisted design, and the like).
 4. Match refresh rates on the monitors displaying a view which contains a real-time television broadcast presentation to avoid video stream synchronization issues. Such synchronization issues can manifest themselves as artifacts, dropped frames (e.g., glitches), or both.
 5. Conserve the video memory bandwidth as much as possible by driving views at lowest rendering modes acceptable to boost 3D performance, assuming one or more GPUs are competing for the same video memory bus.

Because such goals are beyond the scope of a simple video driver, such goals can be achieved by placing decision-making ability outside of the video driver (e.g., in the upper layers of the operating system, such as in the shell, graphics subsystem, DX runtime, and the like).

Due to the sheer amount of possible rendering modes, a driver can not simply enumerate them. A query or a traversal approach (e.g., such as described in the examples herein) can be used to achieve configuration goals.

Still other goals can be classified as follows:
 1. In a mode optimized for image quality, one cares most about displaying the image to the best degree possible.
 2. In a mode optimized for performance, one cares most about not overloading the video memory bus (e.g., each codec has to read from the video memory, and thus consumes video memory bandwidth).
 3. In a mode optimized for power consumption, one may want to choose the codec which consumes the least power, even if it can not drive preferred modes on either of two monitors, turning all other codecs off.

Typically, an implicit goal in any configuration is that the video outputs support at least one mode supported by the respective monitor. Unless overridden by performance or power management considerations, it is typically a further goal that video outputs try to support preferred modes of their respective monitors, where the monitor's importance is prioritized by the client (e.g., operating system) as part of the configuration request.

For example, the present the same render target on multiple views (e.g., clone view), the video driver should attempt to have as many monitors to run in their preferred modes, only sharing codecs when doing otherwise means one of the requested outputs can not be driven.

For example, in a case involving three video outputs, but only two codecs, it might be acceptable to share a codec when asked to support all three outputs, even if at least one of the monitors might not be running in its preferred mode. However, when asked to support only two of the outputs, a codec should not be shared if preferred modes can be achieved on both monitors by not sharing a codec.

Example 26

Exemplary Goals Related to Power Consumption

In some scenarios, it may be desirable to specify goals with respect to power consumption. For example, a configuration with smaller power consumption may be preferred for economy power states, and performance and/or image quality may be preferred when in full-power states. In any of the examples herein, such goals can be implemented.

Example 27

Exemplary Device Driver Interface

Example 45 lists a set of functions (e.g., EnumerateAvailVidPNTargets, ConstrainNodesOnVidPNTargets, etc.) and their purposes. Such functions can be included in a device driver interface supported by a video device driver (e.g., a video miniport). The functions can be used by clients to build a video presenting network in incremental fashion, employing various algorithms (e.g., search algorithms).

Example 28

Exemplary Functions for Configuration Management

Example 45 details a set of functions for configuration management. For example, a function (e.g., GetActiveVidPNTopology) identifies a video presenting network configuration (e.g., a topology). Another function (e.g., CommitVidPNImpl) commits a video presenting network configuration. Another function (e.g., EnumCurrentlyAvailVidPNSourceModeSets) enumerates video present source modes available given a desired video presenting network configuration. Another function (e.g., EnumCurrentlyAvailVidPNTargetModeSets) enumerates video present target modes available given a desired video presenting network configuration. Another function (e.g., PinModeOnVidPNSource) pins a video present source mode on a video presenting network source. Another function (e.g., PinModeOnVidPNTarget) pins a video present target mode on a video presenting network target. Another function (e.g., UnpinModeOnVidPNSource) unpins a video present source mode on a video presenting network source. Another function (e.g., UnpinModeOnVidPNTarget) unpins a video present target mode on a video presenting network target. Another function (e.g., CreateVidPNImpl) creates a video presenting network configuration. Any combination of the functions can be implemented as part of a programmatic interface (e.g., a device driver interface). Such an interface can provide access to the functions as a service (e.g., for client programs).

Example 29

Exemplary Calls to Arrive at Configuration

Figure 20:
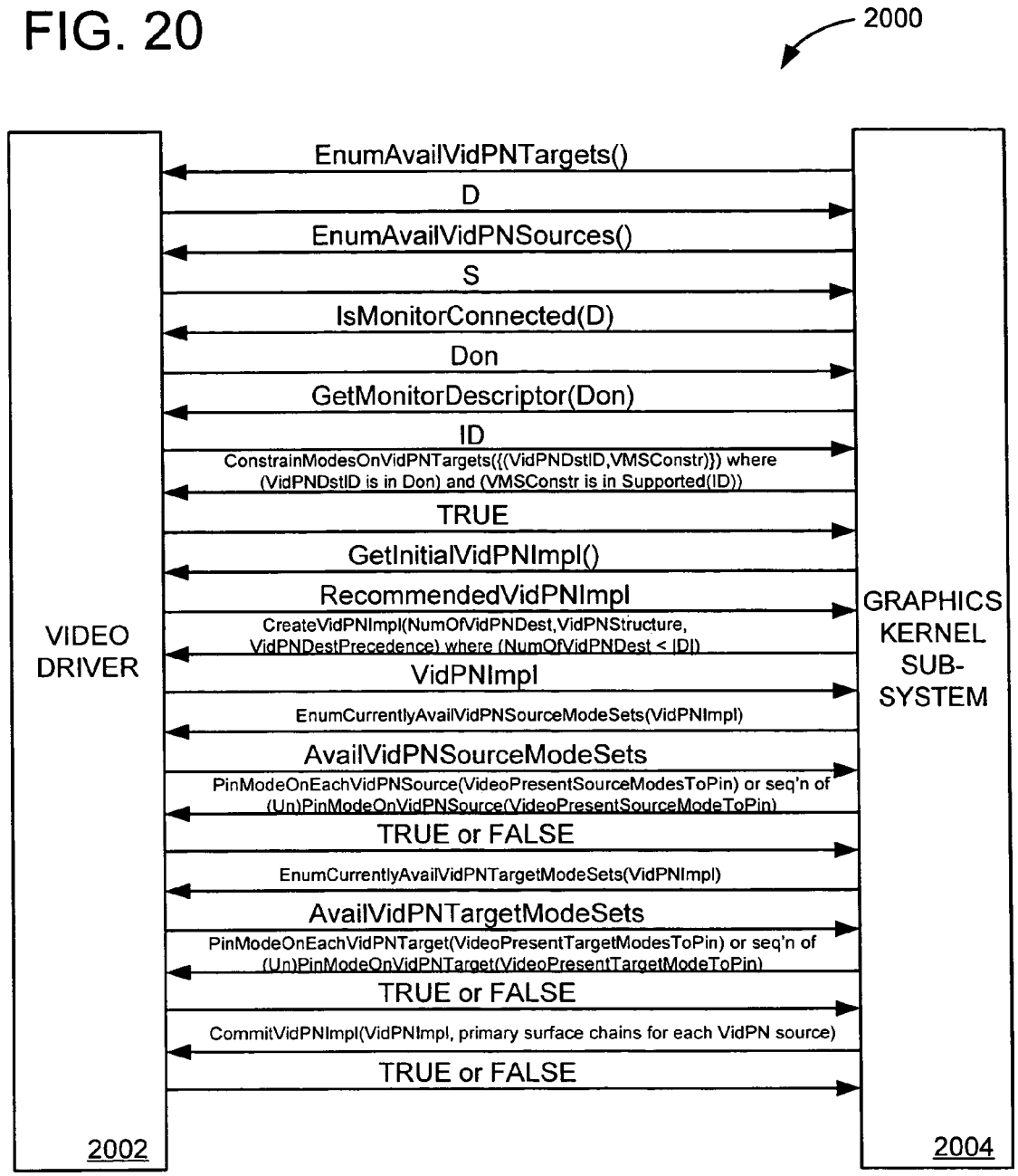
FIG. 20 is a block diagram showing calls between a client and server to arrive at a configuration for a video presenting network.

FIG. 20 shows a block diagram showing exemplary calls to arrive at a configuration. Such calls can be implemented as part of a device driver interface (DDI).

System 2000 includes communication between a driver 2002 (e.g., video miniport) and a graphics kernel subsystem 2004. Given a specified video presenting network configuration, EnumAvailVidPNTargets can be called to enumerate available video presenting network targets supported by a given video card. EnumAvailVidPNSources can be called to enumerate available video presenting network sources supported by the given video card. These two calls can be part of a system initialization. Alternatively, these two calls can be part of a video adapter arrival event (e.g., PCI express or docking station hot-plug). In some situations, a null video presenting network configuration modality can be supported, signifying that all available video presenting targets and sources should be reported (e.g., as is appropriate for initialization).

IsMonitorConnected can be used to determine which of the enumerated video presenting targets have a monitor connected to them. GetMonitorDescriptor can be called for each of the connected monitors to obtain each respective monitor's descriptor. ConstrainModesOnVidPNTargets can be called to set video mode constraints on each of the enumerated video presenting targets in line with the monitor capabilities obtained from the monitors' descriptors.

During video presenting network construction, GetInitialVidPNImpl can optionally be called to obtain a video presenting network provisional configuration recommended by the video miniport. CreateVidPNImpl can be called to create a video presenting network provisional configuration based on the optional recommendation by the video miniport. Alternatively, CreateVidPNImpl can create a video presenting network provisional configuration disregarding the optional recommendation by the miniport.

EnumCurrentlyAvailVidPNSourceModeSets, PinModeOnVidPNSource, and UnpinModeOnVidPNSource can be called until video presenting source modes are pinned on the video presenting network sources, as part of creating a semi-functional video presenting network. If video presenting source modes to be pinned are known to work for the video presenting network sources, PinModeOnEachVidPNSource can be called to pin video presenting source modes on all the video presenting network sources at once.

EnumCurrentlyAvailVidPNTargetModeSets, PinModeOnVidPNTarget, and UnpinModeOnVidPNTarget can be called until video presenting target modes are pinned on the video presenting network targets, as part of completing a functional video presenting network. If video presenting target modes to be pinned are known to work for the video presenting network targets, PinModeOnEachVidPNTarget can be called to pin video presenting target modes on all the video presenting network targets at once.

To commit a video presenting network provisional configuration, CommitVidPNImpl may be called. A functional video presenting network provisional configuration may be committed after primary surface chains have been set up for each source in the video presenting network. CommitVidPNImpl might require as input other OS-owned resources outside of the video presenting network topology and video presenting sources and targets (e.g., primary surface chains).

Example 30

Exemplary Separation of Video Output and Render Target

An interface that a video rendering device driver exposes (e.g., to an operating system, and thus indirectly to applications running on the operating system) need not differentiate between the notion of a video output on which the video rendering device is physically driving the displayed image and a render target to which the application is logically rendering the content it wants to be presented as two separate, independent entities. The render target can be implicitly and statically associated with each video output on the video rendering device. However, such an approach can be limiting.

In any of the examples described herein, an explicit notion of a render target can be supported through the notion of a rendering mode. A display mode that is the basic operational modality descriptor of any device in an operating system can be described as two things: a video mode, which is an output modality descriptor (for an output or target, such as those shown in FIG. 1 or FIG. 25), and a rendering mode, which is an input modality descriptor (for an input or source, such as those shown in FIG. 1 or FIG. 25). Such an approach is particularly useful in system with multiple video outputs. Interfaces to the video driver (e.g., a DDI) can allow separate specification of the video mode and the rendering mode.

Thus, logical render targets can be dynamically managed separately from the physical video outputs. The targets can be mapped to video outputs of choice in run-time, redirecting them from output to output as needed, or even mapping a single render target simultaneously to multiple outputs.

Example 31

Exemplary Management for Monitor Arrival/Departure

Any of the technologies described herein can be applied to scenarios in which a monitor is attached to or removed from a system while it is running. For example, events (e.g., HPD events) can be detected by a system when a monitor arrives or departs from the system, and a configuration can be chosen accordingly. Also, changes to redirect video streams to different outputs (e.g., for clone view, extended desktop management, and the like) can be implemented. Robust support for such dynamic configuration changes can be accomplished by managing logical render targets separately from the physical video outputs as described herein.

Example 32

Exemplary Integration of Technology

In any of the examples described herein, the video display devices can take a variety of forms. For example, FIG. 21 shows an exemplary integration of the technology into a computer system having a plurality of video display devices.

Figure 21:
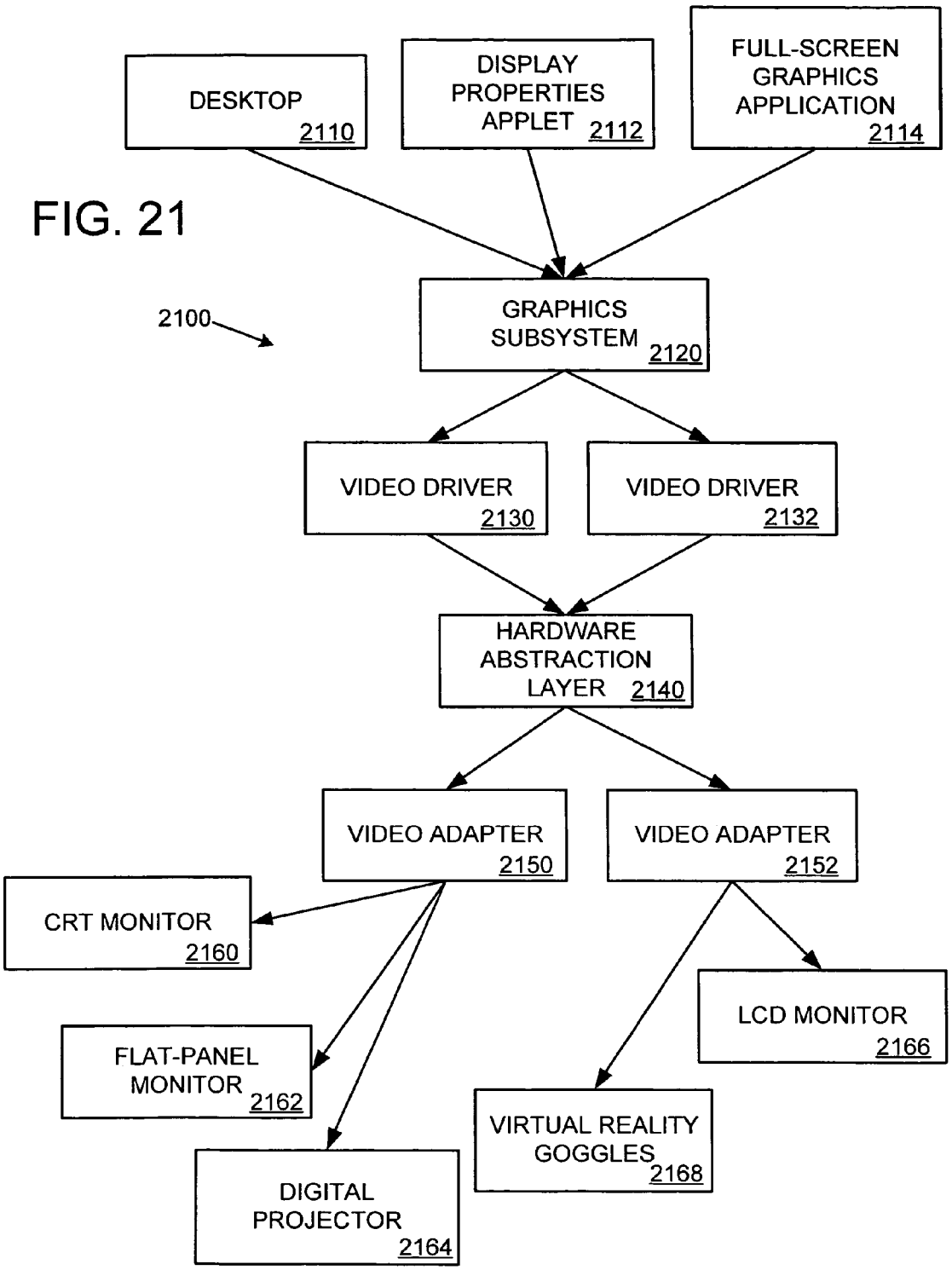
FIG. 21 is a block diagram showing integration of an implementation of the technology into a computer system having a plurality of video display devices.

FIG. 21 is a diagram of an exemplary high-level architecture of a multiple video output device system 2100. A desktop 2110, a display properties applet 2112, and a full-screen graphics application 2114 communicate with a graphics subsystem 2120. The graphics subsystem 2120 drives a video driver 2130 and another video driver 2132. Both video drivers (e.g., video miniports) communicate through a hardware abstraction layer (HAL) 2140 to video adapters 2150 and 2152, which send outputted signals to any combination of multiple video output devices. Such video output devices can include a CRT monitor 2160, a flat-panel monitor 2162, a digital projector 2164, an LCD monitor 2166, a pair of virtual reality goggles 2168, and the like. Other combinations than those shown are possible.

Example 33

Exemplary Traversal of Solution Space to Converge on Desired Configuration

Figure 22:
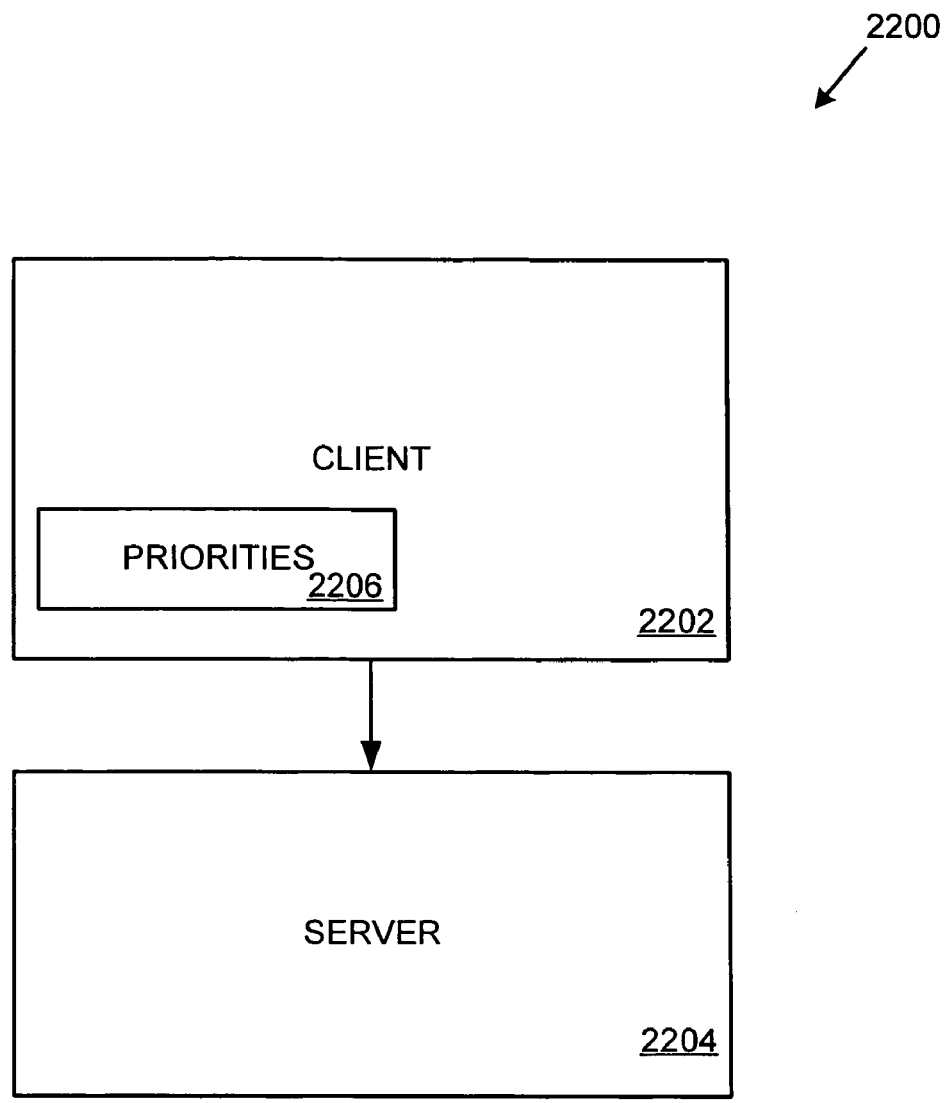
FIG. 22 is a block diagram showing a client-server system that takes priorities into account in determining a desired video configuration.

FIG. 22 shows a client-server system 2200 in which a video configuration is determined based on priorities. A client 2202 communicates with a server 2204. The client 2202 contains priorities 2206 that specify prioritization information.

Such prioritization information can include a list of one or more desired topologies, a list of desired modes for respective sources, a list of desired modes for respective targets, the like, or some combination thereof. Prioritization information can also include whether certain source modes are more important than topology selection. Additionally, the source modes desired and the target modes desired can be prioritized (e.g., from most to least important).

Such priorities can be in the form of a prioritized list. However, the priorities can also be achieved by incorporation into logic (e.g., if-then statements in the client 2202).

Figure 23:
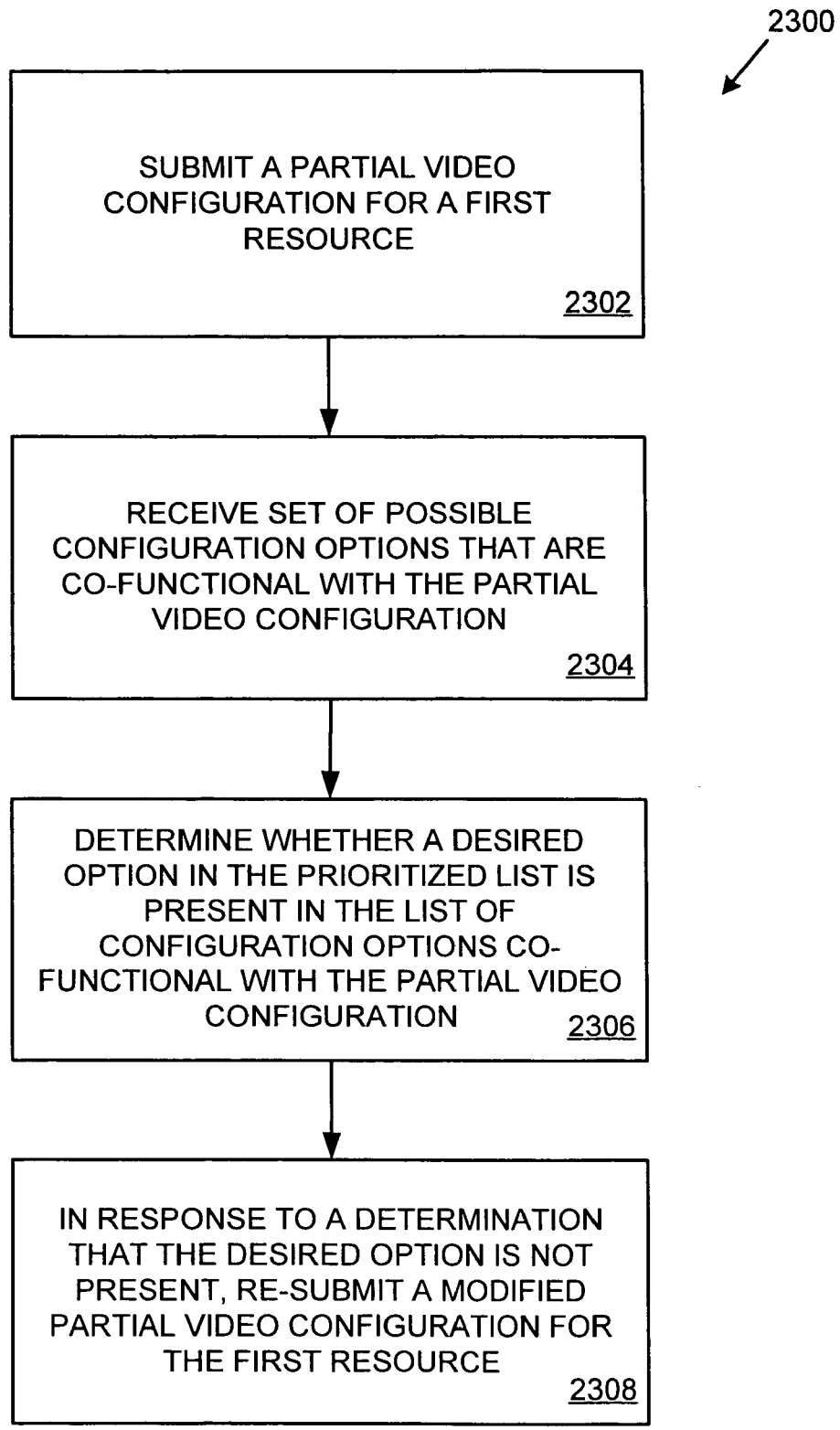
FIG. 23 is a flowchart showing an exemplary method of determining a desired video configuration in a client-server system such as that in FIG. 22.

FIG. 23 shows an exemplary method 2300 for determining a video configuration based on a prioritized list of desired video configuration options, such as in the system shown above in FIG. 22.

At 2302, a partial video configuration for at least a first resource is submitted.

At 2304, a list of configuration options co-functional with the partial video configuration is received.

At 2306, a determination is made as to whether a desired option in the prioritized list is present in the list of configuration options co-functional with the partial video configuration.

At 2308, in response to a determination that the desired option is not present, a modified partial configuration is re-submitted for the first resource. In practice, a trade-of between priorities may be desirable.

Detailed examples are included in the present application (e.g., Appendix A at FIGS. 5 and 6).

Example 34

Figure 24:
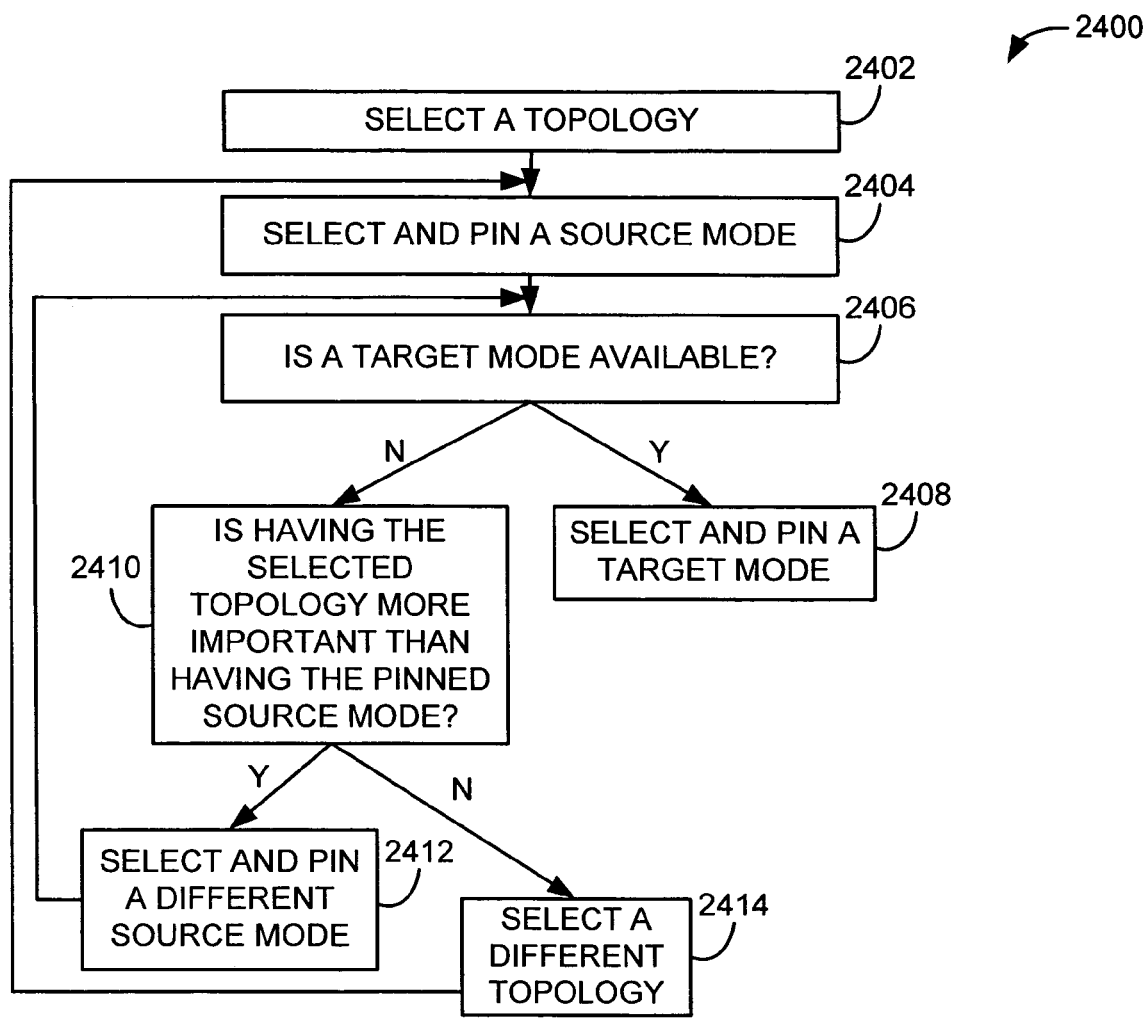
FIG. 24 is a flowchart showing an exemplary method of finding a desired configuration by systematic traversal of the solution space where the topology can be changed during execution of the method.

Exemplary Traversal of Solution Space to Converge on Desired Configuration Where Topology Can be Changed FIG. 24 shows a flowchart of another exemplary method 2400 of traversing a graph of possible functional multiple video output configuration combinations. The example, however, includes the possibility of changing the topology during determination of a desired functional video presenting network provisional configuration.

At 2402, a particular topology is selected.

At 2404, a video present source mode is selected and pinned on a video present source.

At 2406, it is determined whether any video present target modes are available (e.g., via enumeration). If so, the process continues to 2408. If not, the process advances to 2410.

At 2408, a video present target mode is selected and pinned on a video present target. The method can then end (e.g., after a commit).

At 2410, it is determined whether having the previously selected topology is more important than having the selected video present source mode. If the answer is yes, a different video present source mode is selected and pinned on the video present source at 2412 and the process returns to 2406. If not, a different topology is selected at 2414 and the process returns to 2404.

Although the example shows a trade-off between source mode and topology, other trade-offs among resources are possible. Further, as shown in some of the other example, desired options can be prioritized.

The logic implemented in the example and demonstrated in FIG. 24 may be altered to accommodate multiple video present sources and/or multiple video present targets, similar to that demonstrated above and in FIG. 16. For example, the logic implemented at 2410-2414 in FIG. 24 can be inserted between 1608 and 1610 and/or between 1616 and 1618 in FIG. 16.

In the example, the search begins with an initial topology, as is done at 2402 in FIG. 24. For video present paths in the topology, a video present source mode can be pinned on the video present path's video presenting network source before a video present target mode can be pinned on the video present path's video presenting network target. For example, a search can start with a single source-view video present path, pin modes on both the source and the target, and then grow the topology by adding another video present path to it. Alternatively, the topology can be changed when only the video present source mode is pinned.

Example 35

Exemplary Use of Configuration Service

Exemplary execution of the configuration service can proceed to configure a video presenting network. The example assumes a video presenting network with three sources in its topology and the following video present source mode sets enumerated for each of the three sources:

1. (1, {1, 640×480), (2, 800×600), (3, 1024×768), (4, 1280×1024)})
2. (2, {1, 640×480), (2, 800×600), (3, 1024×768), (4, 1280×1024) (5, 1600×1200), (6, 2000×1500)})
3. (3, {1, 640×480), (2, 800×600), (3, 1024×768)})

Supposing the client is interested in getting the highest possible spatial resolution on each of the video presenting network sources, the first video presenting network source being most important, the second video presenting network source being the second-most important, and the third and last video presenting network source being of least importance, it would proceed to pin the highest mode on the first video presenting network source, which is (4, 1280×1024).

By doing so, however, the client invalidates modes (4, 1280×1024), (5, 1600×1200), and (6,2000×1500) on the second video presenting network source. Since the client isn't yet aware of this, it will try and pin the highest mode previously enumerated on the second video presenting network source (e.g., (6, 2000×1500)), which will fail with a status code stating that the specified video present source mode has been invalidated.

At this point, the client will re-enumerate the available video present source modes across all the video presenting network sources, obtaining the following three sets:

1. (1, {1, 640×480), (2, 800×600), (3, 1024×768), (4, 1280×1024)})
2. (2, {1, 640×480), (2, 800×600), (3, 1024×768)})
3. (3, {1, 640×480), (2, 800×600), (3, 1024×768)})

The client would then proceed to pin the highest available video present source mode on the second video presenting network source (e.g., (3, 1024×768)). To support this additional mode, however, the video card can no longer support neither (2, 800×600) nor (3, 1024×768) on the third video presenting network source.

Again, not being aware of this fact, the client will try to pin the highest mode previously enumerated for that video present source (e.g., (3, 1024×768)). Failing that, the client will re-enumerate the available modes across all sources, getting:

1. (1, {1, 640×480), (2, 800×600), (3, 1024×768), (4, 1280×1024)})
2. (2, {1, 640×480), (2, 800×600), (3, 1024×768)})
3. (3, {1, 640×480)})

leaving it with only one mode choice for the third and last video presenting network source.

At this point, the client can either accept this source mode distribution and proceed to pin target modes to arrive at a functional video presenting network, or it may decide that 640×480 spatial resolution isn't high enough for it and backtrack to find a more suitable solution (e.g., one that perhaps doesn't involve setting 1280×1024 spatial resolution on the first video presenting network source, or alternatively, one that has only 2 video presenting network sources in its topology).

The following marked-up list of modes summarizes the whole process, with bold and underlined modes in each set representing the pinned modes, single strikethrough modes representing the modes invalidated when the mode on the first video presenting network target was pinned, and double strikethrough modes representing the modes invalidated when the mode on a second video presenting network target was pinned:

1. (1, {1, 640×480), (2, 800×600), (3, 1024×768), (4, 1280×1024)})
2. (2, {1, 640×480), (2, 800×600), (3, 1024×768),})
3. (3, {1, 640×480),})

It can be noted that the above algorithm uses a simplistic Greedy approach for rendering multi-mode convergence, and that it doesn't employ back-tracking. A more complicated search (e.g., a depth-first search) can be used by the client instead to find a more optimal rendering multi-model. It can also be noted that the above algorithm assumes a desired topology is fixed through the convergence process, such as in the exemplary method 1600 in FIG. 16.

Example 36

Exemplary Multi-Monitor/Multi-View System

Figure 25:
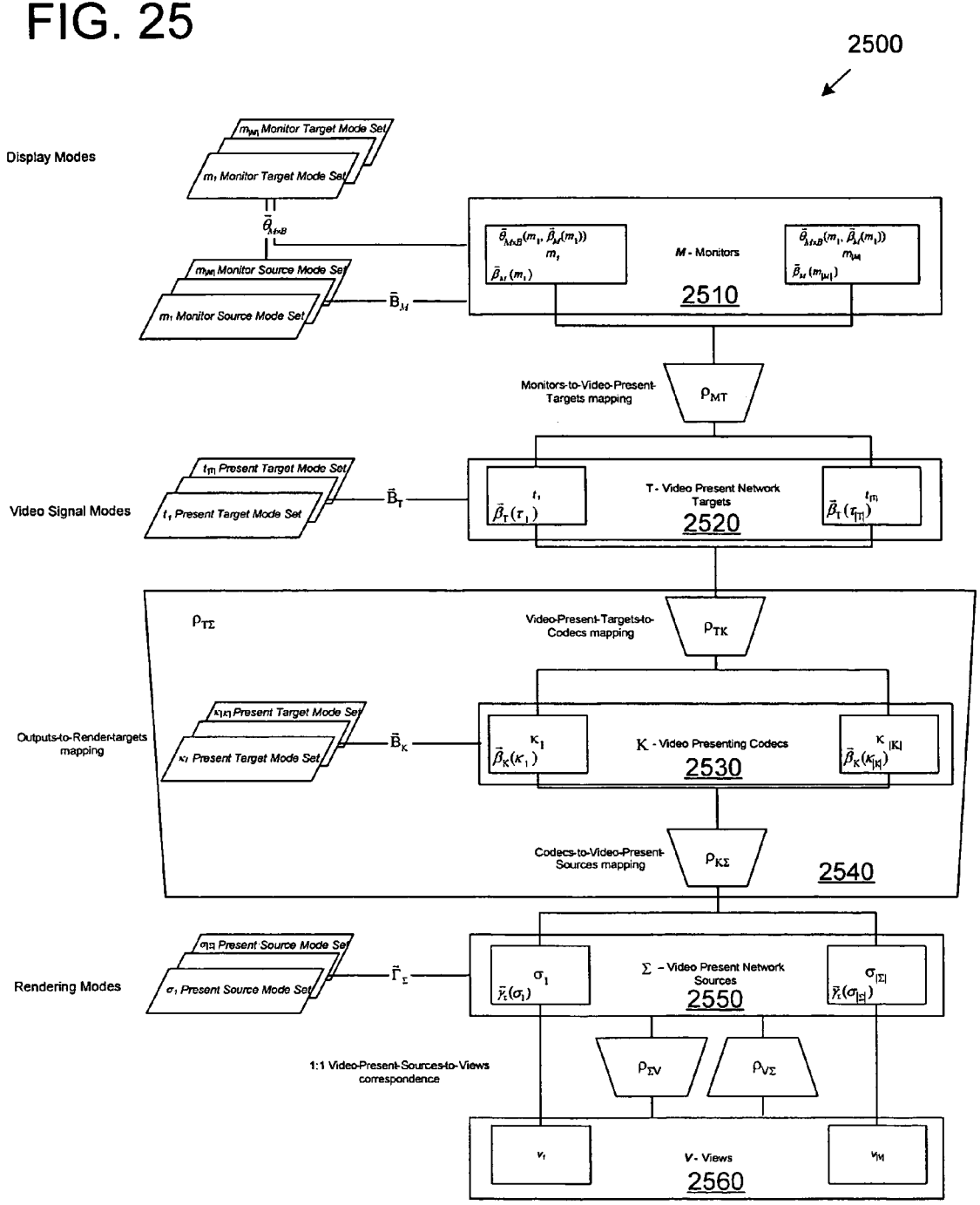
FIG. 25 is a block diagram showing an exemplary multi-monitor/multi-view system.

FIG. 25 is a diagram of an exemplary multi-monitor/multi-view system 2500, which can be described using the following formalism. Sometimes the term "VidPN" is used in place of "video presenting network," and "video present" is used in place of "video presenting." Also, the term "implementation" is sometimes used to refer to a provisional configuration. The system 2500 can be used with any of the examples described herein.

1. M is a set of monitors 2510 m=($\delta_M$), where:
   a. Monitor m is video presenting device that monitors the output of a video rendering device, and
   b. $\delta_M \in$ {EDID v1.0, EDID v1.1, EDID v1.2, EDID v1.3, EDID v1.3 with DIEXT} is a monitor descriptor.

2. T is a set of video present targets 2520 t=($\delta_T$), of a video rendering device, where:
   a. $\delta_T \in$ {(Format[$\delta_T$], HPD-aware[$\delta_T$])} is a video present target descriptor, where:
      i. Format[$\delta_T$]$\in$VC≡{DVI, HDMI, HDMI-2, HD-15, BNC, 4-pin S-video, 7-pin S-video, RF, RCA composite, 3 component RCA, Other} is a video output format type,
      ii. HPD-awareness[$\delta_T$]$\in$HPD≡{Interruptible, Non-Destructively Polled, Destructively Polled, None} is the video output HPD-awareness, where video output has:
         1. Interruptible HPD-awareness iff (if and only if) video miniport can asynchronously notify the OS about monitor arrivals/departures.
         2. Non-Destructively Polled HPD-awareness iff video miniport can report monitor arrivals/departures to the OS only by periodically polling the underlying h/w, without causing visual artifacts.
         3. Destructively Polled HPD-awareness iff video miniport can report monitor arrivals/departures to the OS only by sporadically polling the underlying h/w, causing visual artifacts on each poll.
         4. No HPD-awareness iff video miniport is not aware of monitor arrivals/departures and, hence, can not asynchronously notify or synchronously report occurrences of such events to the OS.
   b. Encoding $\epsilon(VE)^{VC}$ is a video encoding type, where:
      i. VE≡{Digital_YCbCr, Digital_RGB, Analog_YPbPr, Analog_RGB, Analog_YC, Analog_Composite, Other} is a video encoding type, and Video output connectors are mapped to respective video output encoding as specified in Table 1, shown below (note: presence of DDC support implies possibility to acquire a monitor descriptor, $\delta_M$):

TABLE 1

Video Output Connectors to Output Encoding Mapping

| Video output connector type | Video encoding type | DDC support |
|---|---|---|
| DVI | Digital_RGB or Digital_YCbCr | Yes |
| HDMI | Digital_RGB or Digital_YCbCr (+audio) | Yes |
| HDMI-2 | Digital_RGB or Digital_YCbCr (+audio) | Yes |
| HD-15 | Analog_RGB | Sometimes |
| BNC | Analog_RGB or Analog_YPbPr | No |
| 7-pin S-video | Analog_YC | Yes |
| 4-pin S-video | Analog_YC | No |
| RCA composite | Analog_Composite | No |
| 3 component RCA | Analog YPbPr | No |
| RF | Analog_Composite | No |
| Other | Other | Unknown | c. Synchronized $$:T^2 \to \{\text{True, False}\} = \begin{cases} \text{True:} & \text{present target modes} \\ & \text{on } t_1 \text{ and } t_2 \text{ are in sync} \\ \text{False:} & \text{otherwise} \end{cases}$$

is a video output synchronization predicate, which, given two outputs, determines whether they are in sync with each other or not.

3. K is a set of video presenting codecs 2530 $\kappa=(\delta_K)$, where:
  a. $\delta_K$ is a video codec descriptor.
4. Σ is a set of video present sources 2550 $\sigma=(\delta_\Sigma)$, where:
  a. $\delta_\Sigma \in \{\text{Linear, Other}\}$ is a video present source descriptor, and
  b. The content of each video presenting network input that is presented on a monitor, is called a view.
5. V is a set of views 2560 $v=(\delta_V)$, where:
  a. $\delta_V \in \{(\text{Importance}[\delta_V], \text{Orientation}[\delta_V])\}$ is a view descriptor, where:
    i. Importance$[\delta_V] \in \{\text{Primary, Secondary, Other}\}$
    ii. Orientation$[\delta_V] \in \{\text{Left, Right, Center, Other}\}$
6. $S=Z_2{}^{32}\omega\ \{0 \ldots \text{0xffffffff}\}$ is a set of 32-bit spatial coordinates.
7. Θ is a set of display modes $\theta=(w_\Theta, h_\Theta, r_\Theta, f_\Theta)$, where:
  a. $w_\Theta \in S\backslash\{0\}$ is the display mode width.
  b. $h_\Theta \in S\backslash\{0\}$ is the display mode height.
  c. $r_\Theta \in R_\Theta$ is the display mode frame rate, where:
    i. $R_\Theta \equiv \{a.b|a,b \in \{1 \ldots \text{0xFFFF}\}\}$ is a set of display mode frame rates in Hz.
  d. $f_\Theta \in F_\Theta$ is the display mode unit format, (i.e. effective color resolution of the monitor—a physical parameter that is a function of the monitor technology), where:
    i. $F_\Sigma \equiv \{1 \text{ bit}, 5 \text{ bit}, 6 \text{ bit}, 8 \text{ bit}, 10 \text{ bit}, 12 \text{ bit}, 16 \text{ bit}, 18 \text{ bit}, 32 \text{ bit}, \text{TBD}\}$ is a set of display mode color resolutions.
  e. $g_\Theta \in [1.0, +\infty) \cup \{\text{SD-601, HD-709}\}$ is the monitor transfer function (i.e. monitor gamma) which is a function of the monitor technology's intensity response.
8. B is a set of video present target modes, $\beta=(A_B, T_B, \Delta(A_B T_B), f_B, vr_B, hr_B, cr_B, o_B, cp_B, g_B, T_{B,YUV \to RGB}, bpo_B, wpo_B, pm_B)$, also known as present target modes, where:
  a. $A_B \in \{(\text{Width}[A_B], \text{Height}[A_B])\}$ is the video present target mode active region, where:
    i. Width$[A_B]$ is video present mode active region width.
    ii. Height$[A_B]$ is video present mode active region height.
  b. $T_B \in \{(\text{Width}[T_B], \text{Height}[T_B])\}$ is the video present target mode total region, where:
    i. Width$[T_B]$ is video present mode total region width.
    ii. Height$[T_B]$ is video present mode total region height.
  c. $\Delta(A_B, T_B) \in \{(\text{OffsetHoriz}[A_B, T_B], \text{OffsetVert}[A_B, T_B])\}$ is the video present target mode's active region displacement, where:
    i. OffsetHoriz$[A_B, T_B]$ is video present mode's horizontal active region displacement.
    ii. OffsetVert$[A_B, T_B]$ is video present mode's vertical active region displacement.
  d. $f_B \in F_B = F_{B,analog} \cup F_{B,digital}$ is the video mode pixel encoding format, where:
    i. $F_{B,digital} \equiv \{\text{Y10Cb10Cr10, Y8Cb8Cr8, sR10G10B10, sR8G8B8}\}$ is a set of digital video mode pixel encoding formats.
    ii. $F_{B,analog} \equiv \{\text{YPbPr, Analog\_YC, Analog\_Composite, RGB}\}$ is a set of analog video mode pixel encoding formats.
  e. $vr_B \in VR_B$ is the vertical refresh rate, also known as Vsync rate, or vertical retrace frequency, where:
    i. $VR_B \equiv \{a.b|a,b \in \{1 \ldots \text{0xFFFFFFFF}\}\}$ is a set of rational vertical refresh rates in Hz, usually found in the range of 50 to 200 Hz.
  f. $hr_B \in HR_B$ is the horizontal refresh rate, also known as Hsync rate, line rate, or horizontal retrace frequency, where:
    i. $HR_B \equiv \{a.b|a,b \in \{1 \ldots \text{0xFFFFFFFF}\}\}$ is a set of fractional horizontal refresh rates in Hz, usually found in the range of 10 to 200 KHz.
  g. $cr_B \in CR_B$ is the pixel clock rate, where:
    i. $CR_B \equiv \{a|a \in \{1 \ldots \text{0xFFFFFFFF}\}\}$ is a set of pixel clock rates in Hz, usually found in the range of 1 to 500 MHz.
  h. $o_B \in O_B$ is the content ordering, where:
    i. $O_B \equiv \{\text{Progressive, Interlaced\_upperFieldFirst, Interlaced\_lowerFieldFirst}\}$ is a set of content ordering types, where for progressive content ordering field rate=Vsync rate, and for interlaced content ordering field rate=2× Vsync rate.
  i. $cp_B \in CP_B$ are the color primaries. (3 primaries in (x,y), where x=X/(X+Y+Z) and y=Y/(X+Y+Z) which are relative to some spec.).
  j. $wpr_B \in CP_B$ is the white point reference (i.e. reference white).
  k. $g_B \in [1.0,+\infty) \cup \{\text{SD-601,HD-709}\}$ is the transfer function's exponent (i.e. gamma coefficient).
  l. $T_{B,YUV \to RGB}$ is the color space transformation matrix from Y'U'V' to R'G'B'.
  m. $bpo_B \in \mathfrak{R}_+$ is the black point offset (i.e. setup voltage).
  n. $wpo_B \in \mathfrak{R}_+$ is the white point offset.
  o. $pm_B \in Z_2{}^8 \equiv \{0 \ldots \text{0xff}\}$ is the video present target mode preference ordinal, where mode preference is represented via the $\{0x01 \ldots 0xff\}$ range with 0x01 signifying the most preferred and 0xff—the least preferred mode or irrelevant mode preference. 0x00 is reserved for unknown/not initialized.

Certain video modes are defined through an industry-wide standardization (both de-facto and formal). These modes can include those listed in Table 2 below, as well as the following continuous set of modes defined by the VESA Generalized Timing Formula (GTF):

$$\beta_{GTF} = \beta_{GTF,VR} \cup \beta_{GTF,HR} \cup \beta_{GTF,CR}$$

where:

$\beta_{GTF,VR} \equiv \{(vr_B, \text{GTF}_{VR_B \to HR_B}(vr_B, o_B, w_B, h_B), \text{GTF}_{VR_B \to CR_B}(vr_B, o_B, w_B, h_B))|vr_B \in VR_B\}$ $\beta_{GTF,HR} \equiv \{(\text{GTF}_{HR_B \to VR_B}(hr_B, o_B, w_B, h_B), \text{GTF}_{HR_B \to CR_B}(hr_B, o_B, w_B, h_B))|hr_B \in HR_B\}$ $\beta_{GTF,CR} \equiv \{(\text{GTF}_{CR_B \to HR_B}(cr_B, o_B, w_B, h_B), \text{GTF}_{CR_B \to VR_B}(vr_B, o_B, w_B, h_B), cr_B)|cr_B \in CR_B\}$

TABLE 2

Modes

| Name | Width (Pixels) | Height (Pixels) | Pixel Encoding Format | Vsync rate (Hz) | Hsync rate (Hz) | Pixel clock rate (Hz) | YUV-> RGB Transfer Matrix | Content Ordering |
|---|---|---|---|---|---|---|---|---|
| NTSC_M | 720 | 525 | YPbPr Analog_YC Analog_Composite | 60000/1001 | 15,734.27 | 3,579,545 | 601 | Interlaced |
| NTSC_J | 720 | 525 | Same | 60000/1001 | 15,734.27 | 3,579,545 | 601 | Interlaced |
| NTSC_443 | 720 | 525 | Same | 60000/1001 | 15,734.27 | 4,433,618.75 | 601 | Interlaced |
| PAL_B | 720 | 625 | YPbPr Analog_YC Analog_Composite RGB601_compositeSync | 50 | 15,625 | 4,433,618.75 | 601 | Interlaced |
| PAL_B1 | 720 | 625 | Same | 50 | 15,625 | 4,433,618.75 | 601 | Interlaced |
| PAL_G | 720 | 625 | Same | 50 | 15,625 | 4,433,618.75 | 601 | Interlaced |
| PAL_H | 720 | 625 | Same | 50 | 15,625 | 4,433,618.75 | 601 | Interlaced |
| PAL_I | 720 | 625 | Same | 50 | 15,625 | 4,433,618.75 | 601 | Interlaced |
| PAL_D | 720 | 525 | Same | 60000/1001 | 15,734 | 3,575,611.49 | 601 | Interlaced |
| PAL_N | 720 | 625 | Same | 50 | 15,625 | 4,433,618.75 | 601 | Interlaced |
| PAL_NC | 720 | 625 | Same | 50 | 15,625 | 3,582,056.25 | 601 | Interlaced |
| SECAM_B | 720 | 625 | Same | 50 | 15,625 | | 601 | Interlaced |
| SECAM_D | 720 | 625 | Same | 50 | 15,625 | | 601 | Interlaced |
| SECAM_G | 720 | 625 | Same | 50 | 15,625 | | 601 | Interlaced |
| SECAM_H | 720 | 625 | Same | 50 | 15,625 | | 601 | Interlaced |
| SECAM_K | 720 | 625 | Same | 50 | 15,625 | | 601 | Interlaced |
| SECAM_K1 | 720 | 625 | Same | 50 | 15,625 | | 601 | Interlaced |
| SECAM_L | 720 | 625 | Same | 50 | 15,625 | | 601 | Interlaced |
| SECAM_L1 | 720 | 625 | Same | 50 | 15,625 | | 601 | Interlaced |
| EIA_861_1 | 720 | 480 | YPbPr (NTSC timing) Y8Cb8Cr8 Y10Cb10Cr10 (R10G10B10 future) | 60000/1001 | | | 601 | Interlaced |
| EIA_861_2 | 640 | 480 | Same | 60000/1001 | | | 601 | Progressive |
| EIA_861_3 | 720 | 480 | Same | 60000/1001 | | | 601 | Progressive |
| EIA_861_4 | 1280 | 720 | Same | 60000/1001 | | | 709 | Progressive |
| EIA_861_5 | 1920 | 1080 | Same | 60000/1001 | | | 709 | Interlaced |
| EIA_861_6 | 720 | 480 | YPbPr Y8Cb8Cr8 Y10Cb10Cr10 (R10G10B10 future) | 60 | | | 601 | Interlaced |
| EIA_861_7 | 640 | 480 | Same | 60 | | | 601 | Progressive |
| EIA_861_8 | 720 | 480 | Same | 60 | | | 601 | Progressive |
| EIA_861_9 | 1280 | 720 | Same | 60 | | | 709 | Progressive |
| EIA_861_10 | 1920 | 1080 | Same | 60 | | | 709 | Interlaced |
| EIA_861A_1 | 720 | 576 | YPbPr (PAL timing) sRGB Y8Cb8Cr8 Y10Cb10Cr10 (sR10G10B10 future) | 50 | | | 601 | Interlaced |
| EIA_861A_2 | 720 | 576 | Same | 50 | | | 601 | Progressive |
| EIA_861A_3 | 1280 | 720 | Same | 50 | | | 709 | Progressive |
| EIA_861A_4 | 1920 | 1080 | Same | 50 | | | 709 | Interlaced |
| EIA_861B_1 | 1920 | 1080 | YPbPr sRGB Y8Cb8Cr8 Y10Cb10Cr10 (sR10G10B10 future) | 24000/1001 | | | 709 | Progressive |
| EIA_861B_2 | 1920 | 1080 | Same | 24 | | | 709 | Progressive |
| EIA_861B_3 | 1920 | 1080 | Same | 25 | | | 709 | Progressive |
| EIA_861B_4 | 1920 | 1080 | Same | 30000/1001 | | | 709 | Progressive |
| EIA_861B_5 | 1920 | 1080 | Same | 30 | | | 709 | Progressive |
| EIA_861B_6 | 1920 | 1080 | Same | 50 | | | 709 | Progressive |
| EIA_861B_7 | 1920 | 1080 | Same | 60 | | | 709 | Progressive |
| IBM_1 | 720 | 400 | sRGB | 70 | | | N/A | Progressive |
| IBM_2 | 720 | 400 | Same | 88 | | | N/A | Progressive |
| IBM_3 | 640 | 480 | Same | 60 | | | N/A | Progressive |
| IBM_4 | 1024 | 768 | Same | 87 | | | N/A | Interlaced |
| APPLE_1 | 640 | 480 | Same | 67 | | | N/A | Progressive |
| APPLE_2 | 832 | 624 | Same | 75 | | | N/A | Progressive |
| APPLE_3 | 1152 | 870 | Same | 75 | | | N/A | Progressive |
| VESA_1 | 640 | 480 | Same | 72 | | | N/A | Progressive |
| VESA_2 | 640 | 480 | Same | 75 | | | N/A | Progressive |
| VESA_3 | 800 | 600 | Same | 56 | | | N/A | Progressive |
| VESA_4 | 800 | 600 | Same | 60 | | | N/A | Progressive |
| VESA_5 | 800 | 600 | Same | 72 | | | N/A | Progressive |
| VESA_6 | 800 | 600 | Same | 75 | | | N/A | Progressive |

TABLE 2-continued

Modes

| Name | Width (Pixels) | Height (Pixels) | Pixel Encoding Format | Vsync rate (Hz) | Hsync rate (Hz) | Pixel clock rate (Hz) | YUV->RGB Transfer Matrix | Content Ordering |
|---|---|---|---|---|---|---|---|---|
| VESA_7 | 1042 | 768 | Same | 60 | | | N/A | Progressive |
| VESA_8 | 1042 | 768 | Same | 70 | | | N/A | Progressive |
| VESA_9 | 1042 | 768 | Same | 75 | | | N/A | Progressive |
| VESA_10 | 1280 | 1024 | Same | 75 | | | N/A | Progressive |
| VDMT_1 | 640 | 350 | Same | 85 | 37,900 | 31,500,000 | N/A | Progressive |
| VDMT_2 | 640 | 400 | Same | 85 | 37,900 | 31,500,000 | N/A | Progressive |
| VDMT_3 | 720 | 400 | Same | 85 | 37,900 | 35,500,000 | N/A | Progressive |
| VDMT_4 | 640 | 480 | Same | 60 | 31,500 | 25,175,000 | N/A | Progressive |
| VDMT_5 | 640 | 480 | Same | 72 | 37,900 | 31,500,000 | N/A | Progressive |
| VDMT_6 | 640 | 480 | Same | 75 | 37,500 | 31,500,000 | N/A | Progressive |
| VDMT_7 | 640 | 480 | Same | 85 | 43,300 | 36,000,000 | N/A | Progressive |
| VDMT_8 | 800 | 600 | Same | 56 | 35,100 | 36,000,000 | N/A | Progressive |
| VDMT_9 | 800 | 600 | Same | 60 | 37,900 | 40,000,000 | N/A | Progressive |
| VDMT_10 | 800 | 600 | Same | 72 | 48,100 | 50,000,000 | N/A | Progressive |
| VDMT_11 | 800 | 600 | Same | 75 | 46,900 | 49,500,000 | N/A | Progressive |
| VDMT_12 | 800 | 600 | Same | 85 | 53,700 | 56,250,000 | N/A | Progressive |
| VDMT_13 | 1024 | 768 | Same | 43 | 35,500 | 44,900,000 | N/A | Interlaced |
| VDMT_14 | 1024 | 768 | Same | 60 | 48,400 | 65,000,000 | N/A | Progressive |
| VDMT_15 | 1024 | 768 | Same | 70 | 56,500 | 75,000,000 | N/A | Progressive |
| VDMT_16 | 1024 | 768 | Same | 75 | 60,000 | 78,750,000 | N/A | Progressive |
| VDMT_17 | 1024 | 768 | Same | 85 | 68,700 | 94,500,000 | N/A | Progressive |
| VDMT_18 | 1152 | 864 | Same | 75 | 67,500 | 108,000,000 | N/A | Progressive |
| VDMT_19 | 1280 | 960 | Same | 60 | 60,000 | 108,000,000 | N/A | Progressive |
| VDMT_20 | 1280 | 960 | Same | 85 | 85,900 | 148,500,000 | N/A | Progressive |
| VDMT_21 | 1280 | 1024 | Same | 60 | 64,000 | 108,000,000 | N/A | Progressive |
| VDMT_22 | 1280 | 1024 | Same | 75 | 80,000 | 135,000,000 | N/A | Progressive |
| VDMT_23 | 1280 | 1024 | Same | 85 | 91,100 | 157,500,000 | N/A | Progressive |
| VDMT_24 | 1600 | 1200 | Same | 60 | 75,000 | 162,000,000 | N/A | Progressive |
| VDMT_25 | 1600 | 1200 | Same | 65 | 81,300 | 175,500,000 | N/A | Progressive |
| VDMT_26 | 1600 | 1200 | Same | 70 | 87,500 | 189,000,000 | N/A | Progressive |
| VDMT_27 | 1600 | 1200 | Same | 75 | 93,800 | 202,500,000 | N/A | Progressive |
| VDMT_28 | 1600 | 1200 | Same | 85 | 106,300 | 229,500,000 | N/A | Progressive |
| VDMT_29 | 1792 | 1344 | Same | 60 | 83,640 | 204,750,000 | N/A | Progressive |
| VDMT_30 | 1792 | 1344 | Same | 75 | 106,270 | 261,000,000 | N/A | Progressive |
| VDMT_31 | 1856 | 1392 | Same | 60 | 86,330 | 218,250,000 | N/A | Progressive |
| VDMT_32 | 1856 | 1392 | Same | 75 | 112,500 | 288,000,000 | N/A | Progressive |
| VDMT_33 | 1920 | 1440 | Same | 60 | 90,000 | 234,000,000 | N/A | Progressive |
| VDMT_34 | 1920 | 1440 | Same | 75 | 112,500 | 297,000,000 | N/A | Progressive |

9. $\Gamma$ is a set of video present source modes, $\gamma = (w_\Gamma, h_\Gamma, f_\Gamma, \phi_\Gamma, n_\Gamma, Pm_\Gamma)$, also known as present source modes, where:
  a. $w_\Gamma \in S \setminus \{0\}$ is a video present source mode width.
  b. $h_\Gamma \in S \setminus \{0\}$ is a video present source mode height.
  c. $f_\Gamma \in F_\Gamma$ is a video present source mode unit format, where:
    i. $F_\Gamma$ is a set of video present source mode unit formats, which can be categorized into two major subclasses:
      1. Graphics video present source mode unit formats, as defined by D3DFORMAT enum type in the latest DirectX release.
      2. Text video present source mode unit formats, as defined by TBD.
  d. $\phi_\Gamma \in \Psi_\Gamma$ is a rasterized graphics filtering technique used during rendering, where:
    i. $\Psi_\Gamma$ is a set of rasterized graphics filtering techniques, as defined by D3DDDIMULTISAMPLE_TYPE enum type in the latest DirectX release.
  e. $n_\Gamma \in N$ is the primary surfaces chain length (i.e. number of surfaces in the primary surfaces chain).
  f. $pm_\Gamma \in Z_{2^8} \equiv \{0 \ldots 0xff\}$ is the video present source mode preference ordinal, where mode preference is represented via the $\{0x01 \ldots 0xff\}$ range with 0x01 signifying the most preferred and 0xff the least preferred mode or irrelevant mode preference. 0x00 is reserved for unknown/not initialized.

10. $\rho_{MT} \in T^M$ is a monitor connectivity topology—i.e. mapping from monitors to the video present targets they are connected to.

11. $\rho_{TK} \in K^T$ is a video present targets-to-codecs topology—i.e. mapping from video present targets to video present codecs driving them—defined by a programmable cross-bar on the video card.

12. $\rho_{K\Sigma} \in \Sigma^K$ is a video present codecs-to-sources topology—i.e. mapping from video present codecs to video video present sources from which the codecs are streaming visual content.

13. $\rho_{T\Sigma} \in \Sigma^T$ is a video present targets-to-sources topology 2540—i.e. mapping from video present sources, from which its underlying video output codecs are streaming visual content, to video present targets, to which that content is being streamed to.

14.

$$P_{TK\Sigma} \equiv \left\{ \rho_{TK\Sigma} \mid (\rho_{TK\Sigma} \equiv \rho_{TK} \circ \rho_{K\Sigma}) \wedge \text{supported}(\rho_{TK}) \wedge \text{supported}(\rho_{K\Sigma}) \wedge \rho_{TK\Sigma} \text{ implements } \rho_{T\Sigma} \right\}_{\rho_{TK} \in K^T, \rho_{K\Sigma} \in \Sigma^K}^{\wp(T) \times \wp(\Sigma)}$$

is a set of supported VidPN topologies—i.e. a mapping from a pair consisting of the set of video present targets and the set of video present sources, $(T_1, \Sigma_1) \in \wp(T) \times \wp(\Sigma)$, to the respective set of the supported VidPN implementations for that pair, where each implementation specifies explicitly the way in which video present sources are routed through the video output codecs to the video present targets they are driving.

15. $Y \in \{(T_Y, \Sigma_Y, \rho_{T_Y\Sigma_Y}) | (T_Y \subseteq T) \wedge (\Sigma_Y \subseteq \Sigma) \wedge \exists_{\rho_{TK\Sigma} \in P_{TK\Sigma}} (\rho_{T_Y\Sigma_Y} = \rho_{TK\Sigma})\}$ is called a VidPN implementation, where:

a. $T_Y \in \wp(T)$ is the set of VidPN video present targets.

b. $\Sigma_Y \in \wp(\Sigma)$ is the set of VidPN video present sources.

c. $\rho_{T_Y\Sigma_Y} \in \Sigma^t$ is the VidPN topology.

16. $\rho_{\Sigma V} \in V^\Sigma$ and $\rho_{V\Sigma} \in \Sigma^V$ are the 1:1 correspondences between views and the underlying video present sources—i.e. $\rho_{\Sigma V}$ and $\rho_{V\Sigma}$ are isomorphisms between $\Sigma$ and V.

17. $\vec{B}_K \in \wp(B)^K$ is a multi-codec video present target mode set vector—i.e. mapping from video output codecs to the video present target mode sets they support.

18. $\vec{B}_T \in \wp(B)^T$ is a multi-target video present target mode set vector—i.e. mapping from video present targets to the video present target mode sets they support.

19. $\vec{B}_M \in \wp(B)^M$ is a multi-monitor video monitor source mode set vector—i.e. mapping from monitors to the video monitor source mode sets they support.

20. $\vec{\Gamma}_T \in \wp(\Gamma)^T$ is a multi-source video present source mode set vector—i.e. mapping from video present sources to the video present source mode sets they support.

21. $\vec{\beta}_K \in B^K$ is a multi-codec video present target mode vector—i.e. mapping from video output codecs to the video present target modes which these codecs are driving on the video present targets' video outputs to which they are connected.

22. $\vec{\beta}_T \equiv (\rho_{TK} \circ \vec{\beta}_K) \in B^T$ is a multi-output video present target mode vector—i.e. mapping from video present targets to the video present target modes being driven on their video present targets by the video output codecs they are connected to.

23. $\vec{\beta}_M \equiv (\rho_{MT} \circ \vec{\beta}_T) \in B^M$ is a multi-monitor video present target mode vector—i.e. mapping from monitors to the video present target mode being driven on them by the video present targets they are connected to.

24. $\vec{\theta}_{M \times B} \in \Theta^{M \times B}$ is a multi-monitor display mode vector—mapping from monitors to the display modes being displayed on them as the result of the underling video present target mode driven on the monitors' inputs.

25. $\vec{\gamma}_\Sigma \in \Gamma^\Sigma$ is a multi-source video present source vector—i.e. mapping from video present sources to the video present source modes these sources are set to.

26. A VidPN implementation is said to be semi-functional iff video present source modes have been successfully selected on all of its video present sources.

27. A VidPN implementation is said to be functional iff it is semi-functional and video present target modes have been successfully selected on all of its video present targets.

Example 37

Exemplary Definitions

Given the complicated set of interdependencies involved, a number of formal definitions can be used for some implementations. Certain (view, output) pairs may be factored into video present sources, which can represent inputs into video output codecs (e.g., CRTC DAC, TMDS) and video present targets, which can represent video outputs on a video card (e.g., HD-15, DVI, S-video).

A display mode may be factored into a video present source mode, which can specify the primary surface format via which a graphics stack is providing rendered content to be presented for a user, and a video present target mode, which can specify a video signal format driven on a respective video output.

Video presenting capabilities of a multiple-output video card are modeled via the notion of a Video Present Network (VidPN), which can relate a set of video present sources to a set of video present targets via a VidPN topology. A VidPN may be considered semi-functional iff video present source modes are pinned on each of its video present sources. A VidPN may be considered functional iff it is semi-functional, and video present target modes are pinned on each of its video present targets.

Association between a single video present source and a single video present target can be called a video present path. Association between a single video present source and multiple video present targets can be called a video present multipath.

With the preceding definitions in place, a video miniport's job, in the context of display mode management, can be described as managing an active VidPN that represents a state of a video present configuration on a respective video card it is driving, as well as servicing clients' requests aimed at incrementally building functional VidPNs, each of which could be set as active.

Example 38

Exemplary Multiple Video Output Display Mode Solution

Changing display modes on monitors attached to a multiple-output video card may no longer suffer from a "single-output operation" view of the world, where video miniport developers had to implement complex synchronization among certain video driver stacks that were driving the same underlying physical device, and may be superseded with an explicit transaction-based commit of a functional VidPN implementation on a given video card serviced by a single video driver stack.

A multiple output video display mode solution may depend on multiple criteria such as: (a) hardware limitations (e.g., video mode sets supported by monitors connected to respective video present targets); (b) operational mode considerations (e.g., specific video modes preferred by monitors connected to respective video present targets); (c) performance considerations (e.g., rendering performance improvements achieved through reduction of contention for a video memory bus by video output codecs); (d) power management considerations (e.g., reduction of a video card's power consumption achieved by disabling unutilized video output codecs, and throttling down its capabilities); (e) heat dissipation considerations (e.g., reduction of a video card's operational temperature achieved through continuous interswitching among multiple units, where one unit is given a chance to cool down while another one is operational, and vice versa, thus never increasing the number of J/sec radiated by the video card beyond a certain desired upper bound); and (f) usability considerations (e.g., a driving monitor's preferred mode on a user's primary monitor is more important than driving it on a secondary monitor, assuming that all monitors cannot be driven at preferred modes, where a decision of which monitor is primary is a function of user-specified mode of operation). For example, given DVI LCD, S-video HDTV, and HD-15 CRT/3D glasses, a user might prefer to work/read/browse on DVI LCD that has the best clarity, watch movies on S-video HDTV that has the largest active pixel region, and play games on HD-15 CRT/3D glasses that support the highest refresh rates and best gaming experience.

Example 39

Exemplary Solution Space

A solution space containing all possible VidPN implementations, with all possible video present target mode sets available on its targets and all the various ways to distribute available video present source modes across its inputs, availability of each of which is a function of a video mode to be driven on a respective output (based on such factors as the presence of hardware scaling in an underlying video codec), may be intractable for a simple brutal force enumeration. A non-brute force approach for a general case of T video present targets, K codecs, and Σ video present sources may be analogous to a classical tri-partite graph matching problem, which is known to be NPC (e.g., there is no known algorithm that runs in polynomial time and finds an ideal, or globally optimal, solution). Determining an approximate solution as close as possible to an ideal solution is desirable.

Example 40

Exemplary Complexities

Determining which configurations are functional can be a complex task. For example, for a given configuration, the following may need to be considered:
1. Which video output codec can be used to drive which video output
2. Which video codec can be used to convert which render target's primary surface into a video signal
3. What are the possible video mode set distributions across the video outputs
4. What are the possible video modes that each video codec can drive
5. What are the possible graphics rendering mode distributions across the render targets.

Some of the issues making the search complex are that codes are a scarce resource, and there are usually less codecs than outputs, so for clone-view it is beneficial to share a single codec across multiple outputs, whenever possible. Such an approach has a downside of forcing the same video mode on both monitors which may not work, if the monitors do not have a common video mode that the both support (e.g., a CRT can go up to 1280×1024 and an LCD may support only 1600×1200). Even if they do share a video mode, such might not be the ideal way to drive the monitors, since the video mode might not be their preferred mode. For example, a projector supports 640×480, 800×600, 1024×768 (native), and 1280×1024. The LCD supports 640×480, 800×600, 1024×768, 1280×1024, and 1400×1050 (native). Sharing a codec between these two means only one driver can be driven at its preferred video mode.

Or, an LCD might support 1024×768, 1280×1024, 1600× 1200 (preferred). And a projector might support 640×480, 800×600 (preferred), and 1024×768. Sharing means that neither monitor can be driven at its preferred mode.

In addition, not all codecs are created equal. Sometimes a video card has different codecs, with one being able to do more modes or perform some of them better than the other. The situation can become even more complicated with certain modes being available on certain codecs (e.g., one codec can do only 16-bit, and another codec can do only 32-bit modes).

Finally, while cross-bar can be used to reroute codecs to different outputs, its limitations and incompatibility of the codec with the video output's technology can result in certain codecs being restricted to certain subsets of outputs (e.g., CRTC can not drive DVI, and TMDS can not drive HD-15 of S-video).

To avoid a brute force approach of enumerating all possible implementations, a convergence approach can be used instead.

Example 41

Exemplary Advantages to Delegating Determination to Video Driver

In any of the examples described herein, determining whether a particular provisional configuration is functional for the video adapter can be accomplished by (e.g., delegated to) the device driver. A possible alternative is to construct a general-case generic solution that can handle determination across a set of video adapters (e.g., all known video adapters). However, such a solution would require logic for handling a vast number of scenarios.

Instead, by delegating determination to the device driver, the device driver can be made more lightweight and need not solve the general case. For example, the device driver need not contain logic for handling scenarios that the corresponding video adapter cannot implement (e.g., are not present in hardware). In this way, the size of the device driver can be reduced and its performance (e.g., speed) can be increased (e.g., as compared to a general solution).

Example 42

Exemplary Comparison between Topology and Sources/Targets

A topology can be treated as a configurable resource, wherein the options (e.g., video present paths) can be configured concurrently. Compare to those video preset sources/targets in which only a single option (e.g., source/target mode) can be configured at once. Modes can be mutually exclusive within a given mode set, whereas present paths need not be necessarily mutually exclusive, but can be.

Example 43

Exemplary Approaches

Two possible approaches include a query-based approach and a traversal-based approach. A query-based approach may involve querying a display miniport for a solution that satisfies a set of requirements provided by the OS. A traversal-based approach may involve navigating through a solution space by incrementally building up a functional VidPN implementation with desired video present target and source modes chosen for its targets and sources, respectively. Determining a near-optimal implementation of a VidPN may be left to a video miniport.

Alternatively, an OS may supply a video miniport with: (1) a video present target mode set requirement for each VidPN target that has a monitor connected to it (e.g., a video card must not expose video signal modes not supported by an attached monitor), conformance to which on the DDI side can be validated by the OS during video present target mode enumeration; and (2) a video present target mode set guideline to support monitors' preferred monitor source modes based on a supplied prioritization scheme, where a display miniport may find a VidPN implementation where a preferred monitor source mode is supported on a more preferable monitor first, with the preferred monitor source mode support on every monitor connected to the system being the ideal solution.

Finding a near-optimal distribution of graphics video present source modes supported on VidPN sources may be left to a graphics subsystem's client (e.g., Shell), where a driver merely exposes an ability to traverse respective video present source mode sets distribution solution space through an API reporting a video card's capabilities under a specified operational state. Approaches as simple as Greedy or as complex as graph-based searches may be employed.

Example 44

Exemplary Computing Environment

Figure 26:
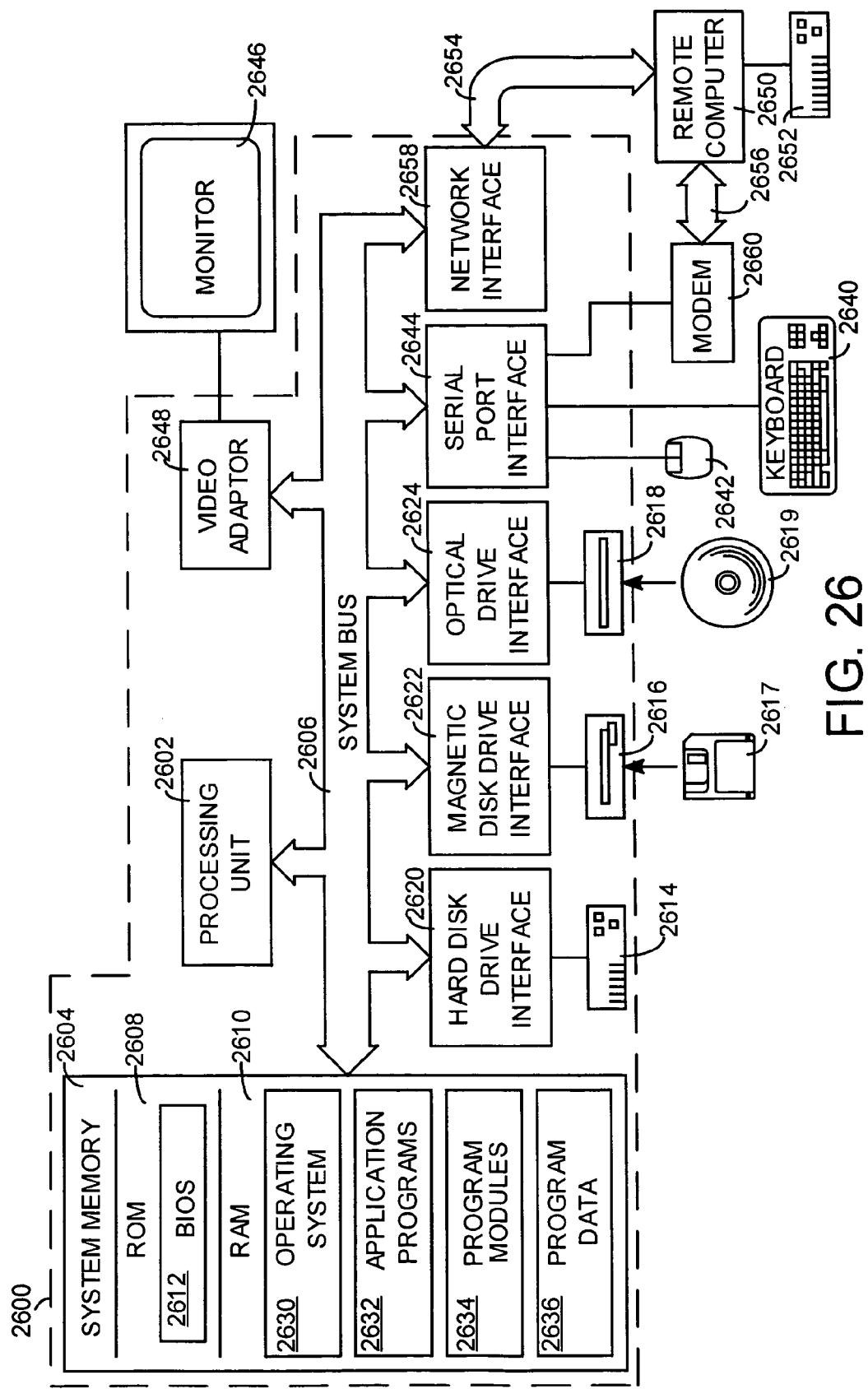
FIG. 26 is a diagram depicting a general-purpose computing device constituting an exemplary system for implementing the disclosed technology.

FIG. 26 and the following discussion are intended to provide a brief, general description of an exemplary computing environment in which the disclosed technology may be implemented. Although not required, the disclosed technology will be described in the general context of computer-executable instructions, such as program modules, being executed by a personal computer (PC). Generally, program modules include routines, programs, objects, components, data structures, etc. that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 26, an exemplary system for implementing the disclosed technology includes a general purpose computing device in the form of a conventional PC 2600, including a processing unit 2602, a system memory 2604, and a system bus 2606 that couples various system components including the system memory 2604 to the processing unit 2602. The system bus 2606 may be any of several types of bus structures including a memory bus or memory controller, a peripheral bus, and a local bus using any of a variety of bus architectures. The system memory 2604 includes read only memory (ROM) 2608 and random access memory (RAM) 2610. A basic input/output system (BIOS) 2612, containing the basic routines that help with the transfer of information between elements within the PC 2600, is stored in ROM 2608.

The PC 2600 further includes a hard disk drive 2614 for reading from and writing to a hard disk (not shown), a magnetic disk drive 2616 for reading from or writing to a removable magnetic disk 2617, and an optical disk drive 2618 for reading from or writing to a removable optical disk 2619 (such as a CD-ROM or other optical media). The hard disk drive 2614, magnetic disk drive 2616, and optical disk drive 2618 are connected to the system bus 2606 by a hard disk drive interface 2620, a magnetic disk drive interface 2622, and an optical drive interface 2624, respectively. The drives and their associated computer-readable media provide nonvolatile storage of computer-readable instructions, data structures, program modules, and other data for the PC 2600.

Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored on the hard disk, magnetic disk 2617, optical disk 2619, ROM 2608, or RAM 2610, including an operating system 2630, one or more application programs 2632, other program modules 2634, and program data 2636. A user may enter commands and information into the PC 2600 through input devices such as a keyboard 2640 and pointing device 2642 (such as a mouse). Other input devices (not shown) may include a digital camera, microphone, joystick, game pad, satellite dish, scanner, or the like. These and other input devices are often connected to the processing unit 2602 through a serial port interface 2644 that is coupled to the system bus 2606, but may be connected by other interfaces such as a parallel port, game port, or universal serial bus (USB). A monitor 2646 or other type of display device is also connected to the system bus 2606 via an interface, such as a video adapter 2648. Other peripheral output devices, such as speakers and printers (not shown), may be included.

The PC 2600 may operate in a networked environment using logical connections to one or more remote computers, such as a remote computer 2650. The remote computer 2650 may be another PC, a server, a router, a network PC, or a peer device or other common network node, and typically includes many or all of the elements described above relative to the PC 2600, although only a memory storage device 2652 has been illustrated in FIG. 26. The logical connections depicted in FIG. 26 include a local area network (LAN) 2654 and a wide area network (WAN) 2656. Such networking environments are commonplace in offices, enterprise-wide computer networks, intranets, and the Internet.

When used in a LAN networking environment, the PC 2600 is connected to the LAN 2654 through a network interface 2658. When used in a WAN networking environment, the PC 2600 typically includes a modem 2660 or other means for establishing communications over the WAN 2656, such as the Internet. The modem 2660, which may be internal or external, is connected to the system bus 2606 via the serial port interface 2644. In a networked environment, program modules depicted relative to the personal computer 2600, or portions thereof, may be stored in the remote memory storage device. The network connections shown are exemplary, and other means of establishing a communications link between the computers may be used.

Example 45

Exemplary Specification

The following is an exemplary specification for implementing a video presenting network supporting the various technologies described herein. In the example, a video presenting network is sometimes called a "video present network" or "VidPN." A particular configuration for the video present network is sometimes called a "VidPN implementation."

The functions described can be combined into a programmatic interface, such as an API or DDI. Such an interface can be implemented by a device driver for access by a client such as an operating system.

TABLE 3

Function EnumAvailVidPNTargets

| | | |
|---|---|---|
| Name | EnumAvailVidPNTargets | |
| Purpose | Enumerates available VidPN targets, supported by the video card, given the specified VidPN implementation, each of which could be added to its topology using AddVideoPresentPathToVidPNTopology, where each target represents a unique video output on the video card. | |
| Prototype | NTSTATUS<br>EnumAvailVidPNTargets<br>(<br>  [in] VIDPN_IMPL                      hVidPNImpl,<br>  [out] PDWORD                        pdwNumOfAvailVidPTs,<br>  [out] PVIDEO_PRESENT_TARGET*  ppAvailVidPTs<br>); | |

| Inputs | Name | Description |
|---|---|---|
| | — | — |

| Outputs | Name | Description |
|---|---|---|
| | hVidPNImpl | VidPN implementation in whose context the caller is interested in finding the available VidPN targets supported by the video card.<br>Note that these aren't just the targets that are part of the specified VidPN implementation.<br>If hVidPNImpl = NULL, the video present targets that video card can support through at least one VidPN shall be returned. |
| | pdwNumOfAvailVidPTs | Number of available video present targets (VidPTs). |
| | ppAvailVidPTs | Placeholder for the address of the array containing available video present target descriptors to be initialized by the display miniport. |

| Status | Name | Description |
|---|---|---|
| | STATUS_SUCCESS | Query has been completed successfully. |
| | STATUS_VIDEO_INVALID_VIDPN_IMPL | Invalid VidPN implementation handle has been provided. |
| | STATUS_NO_MEMORY | Display miniport failed to allocate enough system memory for the requested array of video present targets. |

| | |
|---|---|
| Side-effects | None. |
| Allocation ownership semantics | Display miniport is responsible for allocating a buffer of size:<br>pdwNumOfAvailvidPTs * sizeof(VIDPT)<br>for the video present targets array in system memory using DlpAllocatepool. Display loader is responsible for de-allocating this buffer once it's done with it. |
| Remarks | Video present targets are ordered by their IDs, smallest first, from 0 to pdwNumOfAvailVidPTs-1.<br>Note that any number of the enumerated video present targets can be mutually exclusive, meaning they are not necessarily all available for concurrent use through a single VidPN, and using one of them for the topology of any given VidPN may make one or more of the other enumerated video present targets inaccessible. |

TABLE 4

Function ConstrainModesOnVidPNTargets

| | |
|---|---|
| Name | ConstrainModesOnvidPNTargets |
| Purpose | Sets the video mode constraints on each of the enumerated video present targets. |
| Prototype | NTSTATUS<br>ConstrainModesOnVidPNTargets<br>(<br>  [in]    PVIDEO_MODE_SET pvmsMonitor<br>); |

| Inputs | Name | Description |
|---|---|---|
| | pvmsMonitor | Array of video mode sets supported by the monitors connected to the respective VidPT's video present targets, and, hence, allowed on these outputs.<br>Entry containing NULL means no constraints are imposed on the respective video output's modes (i.e. no monitor is present on that output). OS shall treat NULL-constrained outputs as disabled, and display miniport should consider powering down the DAC driving that video output to conserve video card's power consumption. |

TABLE 4-continued

Function ConstrainModesOnVidPNTargets

| Outputs | Name | Description |
|---|---|---|
| | — | — |

| Status | Name | Description |
|---|---|---|
| | STATUS_SUCCESS | Constraint has been set successfully. |

| | |
|---|---|
| Side-effects | None. |
| Allocation ownership semantics | Display miniport must make a private copy of the supplied per-target video mode constraints, since once the request is successfully completed, arguments' memory can be deallocated by the OS. |
| Remarks | This DDI lets OS specify the video mode sets that are allowed on each of the video present targets, ordered in the same sequence as enumerated by EnumAvailVidPNTargets. OS needs to use this DDI on monitor HPD events to notify display miniport about the change in video mode constraints on the video card's video present targets.<br>Note that if no monitor descriptor is present, OS shall use a hard coded list of video modes expected to be supported on the video output of a given type (e.g. IBM_*, APPLE_*, VESA_*, VDMT_*, and EIA_* modes for DVI, HD-15, BNC, etc.; NTSC_*, PAL_*, and SECAM_* modes for S-video, RCA, RF, etc.).<br>$3^{rd}$ party hard-coded list manipulation (e.g. addition/removal of video modes to/from such lists) shall be supported in the OS to satisfy extensibility and flexibility requirements. |

TABLE 5

Function EnumAvailVidPNSources

| | |
|---|---|
| Name | EnumAvailVidPNSources |
| Purpose | Enumerates available VidPN sources supported by the video card, given the specified VidPN implementation, each of which could be added to its topology using AddVideoPresentPathToVidPNTopology, where each source represents a video output codec's input on the video card. |
| Prototype | NTSTATUS<br>EnumAvailVidPNSources<br>(<br>  [in] VIDPN_IMPL                   hVidPNImpl,<br>  [out] PDWORD                  pdwNumOfAvailVidpSs,<br>  [out] PVIDEO_PRESENT_SOURCE*  ppAvailVidPSs<br>); |

| Inputs | Name | Description |
|---|---|---|
| | hVidPNImpl | VidPN implementation in whose context the caller is interested in finding the available VidPN sources supported by the video card.<br>Note that these aren't just the sources that are part of the specified VidPN implementation.<br>If hVidPNImpl = NULL, the maximum number of video present sources (and hence views) video card can support under at least one VidPN shall be returned. |

| Outputs | Name | Description |
|---|---|---|
| | pdwNumOfAvailVidPSs | Number of available present sources that can be added to the topology of the specified VidPN. |
| | ppAvailVidPSs | Placeholder for the address of the array containing available video present source descriptors to be initialized by the display miniport. |

| Status | Name | Description |
|---|---|---|
| | STATUS_SUCCESS | Query has been completed successfully. |
| | STATUS_VIDEO_INVALID_VIDPN_IMPL | Invalid VidPN implementation handle has been provided. |
| | STATUS_NO_MEMORY | Display miniport failed to allocate enough |

TABLE 5-continued

Function EnumAvailVidPNSources

|  |  |
|---|---|
|  | system memory for the requested array of video present sources. |
| Side-effects | None. |
| Allocation ownership semantics | Display miniport is responsible for allocating a buffer of size: pdwNumOfAvailVidPSs * sizeof (VIDPS) for the video present targets array in system memory using DlpAllocatePool. Display loader is responsible for de-allocating this buffer once it's done with it. |
| Remarks | Video present sources are identified from 0 to dwNumOfOutputs−1, ordered smallest first. Note that this DDI does not return all the sources, just those that can be added to the specified VidPN.<br>Maximum number of supported video present sources is a function of the VidPN's implementation. Specifically, per each sharing of video output codec among two or more video present targets (for clone-view), an additional video present source can be supported by the video card. If each output in clone-view association is driven by a separate video codec, then the number of maximum number of video present sources decreases as the number of available codecs decreases. Therefore, essentially, this DDI returns the number of video output codecs unused by the implementation of the specified VidPN and usable in combination with the video output codecs employed by that VidPN.<br>To find the maximum number of additional video present sources current VidPN can be extended to, pass the VidPN implementation handle returned by GetActiveVidPNImpl. |

TABLE 6

Function CreateVidPNImpl

| Name | CreateVidPNImpl | | |
|---|---|---|---|
| Purpose | Creates a VidPN implementation. | | |
| Prototype | NTSTATUS<br>CreateVidPNImpl<br>(<br>   [in] PVIDPN_TOPOLOGY     pVidPNTopology,<br>   [in] PDWORD     pdwPreferredMonitors,<br>   [out] PVIDPN_IMPL     phVidPNImpl<br>); | | |
| Inputs | Name | | Description |
|  | pVidPNTopology | | Topology of the VidPN to be created. |
|  | pdwPreferredMonitors | | Prioritization of monitors, from the most preferred to the least preferred. While choosing among VidPN implementations satisfying the specified topology, display miniport must try to support preferred video mode on the most preferred monitor first, the ideal situation being that monitors (e.g., all) can be driven in their preferred modes. |
| Outputs | Name | | Description |
|  | phVidPNImpl | | Placeholder for the handle to the implementation of the specified VidPN. |
| Status | Name | | Description |
|  | STATUS_SUCCESS | | Request has been completed successfully. |
|  | STATUS_VIDEO_VIDPN_TOPOLOGY_NOT_SUPPORTED | | Specified VidPN topology is not supported by the video card. |
|  | STATUS_VIDEO_INVALID_VIDPN_TOPOLOGY | | Specified VidPN is invalid (e.g. output can not point to two video present sources simultaneously). |
| Side-effects | None. | | |
| Allocation ownership semantics | Display miniport must make a private copy of the supplied monitors' prioritization scheme, since once the request is successfully completed, arguments' memory can be deallocated by the OS. | | |
| Remarks | This DDI creates a temporary object maintained by the display miniport that represents a VidPN. The following operations can subsequently be executed on such a VidPN object:<br>1. AddVideoPresentPathToVidPNTopology - add a video present (target, source) association to it. | | |

TABLE 6-continued

Function CreateVidPNImpl

2. RemovePresentTargetFromVidPNTopology - remove an video present target from it.
3. RemovePresentSourceFromVidPNTopology - remove a video present source from it.
4. DisposeOfVidPNImpl - dispose of it.
5. CommitvidPNImpl - set video card's active VidPN to it.
See descriptions of the respective DDIs for more detail.

TABLE 7

Function GetActiveVidPNImpl

| | | |
|---|---|---|
| Name | GetActiveVidPNImpl | |
| Purpose | Returns a handle to the VidPN implementation which is based on the VidPN currently set on the video card. | |
| Prototype | NTSTATUS<br>GetActiveVidPNImpl<br>(<br>   [out] PVIDPN_IMPL phActiveVidPNImpl<br>); | |
| Inputs | Name | Description |
| | — | — |
| Outputs | Name | Description |
| | phActiveVidPNImpl | Handle to the implementation of the active VidPN. |
| Status | Name | Description |
| | STATUS_SUCCESS | Query has been completed successfully. |
| Side-effects | None. | |
| Remarks | This DDI is useful when it is desired to add or remove a VidPN association to the existing VidPN, rather than creating a completely new configuration. This DDI is essentially a combination of GetActiveVidPNTopology and CreateVidPNImpl.<br>It is also useful to determine the additional maximum number of video present sources (and hence views) that video card can support given the current VidPN (see EnumAvailvidPNSources for more detail). | |

TABLE 8

Function GetActiveVidPNTopology

| | | |
|---|---|---|
| Name | GetActiveVidPNTopology | |
| Purpose | Returns topology of the active VidPN. | |
| Prototype | NTSTATUS<br>GetActiveVidPNTopology<br>(<br>   [out] PVIDPN_TOPOLOGY* ppActiveVidPNTopology<br>); | |
| Inputs | Name | Description |
| | — | — |
| Outputs | Name | Description |
| | ppActiveVidPNTopology | Placeholder for the topology descriptor of the active VidPN. |
| Status | Name | Description |
| | STATUS_SUCCESS | Query has been completed successfully. |
| | STATUS_NO_MEMORY | Display miniport failed to allocate enough system memory for the requested VidPN. |
| Side-effects | None. | |
| Allocation ownership semantics | Display miniport is responsible for allocating a big enough buffer for the VidPN in system memory using DlpAllocatePool. Display loader is responsible for de-allocating this buffer once it's done with it. | |
| Remarks | This DDI is useful to determine the active VidPN. In particular, it's required to obtain the initial VidPN topology video card is booted in, by the BIOS. | |

TABLE 9

Function DisposeOfVidPNImpl

| | | |
|---|---|---|
| Name | DisposeOfVidPNImpl | |
| Purpose | Disposes of the specified VidPN implementation. | |
| Prototype | NTSTATUS<br>DisposeOfVidPNImpl<br>(<br>   [in] VIDPN_IMPL hVidPNImpl.<br>); | |

| Inputs | Name | Description |
|---|---|---|
| | hVidPNImpl | VidPN implementation to be disposed off. |

| Outputs | Name | Description |
|---|---|---|
| | — | — |

| Status | Name | Description |
|---|---|---|
| | STATUS_SUCCESS | Request has been completed successfully. |
| | STATUS_VIDEO_INVALID_VIDPN_IMPL | Specified VidPN implementation is invalid. |

| | |
|---|---|
| Side-effects | On successful completion, the specified VidPN implementation is rendered invalid. |
| Remarks | OS should use this DDI when it no longer needs the VidPN implementation it created using CreateVidPNImpl or GetActiveVidPNImpl. |

TABLE 10

Function CommitVidPNImpl

| | | |
|---|---|---|
| Name | CommitVidPNImpl | |
| Purpose | Sets the active VidPN to the specified VidPN implementation. | |
| Prototype | NTSTATUS<br>CommitVidPNImpl<br>(<br>   [in] VIDPN_IMPL hVidPNImpl<br>); | |

| Inputs | Name | Description |
|---|---|---|
| | hVidPNImpl | VidPN implementation to be set as active. |

| Outputs | Name | Description |
|---|---|---|
| | — | — |

| Status | Name | Description |
|---|---|---|
| | STATUS_SUCCESS | Request has been completed successfully. |
| | STATUS_VIDEO_INVALID_VIDPN_IMPL | Specified VidPN implementation is invalid. |
| | STATUS_VIDEO_MODE_NOT_PINNED_ON_VIDPN_TARGET | Video mode has not been pinned on one or more video present targets. Only a functional VidPN implementation can be committed. |
| | STATUS_VIDEO_MODE_NOT_PINNED_ON_VIDPN_SOURCE | Video present source mode has not been pinned on one or more video present sources. Only a functional VidPN implementation can be committed. |

| | |
|---|---|
| Side-effects | On successful completion, the active VidPN on the video card is changed to the specified VidPN implementation. Appropriate video modes and graphics modes are then set on the video present targets and video present sources, according to how they were set on the VidPN implementation using PinModeOnVidPNSource(s) and PinVideoModes. |

TABLE 10-continued

Function CommitVidPNImpl

| | |
|---|---|
| Remarks | OS uses this DDI to change the current VidPN to a functional VidPN implementation it converged on. |

TABLE 11

Function AddVideoPresentPathToVidPNTopology

| | |
|---|---|
| Name | AddVideoPresentPathToVidPNTopology |
| Purpose | Adds a video present target-to-source association to the specified VidPN implementation. |
| Prototype | NTSTATUS<br>AddVideoPresentPathToVidPNTopology<br>(<br>   [in] VIDPN_IMPL                  hVidPNImpl,<br>   [in] PVIDEO_PRESENT_PATH   pVidPresentPathToAdd,<br>   [in] PDWORD                      pdwPreferredMonitors<br>); |

| Intputs | Name | Description |
|---|---|---|
| | hVidPNImpl | VidPN implementation to add video-output-to-render-target association to. |
| | pVidPresentPathToAdd | Video present path (i.e. target to source association) to be added. |
| | pdwPreferredMonitors | Prioritization of monitors, from the most preferred to the least preferred. While choosing among the various VidPN implementations satisfying the specified topology, display miniport must try to support the preferred video mode on the most preferred monitor first, the ideal situation being that monitors (e.g., all) can be driven in their preferred modes. |

| Outputs | Name | Description |
|---|---|---|
| | — | — |

| Status | Name | Description |
|---|---|---|
| | STATUS_SUCCESS | Request has been completed successfully. |
| | STATUS_VIDEO_INVALID_VIDPN_IMPL | Specified VidPN implementation is invalid. |
| | STATUS_VIDEO_INVALID_VIDPN_TARGET | Specified video present target is invalid. |
| | STATUS_VIDEO_INVALID_VIDPN_SOURCE | Specified video present source is invalid. |
| | STATUS_VIDEO_VIDPN_TOPOLOGY_NOT_SUPPORTED | Requested VidPN is not supported by the video card. |

| | |
|---|---|
| Side-effects | On successful completion, the specified VidPN association is added to the specified VidPN implementation. Otherwise, no changes are made. |
| Remarks | OS uses this DDI to incrementally grow a VidPN topology, one present path at a time. |

TABLE 12

Function RemovePresentTargetFromVidPNTopology

| | |
|---|---|
| Name | RemovePresentTargetFromVidPNTopology |
| Purpose | Removes the specified video present target from the topology of the specified VidPN implementation. |
| Prototype | NTSTATUS<br>RemovePresentTargetFromVidPNTopology<br>(<br>   [in] VIDPN_IMPL   hVidPNImpl,<br>   [in] VIDPT_ID     idTargetToRemove<br>); |

| Inputs | Name | Description |
|---|---|---|
| | hVidPNImpl | VidPN implementation to remove video present target from. |
| | idTargetToRemove | Video present target to remove. |

TABLE 12-continued

Function RemovePresentTargetFromVidPNTopology

| | Name | Description |
|---|---|---|
| Outputs | — | — |

| | Name | Description |
|---|---|---|
| Status | | |
| | STATUS_SUCCESS | Request has been completed successfully. |
| | STATUS_VIDEO_INVALID_VIDPN_IMPL | Specified VidPN implementation is invalid. |
| | STATUS_VIDEO_INVALID_VIDPN_TARGET | Specified video present target is invalid. |
| Side-effects | On successful completion, the VidPN association corresponding to the specified video present target is removed from the topology of the specified VidPN implementation. Otherwise, no changes are made. If video present source is removed as part of the output removal, the sets of available graphics video present source modes on the other video present sources in the resulting VidPN may grow to include new modes. | |
| Remarks | OS uses this DDI to remove a video present target from a VidPN implementation. | |

TABLE 13

Function RemovePresentSourceFromVidPNTopology

| Name | RemovePresentSourceFromVidPNTopology |
|---|---|
| Purpose | Removes the specified video present source from the topology of the specified VidPN implementation. |
| Prototype | NTSTATUS<br>RemovePresentSourceFromVidPNTopology<br>(<br>    [in] VIDPN_IMPL    hVidPNImpl,<br>    [in] VIDPS_ID    idSourceToRemove<br>); |

| | Name | Description |
|---|---|---|
| Inputs | | |
| | hVidPNImpl | VidPN implementation to remove video present source from. |
| | idSourceToRemove | Video present source to remove. |

| | Name | Description |
|---|---|---|
| Outputs | — | — |

| | Name | Description |
|---|---|---|
| Status | | |
| | STATUS_SUCCESS | Request has been completed successfully. |
| | STATUS_VIDEO_INVALID_VIDPN_IMPL | Specified VidPN implementation is invalid. |
| | STATUS_VIDEO_INVALID_VIDPN_SOURCE | Specified video present source is invalid. |
| Side-effects | On successful completion, the VidPN associations corresponding to the specified video present source are removed from the topology of the specified VidPN implementation. Otherwise, no changes are made.<br>If successful, the sets of available graphics video present source modes on other video present sources in the resulting VidPN may grow to include new modes. | |
| Remarks | OS should use this DDI to remove a video present source from a topology of the VidPN implementation. | |

TABLE 14

Function EnumCurrentlyAvailVidPNTargetModeSets

| Name | EnumCurrentlyAvailVidPNTargetModeSets |
|---|---|
| Purpose | Enumerates sets of available video present target modes on each of the video present targets in the specified VidPN implementation, supported by the respective monitors connected to these outputs. |
| Prototype | NTSTATUS<br>EnumCurrentlyAvailVidPNTargetModeSets<br>(<br>    [in]    VIDPN_IMPL    hVidPNImpl,<br>    [out]    PVIDEO_MODE_SET*    ppvmsAvailable<br>); |

| | Name | Description |
|---|---|---|
| Inputs | | |
| | hVidPNImpl | VidPN implementation on whose video present targets sets of available video modes must be enumerated. |

TABLE 14-continued

Function EnumCurrentlyAvailVidPNTargetModeSets

| Outputs | Name | Description |
|---|---|---|
| | ppvmsAvailable | Placeholder for the array of video mode sets supported on the video present targets in the specified VidPN implementation. Video mode sets are ordered by their outputs IDs (smallest first). If no video modes are supported on a given video output (e.g. output has been disabled), display miniport should return NULL for its video mode set. |

| Status | Name | Description |
|---|---|---|
| | STATUS_SUCCESS | Request has been completed successfully. |
| | STATUS_VIDEO_INVALID_VIDPN_IMPL | Specified VidPN implementation is invalid. |
| | STATUS_NO_MEMORY | Display miniport failed to allocate enough system memory for the requested VidPN. |

| | |
|---|---|
| Allocation ownership semantics | Display miniport is responsible for allocating a big enough buffer for the array of sets of available video modes in the system memory using DlpAllocatePool. Display loader is responsible for de-allocating this buffer once it's done with it. |
| Side-effects | None. |
| Remarks | Note that video card might not support all the video modes supported by the monitor. Hence OS must enumerate video modes despite the fact that it is aware of what video modes each monitor supports. OS shall validate that enumerated video mode sets are subsets of the video mode sets supported by the respective monitors. Note that setting one of the enumerated video modes on one of the video present targets may invalidate enumerated video mode on another video output. This is the primary reason for enumerating available (e.g., all) video mode sets on all video present targets in a single call, so that the client could choose from the options potentially available to it. |

TABLE 15

Function PinModeOnVidPNTarget

| | |
|---|---|
| Name | PinModeOnVidPNTarget |
| Purpose | Pins the specified video present target mode on the specified VidPN target, guaranteeing that display miniport shall not enumerate (and allow to be pinned) video present target modes on other VidPN targets that would invalidate this mode. |
| Prototype | NTSTATUS<br>PinModeOnVidPNTarget<br>(<br>    [in]    VIDPN_IMPL    hVidPNImpl,<br>    [in]    VIDEO_PRESENT_TARGET    pTargetToPinModeOn,<br>    [in]    DWORD    dwVideoPresentTargetModeToPin,<br>    [out]    PBOOLEAN    pbOtherVideoPresentTargetModesInvalidated<br>); |

| Inputs | Name | Description |
|---|---|---|
| | hVidPNImpl | VidPN implementation on whose video present target the specified video present target modes is to be pinned. |
| | pTargetToPinModeOn | Video present target on which the specified video present target mode is to be pinned. |
| | dwVideoPresentTargetModeToPin | Index of the video present target mode from the set of available modes on the specified video present target, enumerated through EnumCurrentlyAvailVidPNTargetModeSets, to pin. |
| | pbOtherVideoPresentTargetModesInvalidated | Placeholder for the predicate, which if true signifies that at least one video present target mode on some other video present target has been invalidated and the OS needs |

TABLE 15-continued

Function PinModeOnVidPNTarget

| | | to re-query the available video present target modes using EnumCurrentlyAvailVidPNTargetModeSets. |
|---|---|---|
| Ouputs | Name | Description |
| | — | — |
| Status | Name | Description |
| | STATUS_SUCCESS | Request has been completed successfully. |
| | STATUS_VIDEO_INVALID_VIDPN_IMPL | Specified VidPN implementation is invalid. |
| | STATUS_VIDEO_INVALID_VIDPN_TARGET | Specified video present target is invalid. |
| | STATUS_VIDEO_INVALID_VIDEO_PRESENT_TARGET_MODE | The specified video present target mode was not enumerated as available. |
| | STATUS_VIDEO_PRESENT_TARGET_MODE_ALREADY_PINNED | Video present target mode has already been pinned on the specified video present target. Caller must first unpin the video present target mode in question using UnpinModeOnVidPNTarget. |
| | STATUS_VIDEO_ENUMERATED_VIDPN_TARGET_MODESET_CHANGED | Previously enumerated set of available video present target modes on the specified video present target has changed. OS must reenumerate the set by using EnumCurrentlyAvailVidPNTargetModeSets. |
| | STATUS_VIDEO_MODE_NOT_PINNED_ON_VIDPN_SOURCE | Video mode was not pinned on one or more of the video present sources. Semi-functional VidPN implementation must be provided. |
| Side-effects | None. | |
| Remarks | OS uses this DDI to pin a video present target mode for each of the video present targets in the VidPN implementation, prior to activating that implementation using CommitVidPNImpl. Note that video present targets must have a video mode selected on them. Video present target modes on the video present target other than the pinned mode are subject to invalidation when a video present target mode on another video present target is set. Display miniport shall guarantee that no video present target mode that would invalidate any of the pinned video present target modes is enumerated and/or pinnable (from previous enumerations) on any of the video present targets in the specified VidPN implementation. | |

TABLE 16

Function UnpinModeOnVidPNTarget

| Name | UnpinModeOnVidPNTarget | |
|---|---|---|
| Purpose | Unpins the currently selected video present target mode on the specified video present target of the specified VidPN implementation, freeing display miniport up from the obligation to disallow video present target modes on other video present ources that would invalidate the previously selected video present target mode on the specified video present target. | |
| Prototype | NTSTATUS UnpinModeOnvidPNTarget (    [in]    VIDPN_IMPL    hVidPNImpl,    [in]    PVIDEO_PRESENT_TARGET    pTargetToUnpinModeOn,    [out]    PBOOLEAN    pbNewVideoPresentTargetModesAvailable ); | |
| Inputs | Name | Description |
| | hVidPNImpl | VidPN implementation on whose video present target the specified video present |

TABLE 16-continued

Function UnpinModeOnVidPNTarget

|  |  |  |
|---|---|---|
|  | pTargetToUnpinModeOn | target mode is to be unpinned. VidPN target on which the specified video present target mode is to be unpinned. |
|  | pbNewVideoPresentTargetModesAvailable | Placeholder for the predicate, which if true signifies that at least one new video present target mode has become available on some other video present target and the OS needs to re-query the available video present target modes using EnumCurrentlyAvailVidPNTargetModeSets. |

| Outputs | Name | Description |
|---|---|---|
|  | — | — |

| Status | Name | Description |
|---|---|---|
|  | STATUS_SUCCESS | Request has been completed successfully. |
|  | STATUS_VIDEO_INVALID_VIDPN_IMPL | Specified VidPN implementation is invalid. |
|  | STATUS_VIDEO_INVALID_VIDPN_TARGET | Specified video present target is invalid. |
|  | STATUS_VIDEO_MODE_NOT_PINNED_ON_VIDPN_TARGET | Specified video present target doesn't have a selected mode. |

| Side-effects | None. |
|---|---|
| Remarks | OS uses this DDI when it is no longer interested in support for the specified video present target mode on the specified video present target. This could, for instance, be the case if a pinned video present target mode invalidates a desired video present target mode on another video present target. |

TABLE 17

Function PinModeOnEachVidPNTarget

| Name | PinModeOnEachVidPNTarget |
|---|---|
| Purpose | Pins a video mode for each video present target in the specified VidPN implementation. |
| Prototype | NTSTATUS<br>PinModeOnEachVidPNTarget<br>(<br>    [in] VIDPN_IMPL    hVidPNImpl,<br>    [in] PDWORD    pdwVideoModesToPin<br>); |

| Inputs | Name | Description |
|---|---|---|
|  | hVidPNImpl | VidPN implementation on whose video present targets specified video modes will be pinned. |
|  | pdwVideoModesToPin | Array of video mode indices into the respective video mode sets enumerated using EnumCurrentlyAvailVidPNTargetModeSets. Video modes are ordered by their video output IDs (smallest first). |

| Outputs | Name | Description |
|---|---|---|
|  | — | — |

TABLE 17-continued

Function PinModeOnEachVidPNTarget

| Status | Name | Description |
|---|---|---|
| | STATUS_SUCCESS | Request has been completed successfully. |
| | STATUS_VIDEO_INVALID_VIDPN_IMPL | Specified VidPN implementation is invalid. |
| | STATUS_VIDEO_INVALID_VIDEO_PRESENT_TARGET_MODE | One or more of the specified video mode IDs were invalid. |
| | STATUS_VIDEO_ENUMERATED_VIDPN_TARGET_MODESET_CHANGED | Previously enumerated set of available video modes on the specified video output has changed. OS must reenumerate the set by using EnumCurrentlyAvailVidPNTargetModeSets. |
| Side-effects | None. | |
| Remarks | This DDIs pins a video mode for each video output in the VidPN from the sets of video modes available on respective outputs, enumerated using EnumCurrentlyAvailVidPNTargetModeSets. Note that pinning a video mode on one video output does not invalidate any previously enumerated video modes on the other video present targets, since available video mode sets depend only on the video output codec driving it, and hence only on the specified VidPN implementation. The only way a given video mode may become invalidated is if the video card's operational capabilities have changed due to a change in in its power management state. | |

TABLE 18

Function EnumCurrentlyAvailVidPNSourceModeSets

| | | |
|---|---|---|
| Name | EnumCurrentlyAvailVidPNSourceModesets | |
| Purpose | Enumerates sets of available video present source modes on each of the video present sources in the specified VidPN implementation. | |
| Prototype | NTSTATUS<br>EnumCurrentlyAvailVidPNSourceModeSets<br>(<br>    [in]    VIDPN_IMPL                             hVidPNImpl,<br>    [out]  PVIDEO_PRESENT_SOURCE_MODE_SET*  pprmsAvailable<br>); | |

| Inputs | Name | Description |
|---|---|---|
| | hVidPNImpl | VidPN implementation on whose views sets of available video present source modes must be enumerated. |

| Outputs | Name | Description |
|---|---|---|
| | pprmsAvailable | Array of video present source mode sets available on the video present sources in the specified VidPN implementation. Video present source mode sets are ordered by their video present sources' IDs (smallest first). |

| Status | Name | Description |
|---|---|---|
| | STATUS_SUCCESS | Request has been completed successfully. |
| | STATUS_VIDEO_INVALID_VIDPN_IMPL | Specified VidPN implementation is invalid. |
| | STATUS_NO_MEMORY | Display miniport failed to allocate enough system memory for the requested VidPN. |
| | STATUS_VIDEO_MODE_NOT_PINNED_ON_VIDPN_TARGET | Video mode has not been pinned on one or more video present targets. Semi-functional VidPN implementation must be provided. |
| Side-effects | None. | |
| Allocation ownership semantics | Display miniport is responsible for allocating a big enough buffer for the array of sets of available graphics modes in the system memory using DlpAllocatePool. Display loader is responsible for de-allocating this buffer once it's done with it. | |

TABLE 18-continued

Function EnumCurrentlyAvailVidPNSourceModeSets

| | |
|---|---|
| Remarks | Before calling this DDI, OS must select a video present target mode for each of the VidPN targets. Note that the spatial resolution of the video mode set does not necessarily correspond to that of the (graphics) video present source mode, since video card can do h/w scaling (in its video output codec). Display miniport must not report (graphics) video present source modes which require GPU based scaling. This functionality shall be done in the graphics subsystem layer of the OS. Display miniport must not report (graphics) video present source modes selecting which would prevent another video present source from supporting at least one video present source mode. |

TABLE 19

Function PinModeOnVidPNSource

| | | | |
|---|---|---|---|
| Name | PinModeOnVidPNSource | | |
| Purpose | Pins the specified video present source mode on the specified video present source of the specified VidPN implementation, guaranteeing that display miniport shall not enumerate (and allow to be pinned) video present source modes on other video present sources that would invalidate this mode. | | |
| Prototype | NTSTATUS<br>PinModeOnVidPNSource<br>(<br>    [in]    VIDPN_IMPL                 hVidPNImpl,<br>    [in]    PVIDEO_PRESENT_SOURCE  pSourceToPinModeOn,<br>    [in]    DWORD                     dwVideoPresentSourceModeToPin,<br>    [out]  PBOOLEAN                 pbOtherVideoPresentSourceModesInvalidated<br>); | | |
| Inputs | Name | | Description |
| | hVidPNImpl | | VidPN implementation on whose video present target the specified video present source modes is to be pinned. |
| | pSourceToPinModeOn | | Video present source on which the specified video present source mode is to be pinned. |
| | dwVideoPresentSourceModeToPin | | Index of the video present source mode from the set of available modes on the specified VidPN source, enumerated through EnumCurrentlyAvailVidPNSourceModeSets, to pin. |
| | pbOtherVideoPresentSourceModesInvalidated | | Placeholder for the predicate, which if true signifies that at least one video present source mode on some other VidPN source has been invalidated and the OS needs to re-query the available video present source modes using EnumCurrentlyAvailVidPNSourceModeSets. |
| Outputs | Name | | Description |
| | — | | — |
| Status | Name | | Description |
| | STATUS_SUCCESS | | Request has been completed successfully. |
| | STATUS_VIDEO_INVALID_VIDPN_IMPL | | Specified VidPN implementation is invalid. |
| | STATUS_VIDEO_INVALID_VIDPN_SOURCE | | Specified VidPN source is invalid. |
| | STATUS_VIDEO_INVALID_VIDEO_PRESENT_SOURCE_MODE | | The specified video present source mode was not enumerated as available. |
| | STATUS_VIDEO_MODE_ALREADY_PINNED_ON_VIDPN_SOURCE | | Video present source mode has already been pinned on the specified VidPN source. Caller must first unpin the video present source mode in question using UnpinModeOnVidPNSource. |

TABLE 19-continued

Function PinModeOnVidPNSource

| | | |
|---|---|---|
| | STATUS_VIDEO_ENUMERATED_VIDPN_TARGET_MODESET_CHANGED | Previously enumerated set of available video present source modes on the specified VidPN source has changed. OS must reenumerate the set by using EnumCurrentlyAvailVidPNSourceModeSets. |

| | |
|---|---|
| Side-effects | None. |
| Remarks | OS uses this DDI to pin a video present source mode for each of the video present sources in the VidPN implementation, prior to activating that implementation using CommitVidPNImpl. |
| | Note that video present targets must have a video mode selected on them. |
| | Video present source modes on the video present source other than the pinned mode are subject to invalidation when a video present source mode on another video present source is set. Display miniport shall guarantee that no video present source mode that would invalidate any of the pinned video present source modes is enumerated and/or pinnable (from previous enumerations) on any of the video present sources in the specified VidPN implementation. |

TABLE 20

Function UnpinModeOnVidPNSource

| | | | |
|---|---|---|---|
| Name | UnpinModeOnVidPNSource | | |
| Purpose | Unpins the currently selected video present source mode on the specified video present source of the specified VidPN implementation, freeing display miniport up from the obligation to disallow video present source modes on other video present ources that would invalidate the previously selected video present source mode on the specified video present source. | | |
| Prototype | NTSTATUS | | |
| | UnpinModeOnVidPNSource | | |
| | ( | | |
| |    [in] | VIDPN_IMPL | hVidPNImpl, |
| |    [in] | PVIDEO_PRESENT_SOURCE | pSourceToUnpinModeOn, |
| |    [out] | PBOOLEAN | pbNewVideoPresentSourceModesAvailable |
| | ); | | |

| Inputs | Name | Description |
|---|---|---|
| | hVidPNImpl | VidPN implementation on whose video present targets the specified video present source modes is to be unpinned. |
| | pSourceToUnpinModeOn | Video present source on which the specified video present source mode is to be unpinned. |
| | pbNewVideoPresentSourceModesAvailable | Placeholder for the predicate, which if true signifies that at least one new video present source mode has become available on some other video present source and the OS needs to re-query the available video present source modes using EnumCurrentlyAvailVidPNSourceModeSets. |

| Outputs | Name | Description |
|---|---|---|
| | — | — |

| Status | Name | Description |
|---|---|---|
| | STATUS_SUCCESS | Request has been completed successfully. |
| | STATUS_VIDEO_INVALID_VIDPN_IMPL | Specified VidPN implementation is invalid. |

TABLE 20-continued

Function UnpinModeOnVidPNSource

| | | |
|---|---|---|
| | STATUS_VIDEO_INVALID_VIDPN_SOURCE | Specified video present source is invalid. |
| | STATUS_VIDEO_MODE_NOT_PINNED_ON_VIDPN_SOURCE | Specified video present source doesn't have a selected mode. |
| Side-effects | None. | |
| Remarks | OS uses this DDI when it is no longer interested in support for the specified video present source mode on the specified video present source. This could, for instance, be the case if a pinned video present source mode invalidates a desired video present source mode on another video present source. | |

TABLE 21

Function PinModeOnEachVidPNSource

| | | |
|---|---|---|
| Name | PinModeOnEachVidPNSource | |
| Purpose | Pins a video present source mode for each of the video present sources in the VidPN implementation, in a single call. | |
| Prototype | NTSTATUS<br>PinModeOnEachVidPNSource<br>(<br>    [in]    VIDPN_IMPL    hVidPNImpl,<br>    [in]    PDWORD    pdwRenderingModeIDsToPin<br>); | |
| Inputs | Name | Description |
| | hVidPNImpl | VidPN implementation on whose video present source specified video present source modes will be pinned. |
| | pdwRenderingModeIDsToPin | Array of video present source mode IDs of video present source modes to be pinned, where each mode is from the mode set of the respective video present sources', , enumerated via EnumCurrentlyAvailVidPNSourceModeSets. Video present source modes are ordered by their video present sources' IDs (smallest first). |
| Outputs | Name | Description |
| | — | — |
| Status | Name | Description |
| | STATUS_SUCCESS | Request has been completed successfully. |
| | STATUS_VIDEO_INVALID_VIDPN_IMPL | Specified VidPN implementation is invalid. |
| | STATUS_VIDEO_INVALID_VIDEO_PRESENT_SOURCE_MODE_ID | One or more of the specified video present source mode IDs were invalid. |
| | STATUS_VIDEO_ENUMERATED_VIDPN_TARGET_MODESET_CHANGED | Previously enumerated set of available video present source modes on the specified video present source has changed. OS must reenumerate the set by using EnumCurrentlyAvailVidPNSourceModeSets. |
| | STATUS_VIDEO_PRESENT_SOURCE_MODES_ARE_MUTUALLY_EXCLUSIVE | At least one of the specified video present source modes on one of the video present sources invalidates another specified video present source mode on |

TABLE 21-continued

Function PinModeOnEachVidPNSource

| | | |
|---|---|---|
| | STATUS_VIDEO_MODE_NOT_PINNED_ON_VIDPN_TARGET | another video present source in the specified VidPN. Video mode was not pinned on one or more of the video present targets. Semi-functional VidPN implementation must be provided. |
| Side-effects | None. | |
| Remarks | This DDIs pins a video present source mode for each video present source in the VidPN from the set of video present source modes available on the respective video present sources, enumerated using EnumCurrentlyAvailVidPNSourceModeSets.<br>This DDI should be used when the specified rendering multi-mode for a given VidPN is known to work, such as the case when OS logs a known user in, or, on a previously encountered monitor HPD-event-induced VidPN, where a previously used configuration has been persisted and can still be reused.<br>Note that if any of the video present sources had a video present source mode pinned on them using PinRenderMode, that mode shall be ignored and assuming the specified video present source modes can be set, the call shall succeed. This is different from the calling semantics of PinRenderMode which will fail if a video present source mode is already selected on the specified video present source. | |

TABLE 22

Function EnumCurrentlyAvailFilteringTechniqueSets

| Name | EnumCurrentlyAvailFilteringTechniqueSets | |
|---|---|---|
| Purpose | Enumerates sets of available filtering techniques on each of the video present sources in the specified functional VidPN implementation. | |
| Prototype | NTSTATUS<br>EnumCurrentlyAvailFilteringTechniqueSets<br>(<br>  [in]    VIDPN_IMPL               hVidPNImpl,<br>  [out]  PFILTERING_TECHNIQUES_SET*  ppftsAvailable<br>); | |
| Inputs | Name | Description |
| | hVidPNImpl | VidPN implementation on whose views the sets of available filtering techniques must be enumerated. |
| Outputs | Name | Description |
| | ppftsAvailable | Array of filtering techniques sets available on the video present sources in the specified VidPN implementation.<br>Video present source mode sets are ordered by their video present sources' IDs (smallest first). |
| Status | Name | Description |
| | STATUS_SUCCESS | Request has been completed successfully. |
| | STATUS_VIDEO_INVALID_VIDPN_IMPL | Specified VidPN implementation is invalid. |
| | STATUS_NO_MEMORY | Display miniport failed to allocate enough system memory for the requested VidPN. |
| | STATUS_VIDEO_MODE_NOT_PINNED_ON_VIDPN_TARGET | Video mode was not pinned on one or more video present target. A functional VidPN implementation must be provided. |
| | STATUS_VIDEO_MODE_NOT_PINNED_ON_VIDPN_SOURCE | Video present source mode was not pinned on one or more video present source. A functional VidPN implementation must be provided. |

TABLE 22-continued

Function EnumCurrentlyAvailFilteringTechniqueSets

| | |
|---|---|
| Side-effects | None. |
| Allocation ownership semantics | Display miniport is responsible for allocating a big enough buffer for the array of sets of available graphics modes in the system memory using DlpAllocatePool. Display loader is responsible for de-allocating this buffer once it's done with it. |
| Remarks | Before calling this DDI, OS must pin a video mode for each of the video present targets and pin a video present source mode for each of the video present sources in the specified VidPN implementation (i.e. it needs to construct a functional VidPN). |

TABLE 23

Function PinFilteringTechniqueOnVidPNSource

| | |
|---|---|
| Name | PinFilteringTechniqueOnVidPNSource |
| Purpose | Pins the specified filtering technique on the specified video present source of the specified VidPN implementation, guaranteeing that display miniport shall not enumerate (and allow to be set) filtering techniques on other video present sources that would invalidate this filtering technique. |
| Prototype | NTSTATUS<br>PinFilteringTechnique<br>(<br>  [in]    VIDPN_IMPL   hVidPNImpl,<br>  [in]    VIDPS_ID      idSourceToPinModeOn,<br>  [in]    DWORD         dwFilteringTechniqueToSelect,<br>  [out]  PBOOLEAN     pbOtherFilteringTechniquesInvalidated<br>); |

| Inputs | Name | Description |
|---|---|---|
| | hVidPNImpl | VidPN implementation on whose video present targets the specified video present source modes is to be pinned. |
| | idRenderTargetToSelectModeOn | Video present source on which the specified filtering technique is to be pinned. |
| | dwFilteringTechniqueToSelect | Index of the filtering technique from the set of available filtering techniques on the specified video present source, enumerated through EnumCurrentlyAvailFilteringTechniqueSets, to pin. |
| | pbOtherFilteringTechniquesInvalidated | Placeholder for the predicate, which if true signifies that at least one filtering technique on some other video present source has been invalidated and the OS needs to re-query the available filtering techniques using EnumCurrentlyAvailFilteringTechniqueSets. |

| Outputs | Name | Description |
|---|---|---|
| | — | — |

| Status | Name | Description |
|---|---|---|
| | STATUS_SUCCESS | Request has been completed successfully. |
| | STATUS_VIDEO_INVALID_VIDPN_IMPL | Specified VidPN implementation is invalid. |
| | STATUS_VIDEO_INVALID_VIDPN_SOURCE | Specified video present source is invalid. |
| | STATUS_VIDEO_INVALID_FLTRTECHNIQUE | The specified filtering technique has not been enumerated as available. |
| | STATUS_VIDEO_FLTRTECHNIQUE_ALREADY_PINNED | Filtering technique has already been pinned on the specified video present source. Caller must first unpin the filtering technique in question using UnpinFilteringTechnique. |

TABLE 23-continued

Function PinFilteringTechniqueOnVidPNSource

| | | |
|---|---|---|
| | STATUS_VIDEO_ENUMERATED_TECHNIQUE_SET_CHANGED | Previously enumerated set of available filtering techniques on the specified video present source has changed. OS must reenumerate the set by using EnumCurrentlyAvailFilteringTechniqueSets. |
| | STATUS_VIDEO_MODE_NOT_PINNED_ON_VIDPN_TARGET | Video mode has not been pinned on one or more video present targets. A functional VidPN implementation must be provided. |
| | STATUS_VIDEO_MODE_NOT_PINNED_ON_VIDPN_SOURCE | Video present source mode was not selected on one or more video present sources. A functional VidPN implementation must be provided. |
| Side-effects | None. | |
| Remarks | OS uses this DDI to select a filtering technique for each of the video present sources in the VidPN implementation, prior to setting that implementation as the current configuration, using CommitVidPNImpl.<br>Note that this step is optional, and if not explicitly specified, driver should use the default filtering technique - i.e. no filtering.<br>Note that video present targets must have a video mode pinned on them and video present sources must have a video present source mode pinned on them - i.e. the VidPN must be functional.<br>Filtering techniques on the video present source other than the pinned technique are subject to invalidation when a filtering technique on another video present source is set. Display miniport shall guarantee that no filtering technique that would invalidate any of the pinned techniques is enumerated and/or pinnable (from previous enumerations) on any of the video present sources in the specified VidPN implementation. | |

TABLE 24

Function UnpinFilteringTechniqueOnVidPNSource

| | | | |
|---|---|---|---|
| Name | UnpinFilteringTechniqueOnVidPNSource | | |
| Purpose | Unpins the currently pinned filtering technique on the specified video present source of the specified VidPN implementation, freeing display miniport up from the obligation to disallow filtering techniques on other video present source that would invalidate the previously selected filtering technique on the specified video present source. | | |
| Prototype | NTSTATUS<br>UnpinFilteringTechnique<br>(<br>   [in]    VIDPN_IMPL  hVidPNImpl,<br>   [in]    VIDPS_ID     idSorceToUnpinTechniqueOn,<br>   [out]  PBOOLEAN    pbNewFilteringTechniquesAvailable<br>); | | |
| Inputs | Name | | Description |
| | hVidPNImpl | | VidPN implementation on whose video present targets the specified video present source modes is to be pinned. |
| | idSorceToUnpinTechniqueOn | | Video present source on which the specified video present source mode is to be pinned. |
| | bNewFilteringTechniquesAvailable | | Placeholder for the predicate, which if true signifies that at least one new filtering technique has become available on some other video present source and the OS needs to re-query the available filtering techniques using EnumCurrentlyAvail FilteringTechniqueSets. |

TABLE 24-continued

Function UnpinFilteringTechniqueOnVidPNSource

| Outputs | Name | Description |
|---|---|---|
| | — | — |

| Status | Name | Description |
|---|---|---|
| | STATUS_SUCCESS | Request has been completed successfully. |
| | STATUS_VIDEO_INVALID_VIDPN_IMPL | Specified VidPN implementation is invalid. |
| | STATUS_VIDEO_INVALID_VIDPN_SOURCE | Specified video present source is invalid. |
| | STATUS_VIDEO_FLTRTECHNIQUE_NOT_PINNED_ON_VIDPN_SOURCE | Specified video present source doesn't have a pinned filtering technique. |

| Side-effects | None. |
|---|---|
| Remarks | OS uses this DDI when it is no longer interested in support for the specified filtering technique on the specified video present source. This could, for instance, be the case if a selected filtering technique invalidates a desired filtering technique on another video present source.<br>When no filtering technique is selected on the video present source the default filtering technique is "no filtering", represented through a zero filtering technique ID. |

TABLE 25

Function PinFilteringTechniqueOnEachVidPNSource

| Name | PinFilteringTechniqueOnEachVidPNSource |
|---|---|
| Purpose | Pins a filtering technique for each of the video present sources in the VidPN implementation, in a single call. |
| Prototype | NTSTATUS<br>PinFilteringTechniques<br>(<br>    [in]    VIDPN_IMPL    hVidPNImpl,<br>    [in]    PDWORD    pdwFilteringTechniqueIDsToPin<br>); |

| Inputs | Name | Description |
|---|---|---|
| | hVidPNImpl | VidPN implementation on whose video present source specified filtering techniques will be pinned. |
| | pdwFilteringTechniqueIDsToPin | Array of filtering technique IDs from the filtering technique sets of respective video present sources. Filtering techniques are ordered by their video present sources' IDs (smallest first). |

| Outputs | Name | Description |
|---|---|---|
| | — | — |

| Status | Name | Description |
|---|---|---|
| | STATUS_SUCCESS | Request has been completed successfully. |
| | STATUS_VIDEO_INVALID_VIDPN_IMPL | Specified VidPN implementation is invalid. |
| | STATUS_VIDEO_INVALID_FLTRTECHNIQUE_ID | One or more of the specified filtering technique IDs were invalid. |
| | STATUS_VIDEO_FLTRMODES_ARE_MUTUALLY_EXCLUSIVE | At least one of the specified filtering techniques on one of the video present sources invalidates another specified filtering technique on another video present source in the specified VidPN. |

TABLE 25-continued

Function PinFilteringTechniqueOnEachVidPNSource

| | | |
|---|---|---|
| | STATUS_VIDEO_MODE_NOT_PINNED_ON_VIDPN_TARGET | Video mode was not pinned on one or more video present targets. A functional VidPN implementation must be provided. |
| | STATUS_VIDEO_MODE_NOT_PINNED_ON_VIDPN_SOURCE | Video present source mode was not pinned on one or more video present sources. A functional VidPN implementation must be provided. |
| Side-effects | None. | |
| Remarks | This DDIs selects a filtering technique for each video present source in the VidPN from the sets of filtering techniques available on the respective video present sources, enumerated using EnumCurrentlyAvailFilteringTechniqueSets. Zero filtering technique ID represents no filtering. This DDI should be used when the specified distribution of filtering techniques across the video present sources for a given VidPN is known to work, such as the case when OS logs a known user in, or, on a previously encountered monitor HPD event induced VidPN, where a previously used configuration can be reused. | |

TABLE 26

Function Filtering_Techniques_Set

| | Name | |
|---|---|---|
| Name | FILTERING_TECHNIQUES_SET | |
| Purpose | Filtering techniques set | |
| Definition | typedef struct _FILTERING_TECHNIQUES_SET<br>{<br>  DWORD                              dwNumOfFilteringTechniques;<br>  PFILTERING_TECHNIQUE   pFilteringTechniques;<br>}<br>FILTERING_TECHNIQUES_SET, *PFILTERING_TECHNIQUES_SET; | |
| | Name | Description |
| Fields | dwNumOfFilteringTechniques | Number of filtering techniques in the set. |
| | pFilteringTechniques | Array of set's elements (number of entries is determined by dwNumOfFilteringTechniques). |
| Remarks | Filtering techniques sets are used to describe sets of available filtering techniques on the video present sources in a given VidPN implementation. | |

TABLE 27

Function Filtering_Technique

| | | |
|---|---|---|
| Name | FILTERING_TECHNIQUE | |
| Purpose | Filtering technique descriptor. | |
| Definition | typedef enum _FILTERING_TECHNIQUE<br>{<br>  TBD<br>}<br>VIDEO_MODE, *PVIDEO_MODE; | |
| Remarks | Filtering technique specifies what filtering algorithm GPU and/or video output codec uses to process the video present source's primary surface while converting the rendered frame into a video mode field. | |

TABLE 28

Function Video_Present_Target

| | | |
|---|---|---|
| Name | VIDEO_PRESENT_TARGET | |
| Purpose | Video present target descriptor. | |
| Definition | typedef struct _VIDPT<br>{<br>  VIDEO_OUTPUT_TECHNOLOGY     VideoOutputTechnology;<br>  VIDEO_OUTPUT_HPD_AWARENESS  VideoOutputHPDAwareness;<br>  DWORD                                       dwCharacteristics;<br>}<br>VIDEO_PRESENT_TARGET, *PVIDEO_PRESENT_TARGET; | |

TABLE 28-continued

Function Video_Present_Target

|  | Name | Description |
|---|---|---|
| Fields | VideOutputTechnology | Type of the video output technology (see VIDEO_OUTPUT_TECHNOLOGY for more details). |
|  | VideoOutputHPDAwareness | Type of the video output's HPD awareness (see VIDEO_OUTPUT_HPD_AWARENESS for more details). |
|  | dwCharacteristics | Bit array describing predicative characteristics of the video output, with the following flags defined: TBD |
| Remarks | OS obtains descriptors for each video output in the VidPN by enumerating them with EnumAvailVidPNTargets. | |

TABLE 29

Function Video_Output_Technology

| | |
|---|---|
| Name | VIDEO_OUTPUT_TECHNOLOGY |
| Purpose | Video output technology descriptor. |
| Definition | typedef enum _VIDEO_OUTPUT_TECHNOLOGY<br>{<br>    VOT_Uninitialized     = 0,<br>    VOT_HD15     = 1,<br>    VOT_DVI     = 2,<br>    VOT_HDMI     = 3,<br>    VOT_HDMI2     = 4,<br>    VOT_SVideo_4pin     = 5,<br>    VOT_SVideo_7pin     = 6,<br>    VOT_RCA_composite     = 7,<br>    VOT_RCA_3component     = 8,<br>    VOT_BNC     = 9,<br>    VOT_RF     = 10,<br>    VOT_Other     = 255<br>}<br>VIDEO_OUTPUT_TECHNOLOGY, *PVIDEO_OUTPUT_TECHNOLOGY; |
| Remarks | Video output technology is used to determine the hard-coded list of video modes supported by the monitor, when monitor descriptor is not available. Filtering technique is a video output codec input characteristic. YUV->RGB transformation is a video output codec output characteristic. Defaults recommendation to IHVs: SD -> 601, HD -> 709. This could be wrong so you want to be able to override it. |

TABLE 30

Function Video_Output_HPD_Awareness

| | |
|---|---|
| Name | VIDEO_OUTPUT_HPD_AWARENESS |
| Purpose | Video output HPD awareness descriptor. |
| Definition | typedef enum _VIDEO_OUTPUT_HPD_AWARENESS<br>{<br>    VOHPD_Uninitialized     = 0,<br>    VOHPD_None     = 1<br>    VOHPD_DestructivelyPolled     = 2,<br>    VOHPD_NonDestructivelyPolled     = 3,<br>    VOHPD_Interruptible     = 4<br>}<br>VIDEO_OUTPUT_HPD_AWARENESS, *PVIDEO_OUTPUT_HPD_AWARENESS; |
| Remarks | Video output HPD awareness is used to represent the level of monitor connectivity sensed by a video card on its video output. Video output has:<br>4. Interruptible HPD-awareness iff display miniport can asynchronously notify the OS about monitor arrivals/departures.<br>5. Non-Destructively Polled HPD-awareness iff display miniport can report monitor arrivals/departures to the OS only by periodically polling the underlying h/w, without causing visual artifacts.<br>6. Destructively Polled HPD-awareness iff display miniport can report monitor arrivals/departures to the OS only by sporadically polling the underlying h/w, causing visual artifacts on each poll.<br>7. No HPD-awareness iff display miniport is not aware of monitor arrivals/departures and, hence, can not asynchronously notify or synchronously report occurrences of such events to the OS |

TABLE 31

Function Video_Present_Source

| | |
|---|---|
| Name | VIDEO_PRESENT_SOURCE |
| Purpose | Video present source descriptor. |
| Definition | typedef struct _VIDEO_PRESENT_SOURCE<br>{<br>    VIDEO_PRESENT_SOURCE_CONTENT_LAYOUT ContentLayout;<br>    DWORD dwCharacteristics;<br>}<br>VIDEO_PRESENT_SOURCE, *PVIDEO_PRESENT_SOURCE; |

| | Name | Description |
|---|---|---|
| Fields | dwCharacteristics | Bit array describing predicative characteristics of the video present source, with the following flags defined: TBD |
| | ContentLayout | Type of the layout format in which video present source's content is stored (see VIDEO_PRESENT_SOURCE_CONTENT_LAYOUT for more details). |
| Remarks | | OS obtains descriptors for each video present source in the VidPN by enumerating them with EnumAvailVidPNTargets. |

TABLE 32

Function Video_Present_Source_Content_Layout

| | |
|---|---|
| Name | VIDEO_PRESENT_SOURCE_CONTENT_LAYOUT |
| Purpose | Video present source content's layout format. |
| Definition | typedef enum_<br>VIDEO_PRESENT_SOURCE_CONTENT_LAYOUT<br>{<br>    VPSCL_Linear = 1,<br>    VPSCL_Other = 2<br>}<br>VIDEO_PRESENT_SOURCE_CONTENT_LAYOUT,<br>*PVIDEO_PRESENT_SOURCE_CONTENT_LAYOUT; |
| Remarks | Video present source's layout format is used to determine how the content of the image is arranged in the respective primary surface. |

TABLE 33

Function Video_Present_Path

| | |
|---|---|
| Name | VIDEO_PRESENT_PATH |
| Purpose | Video present target to source mapping. |
| Definition | typedef struct _VIDEO_PRESENT_PATH<br>{<br>    PVIDEO_PRESENT_TARGET pVidPT;<br>    PVIDEO_PRESENT_SOURCE pVidPS;<br>}<br>VIDEO_PRESENT_PATH, *PVIDEO_PRESENT_PATH; |
| Remarks | This type is used to describe a mapping from a single video present target to a single video present source in a VidPN. |

TABLE 34

Function VidPN_Topology

| | |
|---|---|
| Name | VIDPN_TOPOLOGY |
| Purpose | VidPN topology descriptor. |
| Definition | typedef struct _VIDPN_TOPOLOGY<br>{<br>    DWORD dwNumOfVidPresentPaths;<br>    VIDEO_PRESENT_PATH arr_pVidPresentPaths[1];<br>}<br>VIDPN_TOPOLOGY, *PVIDPN_TOPOLOGY; |

| | Name | Description |
|---|---|---|
| Fields | dwNumOfVidPresentPaths | Number of video modes in the set. |
| | arr_pVidPresentPaths | Array of dwNumOfVidPresentPaths elements of the video present paths in the VidPN topology. |
| Remarks | | This type is used to describe VidPNs in CreateVidPNImpl and GetCurrentVidPNTopology. |

TABLE 35

Function VidPN_Impl

| | |
|---|---|
| Name | VIDPN_IMPL |
| Purpose | VidPN implementation handle. |
| Definition | typedef ULONG_PTR VIDPN_IMPL, *PVIDPN_IMPL; |
| Remarks | This type is used to describe handles to VidPN implementations returned by the display miniport for a particular VidPN. |

TABLE 36

Function Video_Present_Target_Mode_Set

| | |
|---|---|
| Name | VIDEO_PRESENT_TARGET_MODE_SET |
| Purpose | Video mode set descriptor. |
| Definition | typedef struct _VIDEO_PRESENT_TARGET_MODE_SET<br>{<br>    DWORD dwNumOfModes;<br>    VIDEO_PRESENT_TARGET_MODE arr_vidptModes[1];<br>}<br>VIDEO_PRESENT_TARGET_MODE_SET, *PVIDEO_PRESENT_TARGET_MODE_SET; |

TABLE 36-continued

Function Video_Present_Target_Mode_Set

| Fields | Name | Description |
|---|---|---|
| | dwNumOfModes | Number of video modes in the set. |
| | arr_vidptModes | Array of dwNumOfModes elements of the video mode set. |
| Remarks | Video mode sets are used to describe sets of available video modes on the video present targets in a given VidPN implementation. | |

TABLE 37

Function Video_Present_Target_Mode

| | | |
|---|---|---|
| Name | VIDEO_PRESENT_TARGET_MODE | |
| Purpose | Video mode descriptor. | |
| Definition | typedef struct _VIDEO_PRESENT_TARGET_MODE<br>{<br>  VIDEO_SIGNAL_STANDARD       vidStandard;<br>  SIZE       sizeTotal;<br>  SIZE       sizeActive;<br>  SIZE       sizeActiveOffset;<br>  SIZE       sizeTLDeltaVisibleFromActive;<br>  SIZE       sizeBRDeltaVisibleFromActive;<br>  FRACTIONAL_FREQUENCY       frqVSync;<br>  FRACTIONAL_FREQUENCY       frqHSync;<br>  DWORD       dwPixelRate;<br>  VIDEO_SIGNAL_SCANLINE_ORDERING  ScanLineOrdering;<br>  BOOLEAN       bIsGTF;<br>  BOOLEAN       bIsPreferred;<br>  BOOLEAN       bIsKnownToBeSupportedByMonitor;<br>}<br>VIDEO_PRESENT_TARGET_MODE, *PVIDEO_PRESENT_TARGET_MODE; | |

| Fields | Name | Description |
|---|---|---|
| | vidStandard | Video mode standard this mode is defined by (if any). |
| | SizeTotal | Total region size (in pixels) |
| | sizeActive | Active region size (in pixels), also known as production aperture. |
| | sizeActiveOffset | Offset of the active region's top-left corner with respect to total region's top-left corner. |
| | sizeTLDeltaVisibleFromActive | Monitor screen's delta of visible pixels' top-left corner from video signal's active pixels top-left corner. Note: Default = (0,0). |
| | SizeBRDeltaVisibleFromActive | Monitor screen's delta of visible pixels' bottom-right corner from video signal's active pixels bottom-right corner.<br>Note: Default = (0,0). |
| | frqVSync | Vertical refresh frequency (in Hz). |
| | frqHSync | Horizontal refresh frequency (in KHz). |
| | dwPixelRate | Pixel clock rate. |
| | ScanLineOrdering | Scan line ordering (e.g. progressive, interlaced). |
| | bIsPreferred | Predicate specifying whether this mode is preferred by the monitor connected to the respective video output. |
| | bIsGTF | Predicate specifying whether this mode's VSync, HSync, and clock rate comply with the restrictions imposed by the VESA Generalized Timing Formula. |
| | bIsKnownToBeSupportedByMonitor | Predicate specifying whether this mode is known to be supported by the connected monitor. By setting this field to TRUE, video miniport will make sure this particular mode survives OS monitor-capability based mode pruning, even if the monitor doesn't list support for it. |
| Remarks | Video mode is the mode of operation of a given video output that's driving a connected monitor, and is driven by an internal video output codec.<br>Note that this descriptor supersedes subset of the VIDEO_MODE_INFORMATION structure related to video mode. In XDDM, both video and video present source modes were described in this struct. LDDM separates these two notions, and hence their descriptors.<br>The video standard field, vidStandard, should be used for video mode comparisons, when it's set to a well-defined video standard. Note that most of the standard modes do not comply with the VESA GTF frequency constraints. | |

TABLE 37-continued

Function Video_Present_Target_Mode

The monitor-capability based pruning-override field, bIsKnownToBeSupportedByMonitor, lets video IHVs specify additional video modes which they know are supported by the monitor their video card is attached to, but which are not specified in the monitor's descriptor. This is most useful for monitors which have no descriptors and information about their capabilities is instead stored in a proprietary format in the BIOS by the OEM who produces the final integrated solution. This override should be used sparingly and only reserved for cases where there is no other way to expose a mode which is known to work for a given monitor! Video miniport should never enumerate a mode which is listed as supported by the monitor descriptor with this field set to TRUE.

TABLE 38

Function Video_Signal_Standard

| | |
|---|---|
| Name | VIDEO_SIGNAL_STANDARD |
| Purpose | Video mode standard descriptor, listing standards that are explicitly supported by Windows. |
| Definition | typedef enum _VIDEO_SIGNAL_STANDARD<br>{<br>  NTSC_M, NTSC_J, NTSC_443,<br>  PAL_B, PAL_B1, PAL_G, PAL_H, PAL_I, PAL_D, PAL_N, PAL_NC,<br>  SECAM_B, SECAM_D, SECAM_G, SECAM_H, SECAM_K, SECAM_K1, SECAM_L, SECAM_L1,<br>  EIA_861_1, EIA_861_2, EIA_861_3, EIA_861_4, EIA_861_5,<br>  EIA_861_6, EIA_861_7, EIA_861_8, EIA_861_9, EIA_861_10,<br>  EIA_861A_1, EIA_861A_2, EIA_861A_3, EIA_861A_4,<br>  EIA_861B_1, EIA_861B_2, EIA_861B_3, EIA_861B_4, EIA_861B_5,<br>  EIA_861B_6, EIA_861B_7,<br>  IBM_1, IBM_2, IBM_3, IBM_4,<br>  APPLE_1, APPLE_2, APPLE_3,<br>  VESA_1, VESA_2, VESA_3, VESA_4, VESA_5, VESA_6, VESA_7, VESA_8, VESA_9,<br>  VESA_10, VDMT_1, VDMT_2, VDMT_3, VDMT_4, VDMT_5, VDMT_6, VDMT_7, VDMT_8,<br>  VDMT_9, VDMT_10, VDMT_11, VDMT_12, VDMT_13, VDMT_14, VDMT_15, VDMT_16,<br>  VDMT_17, VDMT_18, VDMT_19, VDMT_20, VDMT_21, VDMT_22, VDMT_23, VDMT_24,<br>  VDMT_25, VDMT_26, VDMT_27, VDMT_28, VDMT_29, VDMT_30, VDMT_31, VDMT_32,<br>  VDMT_33, VDMT_34,<br>  GTF,<br>  Other<br>}<br>VIDEO_SIGNAL_STANDARD, *PVIDEO_SIGNAL_STANDARD; |
| Remarks | This enum should be used to simplify video mode comparisons, when appropriate (i.e. not Other). The following table lists some of the basic parameters of these modes. |

| Name | Width (Pixels) | Height (Pixels) | Vsync rate (Hz) | Hsync rate (Hz) | Pixel clock rate (Hz) | Content Ordering |
|---|---|---|---|---|---|---|
| NTSC_M | 720 | 525 | 59.94 | 15,734.27 | 3,579,545 | Interlaced |
| NTSC_J | 720 | 525 | 59.94 | 15,734.27 | 3,579,545 | Interlaced |
| NTSC_443 | 720 | 525 | 59.94 | 15,734.27 | 4,433,618.75 | Interlaced |
| PAL_B | 720 | 625 | 50 | 15,625 | 4,433,618.75 | Interlaced |
| PAL_B1 | 720 | 625 | 50 | 15,625 | 4,433,618.75 | Interlaced |
| PAL_G | 720 | 625 | 50 | 15,625 | 4,433,618.75 | Interlaced |
| PAL_H | 720 | 625 | 50 | 15,625 | 4,433,618.75 | Interlaced |
| PAL_I | 720 | 625 | 50 | 15,625 | 4,433,618.75 | Interlaced |
| PAL_D | 720 | 525 | 59.94 | 15,734 | 3,575,611.49 | Interlaced |
| PAL_N | 720 | 625 | 50 | 15,625 | 4,433,618.75 | Interlaced |
| PAL_NC | 720 | 625 | 50 | 15,625 | 3,582,056.25 | Interlaced |
| SECAM_B | 720 | 625 | 50 | 15,625 | | Interlaced |
| SECAM_D | 720 | 625 | 50 | 15,625 | | Interlaced |
| SECAM_G | 720 | 625 | 50 | 15,625 | | Interlaced |
| SECAM_H | 720 | 625 | 50 | 15,625 | | Interlaced |
| SECAM_K | 720 | 625 | 50 | 15,625 | | Interlaced |
| SECAM_K1 | 720 | 625 | 50 | 15,625 | | Interlaced |
| SECAM_L | 720 | 625 | 50 | 15,625 | | Interlaced |
| SECAM_L1 | 720 | 625 | 50 | 15,625 | | Interlaced |
| EIA_861_1 | 720 | 480 | 59.94 | | | Interlaced |
| EIA_861_2 | 720 | 480 | 60 | | | Interlaced |
| EIA_861_3 | 640 | 480 | 59.94 | | | Progressive |
| EIA_861_4 | 640 | 480 | 60 | | | Progressive |
| EIA_861_5 | 720 | 480 | 59.94 | | | Progressive |
| EIA_861_6 | 720 | 480 | 60 | | | Progressive |
| EIA_861_7 | 1280 | 720 | 59.94 | | | Progressive |
| EIA_861_8 | 1280 | 720 | 60 | | | Progressive |
| EIA_861_9 | 1920 | 1080 | 59.94 | | | Interlaced |
| EIA_861_10 | 1920 | 1080 | 60 | | | Interlaced |
| EIA_861A_1 | 720 | 576 | 50 | | | Interlaced |

TABLE 38-continued

Function Video_Signal_Standard

| | | | | | | |
|---|---|---|---|---|---|---|
| EIA_861A_2 | 720 | 576 | 50 | | | Progressive |
| EIA_861A_3 | 1280 | 720 | 50 | | | Progressive |
| EIA_861A_4 | 1920 | 1080 | 50 | | | Interlaced |
| EIA_861B_1 | 1920 | 1080 | 23.96 | | | Progressive |
| EIA_861B_2 | 1920 | 1080 | 24 | | | Progressive |
| EIA_861B_3 | 1920 | 1080 | 25 | | | Progressive |
| EIA_861B_4 | 1920 | 1080 | 29.97 | | | Progressive |
| EIA_861B_5 | 1920 | 1080 | 30 | | | Progressive |
| EIA_861B_6 | 1920 | 1080 | 50 | | | Progressive |
| EIA_861B_7 | 1920 | 1080 | 60 | | | Progressive |
| IBM_1 | 720 | 400 | 70 | | | Progressive |
| IBM_2 | 720 | 400 | 88 | | | Progressive |
| IBM_3 | 640 | 480 | 60 | | | Progressive |
| IBM_4 | 1024 | 768 | 87 | | | Interlaced |
| APPLE_1 | 640 | 480 | 67 | | | Progressive |
| APPLE_2 | 832 | 624 | 75 | | | Progressive |
| APPLE_3 | 1152 | 870 | 75 | | | Progressive |
| VESA_1 | 640 | 480 | 72 | | | Progressive |
| VESA_2 | 640 | 480 | 75 | | | Progressive |
| VESA_3 | 800 | 600 | 56 | | | Progressive |
| VESA_4 | 800 | 600 | 60 | | | Progressive |
| VESA_5 | 800 | 600 | 72 | | | Progressive |
| VESA_6 | 800 | 600 | 75 | | | Progressive |
| VESA_7 | 1024 | 768 | 60 | | | Progressive |
| VESA_8 | 1024 | 768 | 70 | | | Progressive |
| VESA_9 | 1024 | 768 | 75 | | | Progressive |
| VESA_10 | 1280 | 1024 | 75 | | | Progressive |
| VDMT_1 | 640 | 350 | 85 | 37,900 | 31,500,000 | Progressive |
| VDMT_2 | 640 | 400 | 85 | 37,900 | 31,500,000 | Progressive |
| VDMT_3 | 720 | 400 | 85 | 37,900 | 35,500,000 | Progressive |
| VDMT_4 | 640 | 480 | 60 | 31,500 | 25,175,000 | Progressive |
| VDMT_5 | 640 | 480 | 72 | 37,900 | 31,500,000 | Progressive |
| VDMT_6 | 640 | 480 | 75 | 37,500 | 31,500,000 | Progressive |
| VDMT_7 | 640 | 480 | 85 | 43,300 | 36,000,000 | Progressive |
| VDMT_8 | 800 | 600 | 56 | 35,100 | 36,000,000 | Progressive |
| VDMT_9 | 800 | 600 | 60 | 37,900 | 40,000,000 | Progressive |
| VDMT_10 | 800 | 600 | 72 | 48,100 | 50,000,000 | Progressive |
| VDMT_11 | 800 | 600 | 75 | 46,900 | 49,500,000 | Progressive |
| VDMT_12 | 800 | 600 | 85 | 53,700 | 56,250,000 | Progressive |
| VDMT_13 | 1024 | 768 | 43 | 35,500 | 44,900,000 | Interlaced |
| VDMT_14 | 1024 | 768 | 60 | 48,400 | 65,000,000 | Progressive |
| VDMT_15 | 1024 | 768 | 70 | 56,500 | 75,000,000 | Progressive |
| VDMT_16 | 1024 | 768 | 75 | 60,000 | 78,750,000 | Progressive |
| VDMT_17 | 1024 | 768 | 85 | 68,700 | 94,500,000 | Progressive |
| VDMT_18 | 1152 | 864 | 75 | 67,500 | 108,000,000 | Progressive |
| VDMT_19 | 1280 | 960 | 60 | 60,000 | 108,000,000 | Progressive |
| VDMT_20 | 1280 | 960 | 85 | 85,900 | 148,500,000 | Progressive |
| VDMT_21 | 1280 | 1024 | 60 | 64,000 | 108,000,000 | Progressive |
| VDMT_22 | 1280 | 1024 | 75 | 80,000 | 135,000,000 | Progressive |
| VDMT_23 | 1280 | 1024 | 85 | 91,100 | 157,500,000 | Progressive |
| VDMT_24 | 1600 | 1200 | 60 | 75,000 | 162,000,000 | Progressive |
| VDMT_25 | 1600 | 1200 | 65 | 81,300 | 175,500,000 | Progressive |
| VDMT_26 | 1600 | 1200 | 70 | 87,500 | 189,000,000 | Progressive |
| VDMT_27 | 1600 | 1200 | 75 | 93,800 | 202,500,000 | Progressive |
| VDMT_28 | 1600 | 1200 | 85 | 106,300 | 229,500,000 | Progressive |
| VDMT_29 | 1792 | 1344 | 60 | 83,640 | 204,750,000 | Progressive |
| VDMT_30 | 1792 | 1344 | 75 | 106,270 | 261,000,000 | Progressive |
| VDMT_31 | 1856 | 1392 | 60 | 86,330 | 218,250,000 | Progressive |
| VDMT_32 | 1856 | 1392 | 75 | 112,500 | 288,000,000 | Progressive |
| VDMT_33 | 1920 | 1440 | 60 | 90,000 | 234,000,000 | Progressive |
| VDMT_34 | 1920 | 1440 | 75 | 112,500 | 297,000,000 | Progressive |

TABLE 39

Function Video_Signal_Scanline_Ordering

| | |
|---|---|
| Name | VIDEO_SIGNAL_SCANLINE_ORDERING |
| Purpose | Scan line ordering descriptor. |
| Definition | typedef enum _VIDEO_SIGNAL_SCANLINE_ORDERING { |
| |     SLO_Uninitialized = 0, |
| |     SLO_Progressive = 1, |
| |     SLO_Interlaced_UpperFieldFirst = 2, |
| |     SLO_Interlaced_LowerFieldFirst = 3, |
| |     SLO_Other = 255 |
| | } VIDEO_SIGNAL_SCANLINE_ORDERING, *PVIDEO_SIGNAL_SCANLINE_ORDERING; |

TABLE 39-continued

Function Video_Signal_Scanline_Ordering

| | |
|---|---|
| Remarks | Scan-line ordering of the video mode, specifies whether each field contains the entire content of a frame, or only half of it (i.e. even/odd lines interchangeably). Note that while for standard interlaced modes, what field comes first can be inferred from the mode, specifying this characteristic expliclty with an enum both frees up the client from having to maintain mode-based look-up tables and is extensible for future standard modes not listed in the VIDEO_MODE_STD enum. |

TABLE 40

Function Fractional_Frequency

| | |
|---|---|
| Name | FRACTIONAL_FREQUENCY |
| Purpose | Video mode fractional frequency descriptor. |
| Definition | typedef struct _FRACTIONAL_FREQUENCY<br>{<br>   DWORD dwNumerator;<br>   DWORD dwDenominator;<br>} FRACTIONAL_FREQUENCY,<br>*PFRACTIONAL_FREQUENCY; |

| Fields | Name | Description |
|---|---|---|
| | dwNumerator | Fractional frequency numerator. |
| | dwDenominator | Fractional frequency denominator. |

| | |
|---|---|
| Remarks | Fractional value used to represent vertical and horizontal frequencies of a video mode (i.e. VSync and HSync). Vertical frequencies are stored in Hz. Horizontal frequencies are stored in KHz. The dynamic range of this encoding format, given $10^{-7}$ resolution is $\{0 \ldots 2^{32} - 1/10^{7}\}$, which translates to $\{0 \ldots 428.4967296\}$ [Hz] for vertical frequencies and $\{0 \ldots 428.4967296\}$ [KHz] for horizontal frequencies. This sub-microseconds precision range should be acceptable even for a pro-video application (error in one microseconds for video signal synchronization would imply a time drift with a cycle of $10^{7}/(60*60*24) = 115.741$ days. |

TABLE 41

Function Video_Present_Source_Mode_Set

| | |
|---|---|
| Name | VIDEO_PRESENT_SOURCE_MODE_SET |
| Purpose | Video present source mode set descriptor. |
| Definition | typedef struct<br>  _VIDEO_PRESENT_SOURCE_MODE_SET<br>{<br>  DWORD                                   dwNumOfModes;<br>  VIDEO_PRESENT_SOURCE_MODE arr_vidpsModes[1];<br>}<br>VIDEO_PRESENT_SOURCE_MODE_SET, *PVIDEO_PRESENT_SORCE_MODE_SET; |

| Fields | Name | Description |
|---|---|---|
| | dwNumOfModes | Number of video present source modes in the set. |
| | pvidpsModes | Array of dwNumOfModes elements of the video present source mode set. |

| | |
|---|---|
| Remarks | Video present source mode sets are used to describe sets of available video present source modes on the video present sources in a given VidPN implementation. |

TABLE 42

Function Video_Present_Source_Mode

| | |
|---|---|
| Name | VIDEO_PRESENT_SOURCE_MODE |
| Purpose | Video present source mode descriptor. |
| Definition | typedef struct _VIDEO_PRESENT_SOURCE_MODE<br>{<br>  VIDEO_PRESENT_SOURCE_MODE_TYPE type;<br>  union<br>  {<br>    GRAPHICS_RENDERING_FORMAT   grfxFormat;   // if (type == Graphics)<br>    TEXT_RENDERING_FORMAT            textFormat;   // if (type == Text)<br>  }<br>}<br>VIDEO_PRESENT_SOURCE MODE, *PVIDEO_PRESENT_SOURCE_MODE; |

| Fields | Name | Description |
|---|---|---|
| | type | Specifies whether the mode is a graphics or a text video present source mode. |
| | grfxFormat | Descriptor of the graphics video present source mode (valid only if (type==Graphics). |
| | textFormat | Descriptor of the text video present source mode |

TABLE 42-continued

Function Video_Present_Source_Mode (valid only if (type==Graphics).

| | |
|---|---|
| Remarks | Video present source mode is the mode of operation of a given video present source. Video present source mode determines the format of the video present source's primary surface to which the graphics subsystem is rendering the visual image to be presented to the user, and from which the video output codec is reading the visual image content to be converted into a respective video mode signal. |

TABLE 43

Function Video_Present_Source_Mode_Type

| | |
|---|---|
| Name | VIDEO_PRESENT_SOURCE_MODE_TYPE |
| Purpose | Video present source mode enumeration type descriptor. |
| Definition | typedef enum _ VIDEO_PRESENT_SOURCE_MODE_TYPE<br>{<br>    RMT_Uninitialized = 0,<br>    RMT_Graphics = 1,<br>    RMT_Text = 2<br>} VIDEO_PRESENT_SOURCE_MODE_TYPE, *PVIDEO_PRESENT_SOURCE_MODE_TYPE; |
| Remarks | This type is used to specify whether the video present source mode is a graphics or a text video present source mode (see VIDEO_PRESENT_SOURCE_MODE for more details). |

TABLE 44

Function Graphics_Rendering_Format

| | | |
|---|---|---|
| Name | GRAPHICS_RENDERING_FORMAT | |
| Purpose | Graphics video present source mode descriptor. | |
| Definition | typedef struct _GRAPHICS_RENDERING_FORMAT<br>{<br>    SIZE                          sizePrimSurf;<br>    SIZE                          sizeVisible;<br>    DWORD                       dwStride;<br>    PIXEL_FORMAT            PixelFormat;<br>    COLOR_ACCESS_MODE   clrAccessMode;<br>}<br>GRAPHICS_RENDERING_FORMAT, *PGRAPHICS_RENDERING_FORMAT; | |
| Fields | sizePrimSurf | Size of the primary surface required for this video present source mode. |
| | sizeVisible | Size of the visible part of the primary surface, used for panned modes including zoom modes. |
| | dwStride | Number of bytes between the start of one scan line and the next. |
| | PixelFormat | Pixel format (e.g. break down into individual sub-channels) |
| | clrAccessMode | Access mode for the pixel color information |
| Remarks | Graphics video present source mode is the dominantly used subtype of the video present source modes (other being the text video present source mode).<br>Note that whenever video present source mode's visible size, GRAPHICS_VIDEO_PRESENT_SOURCE_MODE. sizeVisible is not equal to the respective video mode's visible size, VIDEO_MODE.sizeVisible, h/w scaling is undertaken by the video output codec. | |

TABLE 45

Function Pixel_Format

| | | |
|---|---|---|
| Name | PIXEL_FORMAT | |
| Purpose | Graphics video present source mode pixel format descriptor. | |
| Definition | typedef struct _PIXEL_FORMAT<br>{<br>    D3DFORMAT    type;<br>    COLOR_BASIS  clrBasis;<br>} | |
| Fields | type | Corresponding DirectX type of the pixel format. |
| | clrBasis | Color basis with respect to which the pixel's color is expanded. |

TABLE 45-continued

Function Pixel_Format

| | |
|---|---|
| Remarks | Display miniport is free to support any D3D pixel format for its graphics modes that is meaningful as a primary surface pixel format. No validation for an appropriately used pixel format shall be done in kernel-mode. If this turns out to be a problem, WHQL can enforce a certain list of pixel formats from user-mode. This descriptor does NOT include pixel value sub-channel bit masks since:<br>  a. Primary argument for exposing pixel value sub-channel bit masks is to allow application developers write extensible code that can leverage future pixel formats.<br>  b. As it stands, however, historically numerous application developers have failed to properly implement generic pixel value decoding algorithms and pixel value sub-channel bit masks were dropped in DX8.<br>  c. Main idea: it's best to force application developers to test every scenario they claim to support by making them use look-up tables that map D3D pixel format enums into pixel value sub-channel bit masks.<br>  d. To facilitate application development, it would make sense to ship a helper user-mode library that does the enum-to-bitmask mapping for the application developers. They would still need to code their application against existing pixel value formats but not maintain look-up tables, for every application.<br>  e. Need for pixel value sub-channel bitmasks exposure is further reduced by the fact that they are only truly useful for linear surface formats with well defined integer RGB encoded pixel values.<br>    i. When surface format has a non-linear pixel layout (i.e. VIDPS.VidPSContentLayout = VPSCL_Linear), knowledge of pixel value sub-channel bitmasks will not help the developer to know how to access each pixel in the surface.<br>    ii. Most four-CC formats (e.g. NVT4/NVT5) fall into this category and one should test against every format to be supported by the application, because most of them imply texture layouts that aren't easily described.<br>    iii. Also the bitmasks won't work for floating point pixel formats. |

TABLE 46

Function Color_Access_Mode

| | |
|---|---|
| Name | COLOR_ACCESS_MODE |
| Purpose | Color access mode descriptor. |
| Definition | typedef enum _COLOR_ACCESS_MODE<br>{<br>    CAM_Uninitialized   = 0,<br>    CAM_Direct   = 1,<br>    CAM_PresetPalette   = 2,<br>    CAM_SettablePalette   = 3<br>}<br>COLOR_ACCESS_MODE, *PCOLOR_ACCESS_MODE; |
| Remarks | Use Direct to represent video present source modes with colors stored directly in the primary surface. Use PresetPalette to represent video present source modes with colors' indices stored in the primary surface and actual color values stored in a palette specific to the video card, that must be queried from the display miniport. Use SettablePalette to represent video present source modes with colors' indices stored in the primary surface and actual color values stored in a settable palette that can be dynamically set on the video card, by specifying it to the display miniport. |

TABLE 47

Function Color_Basis

| | |
|---|---|
| Name | COLOR_BASIS |
| Purpose | Descriptor of the color basis with respect to which the pixels' colors are expanded, or conversely, based on which the color values are synthesized. |
| Definition | typedef enum _COLOR_BASIS<br>{<br>    CB_Uninitialized   = 0,<br>    CB_Intensity   = 1,<br>    CB_sRGB   = 2,<br>    CB_scRGB   = 3,<br>    CB_YCbCr   = 4,<br>    CB_YPbPr   = 5<br>}<br>COLOR_BASIS, *PCOLOR_BASIS; |
| Remarks | The commonly used color bases in graphics industry are RGB, which has the basis (red, green, blue), as well as YPbPr and YCbCr, which have scaled variants of basis (1, blue-1, red-1) *intensity (red, green, blue).<br>Tri-stimulus linear RGB is well suited for real-time rendering, since most filtering algorithms use tri-stimulus values to approximate light's spectral transformations caused by its interaction with the environment, primarily due to the fact that there is a linear relationship between the perceived light level and the light's spectral intensity. Ideally, processing (e.g., all processing) of video content (i.e. scaling, filtering, etc) should be performed in a linear RGB space.<br>Y'PbPr spaces store data using a nonlinear curve which is approximately the inverse of a gamma 2.2 curve (i.e. $x^{0.45}$). This allows more precision to be stored in darker intensities where the human eye is |

TABLE 47-continued

Function Color_Basis more sensitive.
sRGB (more accurately, sR'G'B') stores light intensities relative to a gamma curve.
scRGB stores linear values and requires much higher precision to represent the same perceptually similar signal.
The light-intensity based YPbPr and YCbCr is better suited for persistence of pre-rendered content, such as video streaming. This is due to the fact that a human visual system is more responsive to small differences in photons' intensity rather than frequency (i.e. perceived color), and, hence, a light-intensity based color expansion over a finite dynamic range, yields a better perceptual image quality for the human eye than a tri-stimulus based color expansion in that same range (e.g non-linear Y8Cb8Cr8 appears slightly better than R8G8B8 and is comparable to R9G9B9).
To represent monochrome modes, use Intensity. Grayscale imaging is heavily used in medical imaging.
* Note: the apostrophe notation Y'PbPr is used to remind you that you are working with non-linear data.

TABLE 48

Function Text_Rendering_Format

| | |
|---|---|
| Name | TEXT_RENDERING_FORMAT |
| Purpose | Text video present source mode format. |
| Definition | typedef TBD TEXT_RENDERING_FORMAT; |
| Remarks | Text video present source modes are only supported for backwards compatibility. |

TABLE 49

Function Filtering_Technique

| | |
|---|---|
| Name | FILTERING_TECHNIQUE |
| Purpose | Filtering technique enumeration type. |
| Definition | typedef D3DDDIMULTISAMPLE_TYPE FILTERING_TECHNIQUE, *PFILTERING_TECHNIQUE; |
| Remarks | This type is used to specify what type of filtering technique is used for rendering on the video present source (e.g. 2 × 2/ 4 × 4 multisampling/supersampling, etc.). |

Example 46

Exemplary Relative Importance of Monitors

In any of the examples herein, the video driver handling multiple monitors (e.g., video miniport) can be asked to provide a recommended functional configuration. In such a case, the relative importance of the monitors can be specified. For example, the monitors can be ranked (e.g., most important to least important). The driver can then provide a configuration according to the relative importance as specified.

Example 47

Exemplary Stateless Implementation

Some of the technologies described herein have been described using an approach in which the video driver maintains a state of the provisional configuration (e.g., as it is pinned and unpinned). However, a stateless approach can also be employed. In this way, the video driver need not track state (e.g., of the provisional configuration) and may be made more lightweight and less complex. If desired, the client software can track a state during determination of a desired configuration.

In such an approach, a programming interface (e.g., a DDI) can be used to pass information regarding a state of the provisional configuration. For example, a data structure can be used to hold the configuration details and passed through the interface.

Example 48

Exemplary Stateless Driver Interface

The following is an exemplary kernel mode driver interface (e.g., a DDI), including a stateless video presenting network management miniport interface, for implementing a video presenting network supporting the various technologies described herein. In the example, a video presenting network is sometimes called a "video present network" or "VidPN." A particular configuration for the video present network is sometimes called a "VidPN implementation." Also in the example, the word "miniport" is used, but the technologies described within can be applied to any display adapter or video driver.

An exemplary kernel mode driver can be part of a video miniport. Each physical GPU can be treated as its own adapter, where the adapter can be represented by the HANDLE hAdapter retrieved below. If a single GPU has multiple outputs (e.g., heads), it may still be treated as a single adapter.

A miniport's HwVidQueryInterface function can be called with the following QUERY_INTERFACE structure to retrieve driver entry points:

```
QUERY_INTERFACE queryinterface;
    queryinterface.InterfaceType        = GUID_DEVINTERFACE_D3DDDI;
    queryinterface.Size                 = sizeof(D3DKMDDI_INTERFACE);
    queryinterface.Version              = D3DDDI_INTERFACE_VERSION;
    queryinterface.Interface            = &pD3DKMDDIInterface;
    queryinterface.InterfaceSpecificData = &pD3DKMDDIInterfaceSpecificData;
```

The HwVidQueryInterface call returns NO_ERROR if the interface was successfully retrieved; otherwise it should return the appropriate error code. The driver entry points can be returned in the D3DKMDDI_INTERFACE structure below. Querying the interface may implicitly reference it. Thus, if initialization of the driver fails after the interface has been queried, the interface dereference function can be called without the driver having seen an explicit reference.

```
typedef struct _D3DKMDDI_INTERFACE
{
    USHORT   Size;
    USHORT   Version;
    HANDLE   hAdapter;
    VOID*    pInterfaceReference;
    VOID*    pInterfaceDereference;
    // Exemplary adapter methods
    PFND3DKMDDI_QUERYADAPTERINFO              pfnQueryAdapterInfo;
    PFND3DKMDDI_CREATEDEVICE                  pfnCreateDevice;
    PFND3DKMDDI_CREATEALLOCATION              pfnCreateAllocation;
    PFND3DKMDDI_DESTROYALLOCATION             pfnDestroyAllocation;
    PFND3DKMDDI_ACQUIREAPERTURE               pfnAcquireAperture;
    PFND3DKMDDI_RELEASEAPERTURE               pfnReleaseAperture;
    PFND3DKMDDI_MAPAPERTURESEGMENT            pfnMapApertureSegment;
    PFND3DKMDDI_UNMAPAPERTURESEGMENT          pfnUnmapApertureSegment;
    PFND3DKMDDI_PATCH                         pfnPatch;
    PFND3DKMDDI_SUBMITCOMMAND                 pfnSubmitCommand;
    PFND3DKMDDI_PREEMPTCOMMAND                pfnPreemptCommand;
    PFND3DKMDDI_SETPOINTERSHAPE               pfnSetPointerShape;
    PFND3DKMDDI_SETPOINTERPOSITION            pfnSetPointerPosition;
    PFND3DKMDDI_BUILDPAGINGBUFFER             pfnBuildPagingBuffer;
    PFND3DKMDDI_ESCAPE                        pfnEscape;
    PFND3DKMDDI_QUERYCURRENTFENCE             pfnQueryCurrentFence;
    PFND3DKMDDI_SETMODE                       pfnSetMode;
    PFND3DKMDDI_SETOUTPUTSTATE                pfnSetOutputState;
    // Exemplary adapter VidPN management methods
    PFND3DKMDDI_ENUMVIDEOPRESENTSOURCESET     pfnEnumVideoPresentSourceSet;
    PFND3DKMDDI_ENUMVIDEOPRESENTTARGETSET     pfnEnumVideoPresentTargetSet;
    PFND3DKMDDI_ISSUPPORTEDVIDPN              pfnIsSupportedVidPN;
    PFND3DKMDDI_ENUMCOFUNCVIDPNSOURCEIDSET    pfnEnumCofuncVidPNSourceIDSet;
    PFND3DKMDDI_ENUMCOFUNCVIDPNTARGETIDSET    pfnEnumCofuncVidPNTargetIDSet;
    PFND3DKMDDI_ENUMVIDPNCOFUNCMODALITY       pfnEnumVidPNCofuncModality;
    PFND3DKMDDI_RECOMMENDFUNCTIONALVIDPN      pfnRecommendFunctionalVidPN;
    // Exemplary device methods
    PFND3DKMDDI_DESTROYDEVICE                 pfnDestroyDevice;
    PFND3DKMDDI_OPENALLOCATION                pfnOpenAllocation;
    PFND3DKMDDI_CLOSEALLOCATION               pfnCloseAllocation;
    PFND3DKMDDI_RENDER                        pfnRender;
    PFND3DKMDDI_PRESENT                       pfnPresent;
} D3DKMDDI_INTERFACE;
typedef NTSTATUS (APIENTRY *PFND3DKMDDI_QUERYADAPTERINFO)(HANDLE hAdapter, CONST
    D3DKMDDIARG_QUERYADAPTERINFO*);
typedef NTSTATUS (APIENTRY *PFND3DKMDDI_CREATEDEVICE)(HANDLE hAdapter,
    D3DKMDDIARG_CREATEDEVICE*);
typedef NTSTATUS (APIENTRY *PFND3DKMDDI_CREATEALLOCATION)(HANDLE hAdapter,
    D3DKMDDIARG_CREATEALLOCATION*);
typedef NTSTATUS (APIENTRY *PFND3DKMDDI_DESTROYALLOCATION)(HANDLE hAdapter, CONST
    D3DKMDDIARG_DESTROYALLOCATION*);
typedef NTSTATUS (APIENTRY *PFND3DKMDDI_ACQUIREAPERTURE)(HANDLE hAdapter,
    D3DKMDDIARG_ACQUIREAPERTURE*);
typedef NTSTATUS (APIENTRY *PFND3DKMDDI_RELEASEAPERTURE)(HANDLE hAdapter, CONST
    D3DKMDDIARG_RELEASEAPERTURE*);
typedef NTSTATUS (APIENTRY *PFND3DKMDDI_MAPAPERTURESEGMENT)(HANDLE hAdapter, CONST
    D3DKMDDIARG_MAPAPERTURESEGMENT*);
typedef NTSTATUS (APIENTRY *PFND3DKMDDI_UNMAPAPERTURESEGMENT)(HANDLE hAdapter, CONST
    D3DKMDDIARG_UNMAPAPERTURESEGMENT*);
typedef NTSTATUS (APIENTRY *PFND3DKMDDI_PATCH)(HANDLE hAdapter, CONST D3DKMDDIARG_PATCH*);
typedef NTSTATUS (APIENTRY *PFND3DKMDDI_SUBMITCOMMAND)(HANDLE hAdapter, CONST
    D3DKMDDIARG_SUBMITCOMMAND*);
typedef NTSTATUS (APIENTRY *PFND3DKMDDI_PREEMPTCOMMAND)(HANDLE hAdapter, CONST
    D3DKMDDIARG_PREEMPTCOMMAND*);
typedef NTSTATUS (APIENTRY *PFND3DKMDDI_SETPOINTERSHAPE)(HANDLE hAdapter, CONST
    D3DKMDDIARG_SETPOINTERSHAPE*);
typedef NTSTATUS (APIENTRY *PFND3DKMDDI_SETPOINTERPOSITION)(HANDLE hAdapter, CONST
    D3DKMDDIARG_SETPOINTERPOSITION*);
typedef NTSTATUS (APIENTRY *PFND3DKMDDI_BUILDPAGINGBUFFER)(VOID*,
    D3DKMDDIARG_BUILDPAGINGBUFFER*);
typedef NTSTATUS (APIENTRY *PFND3DKMDDI_ESCAPE)(HANDLE hAdapter, D3DKMDDIARG_ESCAPE*);
typedef NTSTATUS (APIENTRY *PFND3DKMDDI_QUERYCURRENTFENCE)(HANDLE hAdapter,
    ULARGE_INTEGER*);
```

-continued

```
typedef NTSTATUS (APIENTRY *PFND3DKMDDI_SETMODE)(HANDLE hAdapter, D3DKMDDIARG_SETMODE*);
typedef NTSTATUS (APIENTRY *PFND3DKMDDI_SETOUTPUTSTATE)(HANDLE hAdapter,
        D3DKMDDIARG_SETOUTPUTSTATE*);
// Exemplary VidPN management methods
typedef NTSTATUS (APIENTRY *PFND3DKMDDI_ENUMVIDEOPRESENTSOURCESET)(HANDLE hAdapter,
        D3DKMDDIARG_ENUMVIDEOPRESENTSOURCESET*);
typedef NTSTATUS (APIENTRY *PFND3DKMDDI_ENUMVIDEOPRESENTTARGETSET)(HANDLE hAdapter,
        D3DKMDDIARG_ENUMVIDEOPRESENTTARGETSET*);
typedef NTSTATUS (APIENTRY *PFND3DKMDDI_ISSUPPORTEDVIDPN)(HANDLE hAdapter,
        D3DKMDDIARG_ISSUPPORTEDVIDPN*);
typedef NTSTATUS (APIENTRY *PFND3DKMDDI_ENUMCOFUNCVIDPNSOURCEIDSET)(HANDLE hAdapter,
        D3DKMDDIARG_ENUMCOFUNCVIDPNSOURCEIDSET*);
typedef NTSTATUS (APIENTRY *PFND3DKMDDI_ENUMCOFUNCVIDPNTARGETIDSET)(HANDLE hAdapter,
        D3DKMDDIARG_ENUMCOFUNCVIDPNTARGETIDSET*);
typedef NTSTATUS (APIENTRY *PFND3DKMDDI_ENUMVIDPNCOFUNCMODALITY)(HANDLE hAdapter,
        D3DKMDDIARG_ENUMVIDPNCOFUNCMODALITY*);
typedef NTSTATUS (APIENTRY *PFND3DKMDDI_RECOMMENDFUNCTIONALVIDPN)(HANDLE hAdapter,
        D3DKMDDIARG_RECOMMENDFUNCTIONALVIDPN*);
typedef NTSTATUS (APIENTRY *PFND3DKMDDI_DESTROYDEVICE)(HANDLE hDevice);
typedef NTSTATUS (APIENTRY *PFND3DKMDDI_OPENALLOCATION)(HANDLE hDevice, CONST
        D3DKMDDIARG_OPENALLOCATION*);
typedef NTSTATUS (APIENTRY *PFND3DKMDDI_CLOSEALLOCATION)(HANDLE hDevice, CONST
        D3DKMDDIARG_CLOSEALLOCATION*);
typedef NTSTATUS (APIENTRY *PFND3DKMDDI_RENDER)(HANDLE hDevice, D3DKMDDIARG_RENDER*);
typedef NTSTATUS (APIENTRY *PFND3DKMDDI_PRESENT)(HANDLE hDevice, D3DKMDDIARG_PRESENT*);
        The returned hAdapter in the D3DKMDDI_INTERFACE structure can be passed
as the context for pInterfaceReference and pInterfaceDereference. It can also be passed
in the hAdapter parameter for the adapter functions in the interface.
typedef struct _D3DKMDDI_INTERFACESPECIFICDATA
{
    HANDLE        hAdapter;
    // Exemplary D3DKMDDI interface callback functions
    PFND3DKMDDI_GETHANDLEDATACB              pfnGetHandleDataCb;
    PFND3DKMDDI_GEThANDLEPARENTCB            pfnGetHandleParentCb;
    PFND3DKMDDI_ENUMHANDLECHILDRENCB         pfnEnumHandleChildrenCb;
    PFND3DKMDDI_NOTIFY_DMAINTERRUPTCB        pfnNotifyDmaInterruptCb;
    PFND3DKMDDI_NOTIFY_DMADPCCB              pfnNotifyDmaDpcCb;
    PFND3DKMDDI_ALLOCSYSMEMFOROUTPARAMCB     pfnAllocSysMemForOutParamCb;
    PFND3DKMDDI_FREESYSMEMFOROUTPARAMCB      pfnFreeSysMemForOutParamCb;
} D3DKMDDI_INTERFACESPECIFICDATA;
typedef HANDLE (APIENTRY CALLBACK *PFND3DKMDDI_GETHANDLEPARENTCB)(HANDLE hDevice,
    D3DKMT_HANDLE);
typedef VOID*  (APIENTRY CALLBACK *PFND3DKMDDI_GETHANDLEDATACB)(HANDLE hDevice, CONST
    D3DKMDDIARGCB_GETHANDLEDATA*);
typedef HANDLE (APIENTRY CALLBACK *PFND3DKMDDI_ENUMHANDLECHILDRENCB)(HANDLE hDevice,
    CONST D3DKMDDIARGCB_ENUMHANDLECHILDREN*);
typedef NTSTATUS (APIENTRY CALLBACK *PFND3DKMDDI_NOTIFY_DMAINTERRUPTCB)(HANDLE hAdapter,
    CONST D3DKMDDIARG_NOTIFY_DMAINTERRUPT_DATA*);
typedef NTSTATUS (APIENTRY CALLBACK *PFND3DKMDDI_NOTIFY_DMADPCCB)(HANDLE hAdapter, CONST
    D3DKMDDIARG_NOTIFY_DMADPC_DATA*);
typedef VOID*  (APIENTRY CALLBACK *PFND3DKMDDI_ALLOCSYSMEMFOROUTPARAMCB)(IN POOL_TYPE,
    IN SIZE_T);
typedef VOID   (APIENTRY CALLBACK *PFND3DKMDDI_FREESYSMEMFOROUTPARAMCB)(VOID*);
```

The interface specific data can contain pointers to callback functions in the runtime that the driver can call. The hAdapter can be the runtime's adapter handle and can be passed for callbacks requesting an adapter handle.

In addition to the above interfaces, the following legacy IOCTLs can also be used:

IOCTL_VIDEO_RESET_DEVICE
IOCTL_VIDEO_SET_COLOR_REGISTERS
IOCTL_VIDEO_QUERY_POINTER_CAPABILITIES
IOCTL_VIDEO_QUERY_COLOR_CAPABILITIES
IOCTL_VIDEO_QUERY_NUM_AVAIL_MODES
IOCTL_VIDEO_QUERY_AVAIL_MODES

TABLE 50

Function EnumVideoPresentSourceSet

```
typedef NTSTATUS
    (APIENTRY *PFND3DKMDDI_ENUMVIDEOPRESENTSOURCESET)
    (IN HANDLE                                    hAdapter,
     OUT D3DKMDDIARG_ENUMVIDEOPRESENTSOURCESET*   pEnumVideoPresentSourceSetArg);
typedef struct _D3DKMDDIARG_ENUMVIDEOPRESENTSOURCESET
{
  OUT D3DKMDDI_VIDEO_PRESENT_SOURCE_SET* pVideoPresentSourceSet;
}
D3DKMDDIARG_ENUMVIDEOPRESENTSOURCESET;
```

EnumVideoPresentSourceSet can be called for each display adapter in the system by the VidPN manager instance that is driving the post-rendering video presentational capabilities of the respective display adapter in order to obtain a list of video present sources that the specified display adapter has.

The miniport can allocate a large enough buffer in system memory to contain the requested set of video present sources for the specified display adapter using the AllocSysMemForOutParamCb callback provided to it by the operating system via the INTERFACESPECIFICDATA interface. The size of the allocation should be sizeof (D3DKMDDI_VIDEO_PRESENT_SOURCE_SET)+ sizeof(D3DKMDDI_VIDEO_PRESENT_SOURCE)*(# of video present sources−1).

Once the memory for the output parameter has been allocated, the miniport can populate it based on the definitions below:

```
typedef struct _D3DKMDDI_VIDEO_PRESENT_SOURCE_SET
{
    SIZE_T                          NumOfVideoPresentSources;
    D3DKMDDI_VIDEO_PRESENT_SOURCE   VideoPresentSources[1];
} D3DKMDDI_VIDEO_PRESENT_SOURCE_SET;
``` where:

NumOfVideoPresentSources—Number of video present sources listed in VideoPresentSources.

VideoPresentSources—Address of the array of video present source descriptors in the set. Actual number of elements is specified in NumOfVideoPresentSources.

With the video present source descriptor defined as follows:

```
typedef struct _D3DKMDDI_VIDEO_PRESENT_SOURCE
{
    D3DKMDDI_VIDEO_PRESENT_SOURCE_ID   VideoPresentSourceID;
    DWORD                              dwReserved;
} D3DKMDDI_VIDEO_PRESENT_SOURCE;
``` where:

VideoPresentSourceID—Unique ID used to reference the respective video present source by the miniport and the operating system.

dwReserved—Other video present source descriptor properties go here

With the video present source ID defined as:

typedef UINT D3DKMDDI_VIDEO_PRESENT_SOURCE_ID;

On successful return from this function, the operating system can take ownership of the lifetime of the data returned in the output parameter and can deallocate the memory taken by its supporting allocation when it is done with it.

Return Codes

STATUS_SUCCESS indicates that the driver handled the call successfully.

TABLE 51

Function EnumVideoPresentTargetSet

```
typedef NTSTATUS
    (APIENTRY *PFND3DKMDDI_ENUMVIDEOPRESENTTARGETSET)
    (IN HANDLE                                          hAdapter,
     OUT D3DKMDDIARG_ENUMVIDEOPRESENTTARGETSET*         pEnumVideoPresentTargetSetArg);
typedef struct _D3DKMDDIARG_ENUMVIDEOPRESENTTARGETSET
{
    OUT D3DKMDDI_VIDEO_PRESENT_TARGET_SET* pVideoPresentTargetSet;
} D3DKMDDIARG_ENUMVIDEOPRESENTTARGETSET;
```

EnumVideoPresentTargetSet can be called for each display adapter in the system by the VidPN manager instance that is driving the post-rendering video presentational capabilities of the respective display adapter in order to obtain a list of video present targets that the specified display adapter has.

The miniport can allocate a large enough buffer in system memory to contain the requested set of video present sources for the specified display adapter using the AllocSysMemForOutParamCb callback provided to it by the operating system via the INTERFACESPECIFICDATA interface. The size of the allocation should be sizeof(D3DKMDDI_VIDEO_PRESENT_TARGET_SET)+ sizeof(D3DKMDDI_VIDEO_PRESENT_TARGET)*(# of video present targets−1).

Once the memory for the output parameter has been allocated, the miniport can populate it based on the definitions below:

```
typedef struct _D3DKMDDI_VIDEO_PRESENT_TARGET_SET
{
    SIZE_T                              NumOfVideoPresentTargets;
    D3DKMDDI_VIDEO_PRESENT_SOURCE       VideoPresentTargets[1];
}
D3DKMDDI_VIDEO_PRESENT_TARGET_SET;
``` where:

NumOfVideoPresentTargets—Number of video present targets listed in VideoPresentSources.
VideoPresentSources—Address of the array of video present target descriptors in the set. Actual number of elements is specified in NumOfVideoPresentTargets.

With the video present target descriptor defined as follows:

```
typedef struct _D3DKMDDI_VIDEO_PRESENT_TARGET
{
    D3DKMDDI_VIDEO_PRESENT_TARGET_ID      VideoPresentTargetID;
    D3DKMDDI_VIDEO_OUTPUT_TECHNOLOGY      VideoOutputTechnology;
    D3DKMDDI_VIDEO_OUTPUT_HPD_AWARENESS   VideoOutputHPDAwareness;
    D3DKMDDI_MONITOR_ORIENTATION_AWARENESS MonitorOrientationAwareness;
}
D3DKMDDI_VIDEO_PRESENT_TARGET;
``` where:
VideoPresentTargetID—Unique ID used to reference the respective video present target by the miniport and the operating system.
VideoOutputTechnology—Type of the video output technology.
VideoOutputHPDAwareness—Type of the video output's HPD awareness.
MonitorOrientationAwareness—Monitor orientation awareness.

With the video present target ID defined as:
typedef UINT D3DKMDDI_VIDEO_PRESENT_TARGET_ID;

The video output technology type descriptor can be defined as:

```
typedef enum _D3DKMDDI_VIDEO_OUTPUT_TECHNOLOGY
{
    D3DKMDDI_VOT_UNINITIALIZED    = 0,
    D3DKMDDI_VOT_HD15             = 1,
    D3DKMDDI_VOT_DVI              = 2,
    D3DKMDDI_VOT_HDMI             = 3,
    D3DKMDDI_VOT_HDMI2            = 4,
    D3DKMDDI_VOT_SVIDEO_4PIN      = 5,
    D3DKMDDI_VOT_SVIDEO_7PIN      = 6,
    D3DKMDDI_VOT_RCA_COMPOSITE    = 7,
    D3DKMDDI_VOT_RCA_3COMPONENT   = 8,
    D3DKMDDI_VOT_BNC              = 9,
    D3DKMDDI_VOT_RF               = 10,
    D3DKMDDI_VOT_OTHER            = 255
}
D3DKMDDI_VIDEO_OUTPUT_TECHNOLOGY;
```

The video output HPD awareness descriptor type can be defined as:

```
typedef enum _D3DKMDDI_VIDEO_OUTPUT_HPD_AWARENESS
{
    D3DKMDDI_VOHPDA_UNINITIALIZED         = 0,
    D3DKMDDI_VOHPDA_NONE                  = 1,
    D3DKMDDI_VOHPDA_DESTRUCTIVELYPOLLED   = 2,
    D3DKMDDI_VOHPDA_NONDESTRUCTIVELYPOLLED = 3,
```

-continued

```
    D3DKMDDI_VOHPDA_INTERRUPTIBLE         = 4
}
D3DKMDDI_VIDEO_OUTPUT_HPD_AWARENESS;
```

Video output HPD awareness can be used to represent the level of monitor connectivity sensed by a display adapter on its video output, and with the following four types available:

1. Interruptible HPD-awareness if and only if the miniport can asynchronously notify the operating system about monitor arrivals/departures.

2. Non-Destructively Polled HPD-awareness if and only if the miniport can not asynchronously notify the operating system about monitor arrivals/departures, but the operating system can periodically poll for the presence of a monitor without causing visual artifacts.
3. Destructively Polled HPD-awareness if and only if the miniport can not asynchronously notify the operating system about monitor arrivals/departures, but the operating system can sporadically poll for presence of a monitor, causing visual artifacts on each poll.
4. No HPD-awareness if and only if the miniport is not aware of monitor arrivals/departures either through interrupts or polling.

Monitor orientation awareness can be defined as:

```
typedef enum_D3DKMDDI_MONITOR_ORIENTATION_
AWARENESS
{
    D3DKMDDI_MOA_UNINITIALIZED   = 0,
    D3DKMDDI_MOA_NONE            = 1,
    D3DKMDDI_MPA_POLLED          = 2,
    D3DKMDDI_MOA_INTERRUPTIBLE   = 3
}
D3DKMDDI_MONITOR_ORIENTATION_AWARENESS;
```

On successful return from this function, the operating system can take ownership of the lifetime of the data returned in the output parameter and can deallocate the memory taken by its supporting allocation when it is done with it.

Return Codes

STATUS_SUCCESS indicates that the driver handled the call successfully.

```
typedef struct_D3DKMDDI_VIDPN
{
    D3DKMDDI_VIDPN_TOPOLOGY   VidPNTopology;
    DWORD                     dwReserved;
}
D3DKMDDI_VIDPN;
```

The VidPN topology descriptor can be defined as:

```
typedef struct_D3DKMDDI_VIDPN_TOPOLOGY
{
    D3DKMDDI_VIDPN_PRESENT_PATH_SET   VidPNPresentPathSet;
}
D3DKMDDI_VIDPN_TOPOLOGY;
```

VidPNPresentPathSet can represent the set of video present paths constituting the VidPN's topology, where:

```
typedef struct_D3DKMDDI_VIDPN_PRESENT_PATH_SET
{
    SIZE_T                         NumOfVidPNPresentPaths;
    D3DKMDDI_VIDPN_PRESENT_PATH    VidPNPresentPaths[1];
}
D3DKMDDI_VIDPN_PRESENT_PATH_SET;
```

TABLE 52

Function IsSupportedVidPN

```
typedef NTSTATUS
    (APIENTRY *PFND3DKMDDI_ISSUPPORTEDVIDPN)
    (IN HANDLE                           hAdapter,
     IN OUT D3DKMDDIARG_ISSUPPORTEDVIDPN*  pIsSupportedVidPNArg);
typedef struct_D3DKMDDIARG_ISSUPPORTEDVIDPN
{
    IN OUT D3DKMDDI_VIDPN*   pDesiredVidPN;
    OUT BOOLEAN*             pbIsVidPNSupported;
}
D3DKMDDIARG_ISSUPPORTEDVIDPN;
```

IsSupportedVidPN can allow the operating system to ask the miniport whether the provided VidPN configuration is supported (e.g., can be extended to a functional VidPN). The first argument, hAdapter, can specify the display adapter on which the VidPN support is in question. The actual VidPN can be specified in the first field of the second argument, pIsSupportedVidPNArg→DesiredVidPN, where the VidPN descriptor can be defined as:

with:

1. NumOfVidPNPresentPaths containing the number of video present paths in VidPNPresentPaths, and
2. VidPNPresentPaths containing an array of video present paths constituting the VidPN's topology.

The VidPN present path descriptor can be defined as:

```
typedef struct_D3DKMDDI_VIDPN_PRESENT_PATH
{
    D3DKMDDI_VIDPN_SOURCE                        VidPNSource;
    D3DKMDDI_VIDPN_TARGET                        VidPNTarget;
    D3DKMDDI_VIDPN_PRESENT_PATH_TRANSFORMATION   VidPNPresentPathTransformation;
}
D3DKMDDI_VIDPN_PRESENT_PATH;
```

D3DKMDDI_VIDPN_PRESENT_PATH is the video present path descriptor that can be used to describe a mapping from a single video present target to a single video present source in a VidPN topology, with:
- VidPNSource is the video present path's source descriptor.
- VidPNTarget is the video present path's target descriptor.
- VidPNPresentPathTransformation is the video present path's content transformation descriptor.

where the VidPN source descriptor can be defined as:

```
typedef struct_D3DKMDDI_VIDPN_SOURCE
{
  D3DKMDDI_VIDEO_PRESENT_SOURCE_ID   VidPNSourceID;
  SIZE_T                             PinnedModeIndex;
  D3DKMDDI_VIDPN_SOURCE_MODESET*     pCofuncVidPNSourceModeSet;
} D3DKMDDI_VIDPN_SOURCE;
``` with:
- VidPNSourceID is the unique ID used to reference the respective video present source by the miniport and the operating system. This value comes from the EnumVideoPresentSourceSet call.
- PinnedModeIndex is the index of the video present source mode that is pinned in the co-functional set of modes available on this video present source given the current VidPN configuration, or D3DKMDDI_NO_PINNED_MODE if no mode is pinned on this source.
- pCofuncVidPNSourceModeSet is the VidPN source modes co-functional with the current (partial or provisional) VidPN this source is a member of.

The VidPN source mode set descriptor can be defined as:

```
typedef struct_D3DKMDDI_VIDPN_SOURCE_MODESET
{
  SIZE_T                       NumOfVidPNSourceModes;
  D3DKMDDI_VIDPN_SOURCE_MODE   VidPNSourceModes[1];
} D3DKMDDI_VIDPN_SOURCE_MODESET;
``` with:
- NumOfVidPNSourceModes specifying the number of video present source modes listed in VidPNSourceModes.
- VidPNSourceModes containing the array of video present source modes in the set.

The VidPN source mode descriptor can be defined as:

```
typedef struct_D3DKMDDI_VIDPN_SOURCE_MODE
{
  D3DKMDDI_VIDPN_SOURCE_MODE_TYPE Type;
  union
  {
    D3DKMDDI_GRAPHICS_RENDERING_FORMAT grfxFormat;
    D3DKMDDI_TEXT_RENDERING_FORMAT     textFormat;
  };
} D3DKMDDI_VIDPN_SOURCE_MODE;
``` with Type containing the VidPN source mode type descriptor, defined as:

```
typedef enum_D3DKMDDI_VIDPN_SOURCE_MODE_TYPE
{
  D3DKMDDI_RMT_UNINITIALIZED   = 0,
  D3DKMDDI_RMT_GRAPHICS        = 1,
```

-continued

```
  D3DKMDDI_RMT_TEXT            = 2
} D3DKMDDI_VIDPN_SOURCE_MODE_TYPE;
```

If Type equals D3DKMDDI_RMT_GRAPHICS, then the source mode descriptor contains a graphics rendering format descriptor, grfxFormat, defined as:

```
typedef struct_D3DKMDDI_GRAPHICS_RENDERING_FORMAT
{
  SIZE                           sizePrimSurf;
```

-continued

```
  SIZE                           sizeVisible;
  DWORD                          dwStride;
  D3DKMDDI_PIXEL_FORMAT          PixelFormat;
  D3DKMDDI_COLOR_ACCESS_MODE     PixelValueAccessMode;
} D3DKMDDI_GRAPHICS_RENDERING_FORMAT;
``` with:
- sizePrimSurf specifying the size of the primary surface required for this VidPN source mode.
- sizeVisible specifying the size of the visible part of the primary surface, used for panned modes including zoom modes.
- dwStride specifying the number of bytes between the start of one scan line and the next.
- PixelFormat specifying the pixel format.
- PixelValueAccessMode specifying access mode for the pixel value information.

Otherwise, if Type equals D3DKMDDI_RMT_TEXT, then the source mode descriptor contains a text rendering format descriptor, textFormat, defined as:

```
typedef enum_D3DKMDDI_TEXT_RENDERING_FORMAT
{
    D3DKMDDI_TRF_UNINITIALIZED = 0
}
D3DKMDDI_TEXT_RENDERING_FORMAT;
```

Furthemore, the VidPN target descriptor can be defined as:

```
typedef struct_D3DKMDDI_VIDPN_TARGET
{
    D3DKMDDI_VIDEO_PRESENT_TARGET_ID    VidPNTargetID;
    SIZE_T                              PinnedModeIndex;
    D3DKMDDI_VIDPN_TARGET_MODESET*      pCofuncVidPNTargetModeSet;
}
D3DKMDDI_VIDPN_TARGET;
``` with:
    VidPNTargetID is the unique ID used to reference the respective video present target by the miniport and the operating system. This value comes from the EnumVideoPresentTargetSet call.
    PinnedModeIndex is the index of the video present target mode that is pinned in the co-functional set of modes available on this video present target given the current VidPN configuration, or D3DKMDDI_NO_PINNED_MODE if no mode is pinned on this target.
    pCofuncVidPNSourceModeSet is the VidPN target modes co-functional with the current (partial) VidPN this target is a member of.

The VidPN target mode set descriptor can be defined as:

```
typedef struct_D3DKMDDI_VIDPN_TARGET_MODESET
{
    SIZE_T                      NumOfVidPNTargetModes;
    D3DKMDDI_VIDPN_TARGET_MODE  VidPNTargetModes[1];
}
D3DKMDDI_VIDPN_TARGET_MODESET;
``` with:
    NumOfVidPNTargetModes specifying the number of video present target modes listed in VidPNTargetModes.
    VidPNTargetModes containing the array of video present target modes in the set.

where the VidPN target mode descriptor can be defined as shown in Table 53:

TABLE 53

| VidPN target mode descriptor |
|---|

```
typedef struct_D3DKMDDI_VIDPN_TARGET_MODE
{
    D3DKMDDI_VIDEO_SIGNAL_STANDARD      vidStandard;
    SIZE                                sizeTotal;
    SIZE                                sizeActive;
    SIZE                                sizeActiveOffset;
    SIZE                                sizeTLDeltaVisibleFromActive;
    SIZE                                sizeBRDeltaVisibleFromActive;
    D3DKMDDI_FRACTIONAL_FREQUENCY       frqVSync;
    D3DKMDDI_FRACTIONAL_FREQUENCY       frqHSync;
```

TABLE 53-continued

VidPN target mode descriptor

```
  SIZE_T                                  sztPixelRate;
  D3DKMDDI_VIDEO_SIGNAL_SCANLINE_ORDERING ScanLineOrdering;
  D3DKMDDI_GTFCOMPLIANCE                  IsGTFCompliant;
  D3DKMDDI_MODE_PREFERENCE                ModePreference;
}
D3DKMDDI_VIDPN_TARGET_MODE;
typedef enum _D3DKMDDI_VIDEO_SIGNAL_STANDARD
{
                                    // W x H{i|p} @( VR  /  HR  /  CR   )
  D3DKMDDI_VMS_UNINITIALIZED  = 0,
  D3DKMDDI_VMS_GTF            = 1,
  D3DKMDDI_VMS_NTSC_M         = 2,  // 720 x 525i @ (59.94 [Hz]/ 15,734.27[Hz]/ 3,579,545 [Hz])
  D3DKMDDI_VMS_NTSC_J         = 3,  // 720 x 525i @ (59.94 [Hz]/ 15,734.27[Hz]/ 3,579,545 [Hz])
  D3DKMDDI_VMS_NTSC_443       = 4,  // 720 x 525i @ (59.94 [Hz]/ 15,734.27[Hz]/ 4,433,618.75[Hz])
  D3DKMDDI_VMS_PAL_B          = 5,  // 720 x 625i @ (50    [Hz]/ 15,625 [Hz]/ 4,433,618.75[Hz])
  D3DKMDDI_VMS_PAL_B1         = 6,  // 720 x 625i @ (50    [Hz]/ 15,625 [Hz]/ 4,433,618.75[Hz])
  D3DKMDDI_VMS_PAL_G          = 7,  // 720 x 625i @ (50    [Hz]/ 15,625 [Hz]/ 4,433,618.75[Hz])
  D3DKMDDI_VMS_PAL_H          = 8,  // 720 x 625i @ (50    [Hz]/ 15,625 [Hz]/ 4,433,618.75[Hz])
  D3DKMDDI_VMS_PAL_I          = 9,  // 720 x 625i @ (50    [Hz]/ 15,625 [Hz]/ 4,433,618.75[Hz])
  D3DKMDDI_VMS_PAL_D          = 10, // 720 x 525i @ (59.94 [Hz]/ 15,734 [Hz]/ 3,575,611.49[Hz])
  D3DKMDDI_VMS_PAL_N          = 11, // 720 x 625i @ (50    [Hz]/ 15,625 [Hz]/ 4,433,618.75[Hz])
  D3DKMDDI_VMS_PAL_NC         = 12, // 720 x 625i @ (50    [Hz]/ 15,625 [Hz]/ 3,582,056.25[Hz])
  D3DKMDDI_VMS_SECAM_B        = 13, // 720 x 625i @ (50    [Hz]/ 15,625 [Hz]/         [Hz])
  D3DKMDDI_VMS_SECAM_D        = 14, // 720 x 625i @ (50    [Hz]/ 15,625 [Hz]/         [Hz])
  D3DKMDDI_VMS_SECAM_G        = 15, // 720 x 625i @ (50    [Hz]/ 15,625 [Hz]/         [Hz])
  D3DKMDDI_VMS_SECAM_H        = 16, // 720 x 625i @ (50    [Hz]/ 15,625 [Hz]/         [Hz])
  D3DKMDDI_VMS_SECAM_K        = 17, // 720 x 625i @ (50    [Hz]/ 15,625 [Hz]/         [Hz])
  D3DKMDDI_VMS_SECAM_K1       = 18, // 720 x 625i @ (50    [Hz]/ 15,625 [Hz]/         [Hz])
  D3DKMDDI_VMS_SECAM_L        = 19, // 720 x 625i @ (50    [Hz]/ 15,625 [Hz]/         [Hz])
  D3DKMDDI_VMS_SECAM_L1       = 20, // 720 x 625i @ (50    [Hz]/ 15,625 [Hz]/         [Hz])
  D3DKMDDI_VMS_EIA_861_1      = 21, // 720 x 480i @ (59.94 [Hz]/        [Hz]/         [Hz])
  D3DKMDDI_VMS_EIA_861_2      = 22, // 720 x 480i @ (60    [Hz]/        [Hz]/         [Hz])
  D3DKMDDI_VMS_EIA_861_3      = 23, // 640 x 480p @ (59.94 [Hz]/        [Hz]/         [Hz])
  D3DKMDDI_VMS_EIA_861_4      = 24, // 640 x 480p @ (60    [Hz]/        [Hz]/         [Hz])
  D3DKMDDI_VMS_EIA_861_5      = 25, // 720 x 480p @ (59.94 [Hz]/        [Hz]/         [Hz])
  D3DKMDDI_VMS_EIA_861_6      = 26, // 720 x 480p @ (60    [Hz]/        [Hz]/         [Hz])
  D3DKMDDI_VMS_EIA_861_7      = 27, // 1280 x 720p @ (59.94 [Hz]/       [Hz]/         [Hz])
  D3DKMDDI_VMS_EIA_861_8      = 28, // 1280 x 720p @ (60   [Hz]/        [Hz]/         [Hz])
  D3DKMDDI_VMS_EIA_861_9      = 29, // 1920 x 1080i @ (59.94 [Hz]/      [Hz]/         [Hz])
  D3DKMDDI_VMS_EIA_861_10     = 30, // 1920 x 1080i @ (60   [Hz]/       [Hz]/         [Hz])
  D3DKMDDI_VMS_EIA_861A_1     = 31, // 720 x 576i @ (50     [Hz]/       [Hz]/         [Hz])
  D3DKMDDI_VMS_EIA_861A_2     = 32, // 720 x 576p @ (50     [Hz]/       [Hz]/         [Hz])
  D3DKMDDI_VMS_EIA_861A_3     = 33, // 1280 x 720p @ (50    [Hz]/       [Hz]/         [Hz])
  D3DKMDDI_VMS_EIA_861A_4     = 34, // 1920 x 1080i @ (50   [Hz]/       [Hz]/         [Hz])
  D3DKMDDI_VMS_EIA_861B_1     = 35, // 1920 x 1080p @ (23.960 [Hz]/     [Hz]/         [Hz])
  D3DKMDDI_VMS_EIA_861B_2     = 36, // 1920 x 1080p @ (24   [Hz]/       [Hz]/         [Hz])
  D3DKMDDI_VMS_EIA_861B_3     = 37, // 1920 x 1080p @ (25   [Hz]/       [Hz]/         [Hz])
  D3DKMDDI_VMS_EIA_861B_4     = 38, // 1920 x 1080p @ (29.970 [Hz]/     [Hz]/         [Hz])
  D3DKMDDI_VMS_EIA_861B_5     = 39, // 1920 x 1080p @ (30   [Hz]/       [Hz]/         [Hz])
  D3DKMDDI_VMS_EIA_861B_6     = 40, // 1920 x 1080p @ (50   [Hz]/       [Hz]/         [Hz])
  D3DKMDDI_VMS_EIA_861B_7     = 41, // 1920 x 1080p @ (60   [Hz]/       [Hz]/         [Hz])
  D3DKMDDI_VMS_IBM_1          = 42, // 720 x 400p @ (70     [Hz]/       [Hz]/         [Hz])
  D3DKMDDI_VMS_IBM_2          = 43, // 720 x 400p @ (88     [Hz]/       [Hz]/         [Hz])
  D3DKMDDI_VMS_IBM_3          = 44, // 640 x 480p @ (60     [Hz]/       [Hz]/         [Hz])
  D3DKMDDI_VMS_IBM_4          = 45, // 1024 x 768i @ (87    [Hz]/       [Hz]/         [Hz])
  D3DKMDDI_VMS_APPLE_1        = 46, // 640 x 480p @ (67     [Hz]/       [Hz]/         [Hz])
  D3DKMDDI_VMS_APPLE_2        = 47, // 832 x 624p @ (75     [Hz]/       [Hz]/         [Hz])
  D3DKMDDI_VMS_APPLE_3        = 48, // 1152 x 870p @ (75    [Hz]/       [Hz]/         [Hz])
  D3DKMDDI_VMS_VESA_1         = 49, // 640 x 480p @ (72     [Hz]/       [Hz]/         [Hz])
  D3DKMDDI_VMS_VESA_2         = 50, // 640 x 480p @ (75     [Hz]/       [Hz]/         [Hz])
  D3DKMDDI_VMS_VESA_3         = 51, // 800 x 600p @ (56     [Hz]/       [Hz]/         [Hz])
  D3DKMDDI_VMS_VESA_4         = 52, // 800 x 600p @ (60     [Hz]/       [Hz]/         [Hz])
  D3DKMDDI_VMS_VESA_5         = 53, // 800 x 600p @ (72     [Hz]/       [Hz]/         [Hz])
  D3DKMDDI_VMS_VESA_6         = 54, // 800 x 600p @ (75     [Hz]/       [Hz]/         [Hz])
  D3DKMDDI_VMS_VESA_7         = 55, // 1024 x 768p @ (60    [Hz]/       [Hz]/         [Hz])
  D3DKMDDI_VMS_VESA_8         = 56, // 1024 x 768p @ (70    [Hz]/       [Hz]/         [Hz])
  D3DKMDDI_VMS_VESA_9         = 57, // 1024 x 768p @ (75    [Hz]/       [Hz]/         [Hz])
  D3DKMDDI_VMS_VESA_10        = 58, // 1280 x 1024p @ (75   [Hz]/       [Hz]/         [Hz])
  D3DKMDDI_VMS_VDMT_1         = 59, // 640 x 350p @ (85     [Hz]/ 37,900 [Hz]/ 31,500,000 [Hz])
  D3DKMDDI_VMS_VDMT_2         = 60, // 640 x 400p @ (85     [Hz]/ 37,900 [Hz]/ 31,500,000 [Hz])
  D3DKMDDI_VMS_VDMT_3         = 61, // 720 x 400p @ (85     [Hz]/ 37,900 [Hz]/ 35,500,000 [Hz])
  D3DKMDDI_VMS_VDMT_4         = 62, // 640 x 480p @ (60     [Hz]/ 31,500 [Hz]/ 25,175,000 [Hz])
  D3DKMDDI_VMS_VDMT_5         = 63, // 640 x 480p @ (72     [Hz]/ 37,900 [Hz]/ 31,500,000 [Hz])
  D3DKMDDI_VMS_VDMT_6         = 64, // 640 x 480p @ (75     [Hz]/ 37,500 [Hz]/ 31,500,000 [Hz])
  D3DKMDDI_VMS_VDMT_7         = 65, // 640 x 480p @ (85     [Hz]/ 43,300 [Hz]/ 36,000,000 [Hz])
  D3DKMDDI_VMS_VDMT_8         = 66, // 800 x 600p @ (56     [Hz]/ 35,100 [Hz]/ 36,000,000 [Hz])
  D3DKMDDI_VMS_VDMT_9         = 67, // 800 x 600p @ (60.317 [Hz]/ 37,879 [Hz]/ 40,000,000 [Hz])
```

TABLE 53-continued

VidPN target mode descriptor

| | | |
|---|---|---|
| D3DKMDDI_VMS_VDMT_10 | = 68, // 800 × 600p @ (72 | [Hz]/ 48,100 [Hz]/ 50,000,000 [Hz]) |
| D3DKMDDI_VMS_VDMT_11 | = 69, // 800 × 600p @ (75 | [Hz]/ 46,900 [Hz]/ 49,500,000 [Hz]) |
| D3DKMDDI_VMS_VDMT_12 | = 70, // 800 × 600p @ (85 | [Hz]/ 53,700 [Hz]/ 56,250,000 [Hz]) |
| D3DKMDDI_VMS_VDMT_13 | = 71, // 1024 × 768i @ (43 | [Hz]/ 35,500 [Hz]/ 44,900,000 [Hz]) |
| D3DKMDDI_VMS_VDMT_14 | = 72, // 1024 × 768p @ (60.004 | [Hz]/ 48,363 [Hz]/ 65,000,000 [Hz]) |
| D3DKMDDI_VMS_VDMT_15 | = 73, // 1024 × 768p @ (70 | [Hz]/ 56,500 [Hz]/ 75,000,000 [Hz]) |
| D3DKMDDI_VMS_VDMT_16 | = 74, // 1024 × 768p @ (75 | [Hz]/ 60,000 [Hz]/ 78,750,000 [Hz]) |
| D3DKMDDI_VMS_VDMT_17 | = 75, // 1024 × 768p @ (85 | [Hz]/ 68,700 [Hz]/ 94,500,000 [Hz]) |
| D3DKMDDI_VMS_VDMT_18 | = 76, // 1152 × 864p @ (75 | [Hz]/ 67,500 [Hz]/ 108,000,000 [Hz]) |
| D3DKMDDI_VMS_VDMT_19 | = 77, // 1280 × 960p @ (60 | [Hz]/ 60,000 [Hz]/ 108,000,000 [Hz]) |
| D3DKMDDI_VMS_VDMT_20 | = 78, // 1280 × 960p @ (85 | [Hz]/ 85,900 [Hz]/ 148,500,000 [Hz]) |
| D3DKMDDI_VMS_VDMT_21 | = 79, // 1280 × 1024p @ (60 | [Hz]/ 64,000 [Hz]/ 108,000,000 [Hz]) |
| D3DKMDDI_VMS_VDMT_22 | = 80, // 1280 × 1024p @ (75 | [Hz]/ 80,000 [Hz]/ 135,000,000 [Hz]) |
| D3DKMDDI_VMS_VDMT_23 | = 81, // 1280 × 1024p @ (85 | [Hz]/ 91,100 [Hz]/ 157,500,000 [Hz]) |
| D3DKMDDI_VMS_VDMT_24 | = 82, // 1600 × 1200p @ (60 | [Hz]/ 75,000 [Hz]/ 162,000,000 [Hz]) |
| D3DKMDDI_VMS_VDMT_25 | = 83, // 1600 × 1200p @ (65 | [Hz]/ 81,300 [Hz]/ 175,500,000 [Hz]) |
| D3DKMDDI_VMS_VDMT_26 | = 84, // 1600 × 1200p @ (70 | [Hz]/ 87,500 [Hz]/ 189,000,000 [Hz]) |
| D3DKMDDI_VMS_VDMT_27 | = 85, // 1600 × 1200p @ (75 | [Hz]/ 93,800 [Hz]/ 202,500,000 [Hz]) |
| D3DKMDDI_VMS_VDMT_28 | = 86, // 1600 × 1200p @ (85 | [Hz]/ 106,300 [Hz]/ 229,500,000 [Hz]) |
| D3DKMDDI_VMS_VDMT_29 | = 87, // 1792 × 1344p @ (60 | [Hz]/ 83,640 [Hz]/ 204,750,000 [Hz]) |
| D3DKMDDI_VMS_VDMT_30 | = 88, // 1792 × 1344p @ (75 | [Hz]/ 106,270 [Hz]/ 261,750,000 [Hz]) |
| D3DKMDDI_VMS_VDMT_31 | = 89, // 1856 × 1392p @ (60 | [Hz]/ 86,330 [Hz]/ 218,250,000 [Hz]) |
| D3DKMDDI_VMS_VDMT_32 | = 90, // 1856 × 1392p @ (75 | [Hz]/ 112,500 [Hz]/ 288,000,000 [Hz]) |
| D3DKMDDI_VMS_VDMT_33 | = 91, // 1920 × 1440p @ (60 | [Hz]/ 90,000 [Hz]/ 234,000,000 [Hz]) |
| D3DKMDDI_VMS_VDMT_34 | = 92, // 1920 × 1440p @ (75 | [Hz]/ 112,500 [Hz]/ 297,000,000 [Hz]) |
| D3DKMDDI_VMS_OTHER | = 255 | |

```
}
D3DKMDDI_VIDEO_SIGNAL_STANDARD;
typedef enum _D3DKMDDI_GTFCOMPLIANCE
{
    D3DKMDDI_GTF_UNINITIALIZED   = 0,
    D3DKMDDI_GTF_COMPLIANT       = 1,
    D3DKMDDI_GTF_NOTCOMPLIANT    = 2
}
D3DKMDDI_GTFCOMPLIANCE;
typedef enum _D3DKMDDI_MODE_PREFERENCE
{
    D3DKMDDI_MP_UNINITIALIZED   = 0,
    D3DKMDDI_MP_PREFERRED       = 1,
    D3DKMDDI_MP_NOTPREFERRED    = 2
}
D3DKMDDI_MODE_PREFERENCE;
``` with:
vidStandard specifying the video mode standard this mode is defined by (if any).
sizeTotal specifying video signal's size in pixels (e.g., HTotal & VTotal).
sizeActive specifying the presented image's size in active pixels (e.g., HActive & VActive).
sizeActiveOffset specifying the position of the active pixels with respect to the total pixels.
sizeTLDeltaVisibleFromActive specifying monitor screen's delta of visible pixels' top-left corner from video signal's active pixels bottom-right corner.
sizeBRDeltaVisibleFromActive specifying monitor screen's delta of visible pixels' bottom-right corner from video signal's active pixels bottom-right corner.
frqVSync specifying this mode's vertical refresh frequency (in Hz).
frqHSync specifying this mode's horizontal refresh frequency (in KHz).
sztPixelRate specifying this mode's pixel clock rate.
ScanLineOrdering specifying this mode's scan line ordering (e.g., progressive, interlaced).
IsGTFCompliant specifying whether this mode's VSync, HSync, and clock rate comply with the restrictions imposed by the VESA Generalized Timing Formula.
ModePreference specifying whether this mode is preferred by the monitor connected to the respective video output.

The video signal standard enum can be used to simplify video mode comparisons when appropriate.

The fractional frequency descriptor can be defined as:

```
typedef struct _D3DKMDDI_FRACTIONAL_FREQUENCY
{
    SIZE_T Numerator;
    SIZE_T sztDenominator;
}
D3DKMDDI_FRACTIONAL_FREQUENCY;
``` with:
Numerator specifying the fractional frequency numerator.
Denominator specifying the fractional frequency denominator.
Vertical frequencies can be stored in Hz and horizontal frequencies can be stored in KHz. The dynamic range of this encoding format, given $10^{-7}$ resolution (on 32-bit systems) is $\{0 \ldots (2^{32}-1)/10^7\}$, which translates to $\{0 \ldots 428.4967296\}$ [Hz] for vertical frequencies and $\{0 \ldots 428.4967296\}$ [KHz] for horizontal frequencies. This sub-microseconds precision range should be acceptable even for a pro-video application (error in one microsecond for video signal synchronization would imply a time drift with a cycle of $10^7/(60*60*24)=115.741$ days.

The video signal scan-line ordering descriptor can be defined as:

```
typedef enum_D3DKMDDI_VIDEO_SIGNAL_SCANLINE_ORDERING
{
    D3DKMDDI_VSSLO_UNINITIALIZED                  = 0,
    D3DKMDDI_VSSLO_PROGRESSIVE                    = 1,
    D3DKMDDI_VSSLO_INTERLACED_UPPERFIELDFIRST     = 2,
    D3DKMDDI_VSSLO_INTERLACED_LOWERFIELDFIRST     = 3,
    D3DKMDDI_VSSLO_OTHER                          = 255
}
D3DKMDDI_VIDEO_SIGNAL_SCANLINE_ORDERING;
``` and can be used specify whether each field contains the entire content of a frame or only half of it (e.g., even/odd lines interchangeably). Specifying this characteristic explicitly with an enum can both free up the client from having to maintain mode-based look-up tables and be extensible for future standard modes not listed in the D3DKMDDI_VIDEO_SIGNAL_STANDARD enum.

Storing deltas for visible/active pixels mapping rather than visible pixels' size & offset has the added benefit of ideal/default state being zeros.

The VidPN present path transformation descriptor can be defined as:

```
typedef enum_D3DKMDDI_VIDPN_PRESENT_PATH_TRANSFORMATION
{
    D3DKMDDI_VPPT_IDENTITY    = 1,
    D3DKMDDI_VPPT_CENTERED    = 2
}
D3DKMDDI_VIDPN_PRESENT_PATH_TRANSFORMATION;
``` with:

D3DKMDDI_VPPT_IDENTITY representing source content presented as-is. Note that this transformation is available if and only if the video present source and target modes' spatial resolutions match.

D3DKMDDI_VPPT_CENTERED representing source content presented unscaled, centered with respect to the target mode's spatial resolution.

A specified VidPN should at a minimum specify a valid topology, but can also have some or all of its targets/sources configured with respectively pinned modes.

Return Codes

STATUS_SUCCESS indicates that the driver handled the call successfully.

STATUS_GRAPHICS_INVALID_VIDPN_TOPOLOGY indicates that the specified VidPN topology is invalid.

TABLE 54

Function EnumCofuncVidPNSourceIDSet

```
typedef NTSTATUS
    (APIENTRY *PFND3DKMDDI_ENUMCOFUNCVIDPNSOURCEIDSET)
        (IN HANDLE                                       hAdapter,
        IN OUT D3DKMDDIARG_ENUMCOFUNCVIDPNSOURCEIDSET*
pEnumCofuncVidPNSourceIDSetArg);
typedef struct_D3DKMDDIARG_ENUMCOFUNCVIDPNSOURCEIDSET
{
    IN D3DKMDDI_VIDPN*                               pConstrainingVidPN;
    OUT D3DKMDDI_VIDEO_PRESENT_SOURCE_ID_SET*        CofuncVidPNSourceIDSet;
}
D3DKMDDIARG_ENUMCOFUNCVIDPNSOURCEIDSET;
```

EnumCofuncVidPNSourceIDSet enumerates a set of VidPN source IDs confunctional with the specified VidPN implementation. A VidPN source can be cofunctional with a given VidPN implementation if an only if it can be added to its topology via at least one video present path without rendering that VidPN implementation invalid or unsupported. The miniport can allocate a large enough buffer pointed to by pEnumCofuncVidPNSourceIDSetArg to accommodate the entire enumeration result using D3DKMDDI_INTERFACESPECIFICDATA.pfnAllocSysMemForOutParamCb. The size of the allocation should be sizeof (D3DKMDDI_VIDEO_PRESENT_SOURCE_ID_SET)+ sizeof(D3DKMDDI_VIDEO_PRESENT_SOURCE_ID) *(# of cofunctional video present sources−1).

Once the memory for the output parameter has been allocated, the miniport can populate it based on the definitions below:

EnumCofuncVidPNTargetIDSet enumerates a set of VidPN target IDs confunctional with the specified VidPN implementation. A VidPN target can be cofunctional with a given VidPN implementation if and only if it can be added to its topology via at least one video present path without rendering that VidPN implementation invalid or unsupported. The miniport can allocate a large enough buffer pointed to by pEnumCofuncVidPNTargetIDSetArg to accommodate the entire enumeration result using D3DKMDDI_INTERFACESPECIFICDATA.pfnAllocSysMemForOutParamCb. The size of the allocation should be sizeof (D3DKMDDI_VIDEO_PRESENT_TARGET_ID_SET)+ sizeof(D3DKMDDI_VIDEO_PRESENT_TARGET_ID) *(# of cofunctional video present targets−1).

Once the memory for the output parameter has been allocated, the miniport can populate it based on the definitions below:

```
typedef struct _D3DKMDDI_VIDEO_PRESENT_SOURCE_ID_SET
{
    SIZE_T                              NumOfVidPNSourceIDs;
    D3DKMDDI_VIDEO_PRESENT_SOURCE_ID    VideoPresentSourceIDs[1];
} D3DKMDDI_VIDEO_PRESENT_SOURCE_ID_SET;
``` with:
NumOfVidPNSourceIDs specifying the number of video present sources' IDs listed in VideoPresentSourceIDs.
VideoPresentSourceIDs representing the array of video present sources' IDs in the set.

On successful return from this function, the operating system can take ownership of the lifetime of the data returned in the output parameter and can deallocate the memory taken by its supporting allocation when it is done with it.

Return Codes

STATUS_SUCCESS indicates that the driver handled the call successfully.

STATUS_GRAPHICS_INVALID_VIDPN_TOPOLOGY indicates that the specified VidPN topology is invalid. STATUS_NO_MEMORY indicate that miniport could not allocate a buffer to fit in the requested enumeration.

TABLE 55

Function EnumCofuncVidPNTargetIDSet

```
typedef NTSTATUS
    (APIENTRY *PFND3DKMDDI_ENUMCOFUNCVIDPNTARGETIDSET)
    (IN HANDLE                                          hAdapter,
     IN OUT D3DKMDDIARG_ENUMCOFUNCVIDPNTARGETIDSET*
pEnumCofuncVidPNTargetIDSetArg);
typedef struct _D3DKMDDIARG_ENUMCOFUNCVIDPNSOURCEIDSET
{
    IN D3DKMDDI_VIDPN*                          pConstrainingVidPN;
    OUT D3DKMDDI_VIDEO_PRESENT_TARGET_ID_SET*   pCofuncVidPNTargetIDSet;
} D3DKMDDIARG_ENUMCOFUNCVIDPNTARGETIDSET;
```

```
typedef struct _D3DKMDDI_VIDEO_PRESENT_TARGET_ID_SET
{
    SIZE_T                              NumOfVidPNTargetIDs;
    D3DKMDDI_VIDEO_PRESENT_TARGET_ID    VideoPresentTargetIDs[1];
}
D3DKMDDI_VIDEO_PRESENT_TARGET_ID_SET;
``` with:
NumOfVidPNTargetIDs specifying the number of video present targets' IDs listed in VideoPresentTargetIDs.
VideoPresentSourceIDs representing the array of video present targets' IDs in the set.

On successful return from this function, the operating system can take ownership of the lifetime of the data returned in the output parameter and can deallocate the memory taken by its supporting allocation when it is done with it.

Return Codes

STATUS_SUCCESS indicates that the driver handled the call successfully.

STATUS_GRAPHICS_INVALID_VIDPN_TOPOLOGY indicates that the specified VidPN topology is invalid.

STATUS_NO_MEMORY indicates that the miniport could not allocate a buffer to fit in the requested enumeration.

have modes pinned on them, their indices should be properly updated in the respective VidPN source/target descriptor in the result set.

The miniport should populate:

pVidPresentPath→VideoPresentSource.pCofuncVidPNSourceModeSet→VidPNSourceModes[1 ... n]

and pVidPresentPath→VideoPresentTarget.pCofuncVidPNTargetModeSet→VidPNTargetModes[1 ... m]

where:

D3DKMDDI_VIDPN_PRESENT_PATH*pVidPresentPath=(*o_ppVidPNPresentPathSetWithCofuncModeSets)→arr_VidPresentPaths[1 ... k];

TABLE 56

Function EnumVidPNCofuncModality

```
typedef NTSTATUS
    (APIENTRY *PFND3DKMDDI_ENUMVIDPNCOFUNCMODALITY)
    (IN HANDLE                                      hAdapter,
     IN OUT D3DKMDDIARG_ENUMVIDPNCOFUNCMODALITY*    pEnumVidPNCofuncModalityArg);
typedef struct _D3DKMDDIARG_ENUMVIDPNCOFUNCMODALITY
{
    IN D3DKMDDI_VIDPN*                pConstrainingVidPN;
    OUT D3DKMDDI_VIDPN_PRESENT_PATH_SET*  pVidPNPresentPathSetWithCofuncModeSets;
}
D3DKMDDIARG_ENUMVIDPNCOFUNCMODALITY;
```

EnumVidPNCofuncModality lets the operating system enumerate cofunctional video present and target mode sets on each video present path in the specified VidPN, where:
pConstrainingVidPN is the VidPN with respect to which cofunctional mode sets on VidPN's targets and sources are being sought.
pVidPNPresentPathSetWithCofuncModeSets is the set of VidPN present paths where each source/target is populated with mode sets cofunctional to the constraining VidPN. If any sources/targets of the constraining VidPN On successful return from this function, the operating system can take ownership of the lifetime of the data returned in the output parameter and can deallocate the memory taken by its supporting allocation when it is done with it.

Return Codes

STATUS_SUCCESS indicates that the driver handled the call successfully.

STATUS_NO_MEMORY indicate that miniport could not allocate a buffer to fit in the requested enumeration.

TABLE 57

Function RecommendFunctionalVidPN

```
typedef NTSTATUS
    (APIENTRY *PFND3DKMDDI_RECOMMENDFUNCTIONALVIDPN)
    (IN HANDLE                                      hAdapter,
     IN OUT D3DKMDDIARG_RECOMMENDFUNCTIONALVIDPN*   pRecommendFunctionalVidPNArg);
typedef struct _D3DKMDDIARG_RECOMMENDFUNCTIONALVIDPN
{
    IN UINT                                NumberOfMonitors;
    IN D3DKMDDI_VIDEO_PRESENT_TARGET_ID*   pVidPNTargetPrioritizationVector;
    OUT D3DKMDDI_VIDPN*                    pRecommendedFunctionalVidPN;
}
D3DKMDDIARG_RECOMMENDFUNCTIONALVIDPN;
```

RecommendFunctionalVidPN lets the operating system query for a VidPN recommended by the miniport, given the current state of the h/w. The operating system may use it in case it encounters a configuration where no user preference (e.g., last-used modality) has been specified. As part of this request, the operating system specifies to the miniport a vector of VidPN targets IDs, pVidPNTargetPrioritizationVector ordered most important first, representing the relative importance of monitors connected to them. In turn, the miniport should allocate sufficient memory to populate the functional VidPN it wishes to recommend to the operating system for the current state of the h/w, populate the respective fields, and assign its address to pRecommendedFunctionalVidPN. On successful return from this function, the operating system can take ownership of the lifetime of the data returned in the output parameter and can deallocate the memory taken by its supporting allocation when it is done with it.

Return Codes

STATUS_SUCCESS indicates that the driver handled the call successfully.

STATUS_GRAPHICS_NO_RECOMMENDED_VIDPN indicates that miniport has no VidPN recommendation for the current configuration of the display adapter.

STATUS_NO_MEMORY indicates that the miniport could not allocate a buffer to fit in the requested enumeration.

Example 49

Exemplary Device-Specific Part of Video Rendering Device Driver

Any of the technologies described herein can be implemented in the device-specific part of a video rendering device driver. A reusable portion of the driver can be shared across video rendering device drivers.

For example, in an implementation carried out in the MICROSOFT® WINDOWS® operating system, the video port can serve as the reusable portion of the driver, and a video miniport can serve as the device-specific part of the video rendering device driver.

Exemplary Advantages

Multi-monitor display mode management is a complex problem that deals with capabilities of video rendering/presenting devices (e.g., video cards also known as graphics adapters) and video monitoring devices (e.g., monitors). A main issue causing complexity in display mode management is an inherent interdependency among capabilities of graphics display device objects (e.g., MICROSOFT® WINDOWS® GDI objects), each representing a separate (view, output) mapping on a single multi-output video card, which is not dealt with well by the legacy display mode management architecture.

These interdependencies arise primarily from: (1) possible contention for video output codecs on systems having more video outputs than codecs that can drive them; (2) the multitude of ways to satisfy a request for establishment of any given multi-output video presenting configuration within a given video card, largely due to: (a) differences in capabilities of video output codecs present in a video card; (b) a video card's ability to use video output codecs with various video outputs through the use of cross-bars that can route any video output codec to any compatible video output; (c) a video card's ability to share video output codecs for multiple video outputs in cases where video output codecs are a scarce resource (e.g., less than the number of video outputs to be driven); (d) a video card's ability to use multiple video output codecs or a single multi-input video output codec for a single video output (e.g., overlays), in cases where tampering with one of the video streams cannot be tolerated or where a video stream on which a secondary signal needs to be overlaid is already in an analog format and decoding it just to add a digital overlay and then remodulate it is wasteful; (3) contention for video memory bus bandwidth by utilized video output codecs, each of which is responsible for converting content of associated primary surface(s) into a video signal on the respective video output interface, which ultimately is reduced to periodic video memory reads; or (4) contention for video memory capacity by the primary surfaces required to support a given video present path (e.g., a logical path from the rendered digital content to the physical video interface output).

As such, above-mentioned interdependencies between available display mode sets of (view, output) pairs are more intricate than just on a (view, output) pair basis. Specifically, choosing to use a given primary surface format on a view may affect what video signal can be presented on the respective output. Also, when considering scenarios where a single view is presented on multiple outputs, the set of available video signals changes based on how and which video output codecs are used to implement the resulting present configuration. Finally, when considering scenarios where multiple views are employed on a single video card (each potentially presented to multiple outputs), available video signals change based on association between the various views and the outputs. That is, what video signals a video card can drive on its outputs is a function of what types of primary surfaces it is asked to present and in what fashion should they be presented (e.g., to what outputs).

Furthermore, designs might not take into account the scaling capability of contemporary video cards, which are able to up- or down-sample a given primary surface content to a different spatial resolution to be driven on the respective video output. As such, two main abstractions that may be made with respect to multi-output video cards are: (1) a simplified view of a multi-function display device abstraction that includes both the video card and the monitor, represented in a unified "display mode" descriptor modality, which contains states of two distinct physical devices; and (2) extension of a single-output mode enumeration to multiple outputs, which can be achieved via duplication of independent video driver stacks and respective graphics devices, one per (view, output). These abstractions are not sufficient to properly drive such devices and may be superseded with: (1) distinct modality descriptors for views and outputs; (2) one video driver stack per video card, which hosts a video miniport that exposes a capability-balancing DDI that lets a client pin the modes it desires and re-enumerate an updated set of available modes, ultimately converging on a functional solution in a series of iterations (e.g., graph search); and (3) augmentation of an implementation to support display mode interdependencies, resulting available mode set invalidations, and mode change failures.

Alternatives

The technologies from any example can be combined with the technologies described in any one or more of the other examples. In view of the many possible embodiments to which the principles of the invention may be applied, it should be recognized that the illustrated embodiments are examples of the invention and should not be taken as a limitation on the scope of the invention. Rather, the scope of the invention includes what is covered by the following claims. We therefore claim as our invention all that comes within the scope and spirit of these claims.

We claim:

1. One or more computer-readable media having computer-executable instructions for performing a method of determining a topology for a video presenting network, the method comprising:
   starting with an initial topology;
   selecting a first video resource;
   determining if one or more other video resources are unavailable as a result of selecting the first video resource;
   as a result of determining that the one or more other video resources are unavailable as a result of selecting the first video resource, determining that the first video resource has a higher priority than the initial topology; and
   as a result of determining that the first video resource has the higher priority and based on a goal stated in terms of video modes supported by monitors, modifying the initial topology to better meet the goal.

2. The one or more computer-readable media of claim 1, wherein the modifying comprises generating a provisional functional configuration better meeting the goal.

3. The one or more computer-readable media of claim 1, wherein the modifying accounts for interdependencies among resources of the video presenting network.

4. The one or more computer-readable media of claim 1, wherein the goal comprises a best way to route video present targets to video present sources in the video presenting network through available video output codecs to maximize supported graphics video present source mode sets on video present sources, given that video mode sets on the video present targets must support preferred modes on video display devices connected to them.

5. The one or more computer-readable media of claim 1, wherein the goal comprises a best way to route video present targets to video present sources in the video presenting network through available video output codecs to maximize supported graphics video present source mode sets on video present sources, given that video mode sets on the video present targets must support preferred modes on video display devices connected to them in a specified prioritization ordering.

6. The one or more computer-readable media of claim 1, wherein the goal comprises a best way to route video present targets to video present sources in the video presenting network through available video output codecs to maximize supported graphics video present source mode sets on video present sources, given that video mode sets on the video present targets must support at least one video mode supported by video display devices connected to them.

7. The one or more computer-readable media of claim 1, wherein modifying the initial topology comprises enumerating a plurality of video modes available to a plurality of video outputs.

8. The one or more computer-readable media of claim 1, wherein modifying the initial topology comprises pinning at least one of a plurality of video modes on at least one of a plurality of video outputs.

9. The one or more computer-readable media of claim 1, wherein modifying the initial topology comprises enumerating a plurality of rendering modes available to a plurality of render targets.

10. The one or more computer-readable media of claim 1, wherein modifying the initial topology comprises pinning at least one of a plurality of rendering modes on one of a plurality of render targets.

11. The one or more computer-readable media of claim 1, wherein modifying the initial topology comprises unpinning at least one of a plurality of rendering modes pinned on one of a plurality of render targets.

12. The one or more computer-readable media of claim 11, wherein modifying the initial topology further comprises pinning an other of the plurality of rendering modes on the one of the plurality of render targets.

13. A method of determining a video configuration satisfying a prioritized list of desired video configuration options, the method comprising:
   based on the prioritized list, submitting a partial video configuration for at least a first resource associated with a first video path for a first display device coupled to a computer system;
   receiving a list of configuration options co-functional with the partial video configuration and co-functional with at least a second video path for a second display device coupled to the computer system, wherein the configuration options are co-functional with the partial video configuration and co-functional with at least the second video path based on interdependencies between video system components used by the first video path and video system components used by at least the second video path;
   determining whether a desired option in the prioritized list is present in the list of configuration options co-functional with the partial video configuration and co-functional with at least the second video path; and
   responsive to determining the desired option is not present, storing a modified partial configuration for the first resource in one or more computer-readable storage media.

14. The method of claim 13, wherein the video configuration indicates configuration of a video presenting network.

15. The method of claim 14, wherein the list indicates desired configuration options for the video presenting network.

16. One or more computer-readable media having computer-executable instructions for performing the method of claim 13.

17. In one or more computer-readable media, a video rendering device driver comprising:
   instructions configurable to cause a computer to obtain a first provisional configuration for a video presenting network configuration, the first provisional configuration describing a plurality of video outputs, a plurality of render targets, and at least a first video output to render target association; and
   instructions configurable to cause the computer to replace the first provisional configuration for the video presenting network configuration with a second provisional configuration for the video presenting network configuration, the second provisional configuration describing second and third video output to render target associations, wherein the second video output to render target association was selected at least in part for its co-functionality with at least the third video output to render target association.

18. The video rendering device driver of claim 17, further comprising instructions configurable to cause the computer to dispose of the first provisional configuration for the video presenting network configuration.

19. The video rendering device driver of claim 17, wherein the instructions configurable to cause the computer to replace the first provisional configuration for the video presenting network configuration comprise instructions configurable to cause the computer to set video mode constraints on each of a plurality of enumerated video outputs.

20. The video rendering device driver of claim 17, wherein the instructions configurable to cause the computer to replace the first provisional configuration for the video presenting network configuration comprise instructions configurable to cause the computer to create the second provisional configuration for the video presenting network configuration.

21. One or more computer-readable media comprising instructions configured to cause a computer to perform a method, the method comprising:

receiving a configuration for a first display device, wherein the configuration comprises a first video input indicated as being routed to a first video output of the computer through a first codec, the first display device being connected to the first video output;

receiving a configuration for a second display device, wherein the configuration comprises a second video input indicated as being routed to a second video output of the computer through a second codec, the second display device being connected to the second video output;

determining whether the configuration for the second display device is co-functional with the configuration for the first display device based on possible video modes that the first codec and the second codec can drive and possible video mode set distributions across the first and second video outputs; and as a result of determining that the configuration for the second display device is not co-functional with the configuration for the first display device, modifying the request for the configuration of the second display device such that the configuration for the first display device is compatible with the configuration for the second display device.

* * * * *